United States Patent
Samant et al.

(10) Patent No.: US 12,433,510 B2
(45) Date of Patent: Oct. 7, 2025

(54) METHODS AND SYSTEMS FOR IMPROVED COLLECTION OF INTERSTITIAL FLUID

(71) Applicant: Georgia Tech Research Corporation, Atlanta, GA (US)

(72) Inventors: Pradnya Samant, Atlanta, GA (US); Chandana Kolluru, Atlanta, GA (US); Mark R. Prausnitz, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1183 days.

(21) Appl. No.: 16/955,681

(22) PCT Filed: Dec. 21, 2018

(86) PCT No.: PCT/US2018/067269
§ 371 (c)(1),
(2) Date: Jun. 18, 2020

(87) PCT Pub. No.: WO2019/126735
PCT Pub. Date: Jun. 27, 2019

(65) Prior Publication Data
US 2020/0315502 A1    Oct. 8, 2020

Related U.S. Application Data

(60) Provisional application No. 62/741,591, filed on Oct. 5, 2018, provisional application No. 62/623,662, filed (Continued)

(51) Int. Cl.
*A61B 5/145* (2006.01)
*A61B 5/15* (2006.01)
(Continued)

(52) U.S. Cl.
CPC ...... *A61B 5/14514* (2013.01); *A61B 10/0045* (2013.01); *A61B 5/145* (2013.01);
(Continued)

(58) Field of Classification Search
CPC . A61B 5/14514; A61B 10/0045; A61B 5/145; A61B 5/14507; A61B 5/1451;
(Continued)

(56) References Cited

U.S. PATENT DOCUMENTS 6,334,856 B1    1/2002    Allen et al.
6,503,231 B1    1/2003    Prausnitz et al.
(Continued)

FOREIGN PATENT DOCUMENTS

EP    1239917 B1    5/2005

OTHER PUBLICATIONS

Mcgeer et al., "Medical uses of Sodium thiosulfate", J Neurol Neuromedicine, 1(3): 28-30, 2016 (Year: 2016).*
(Continued)

*Primary Examiner* — Jennifer Robertson
*Assistant Examiner* — Jonathan Drew Moroneso
(74) *Attorney, Agent, or Firm* — Eversheds Sutherland (US) LLP

(57) ABSTRACT

Methods and devices of collecting ISF from skin. The methods may include inserting an array of microneedles into a patient's skin to form apertures in the patient's skin, facilitating ISF mobilization within the skin, and collecting ISF that flows from the apertures. The devices may include an array of microneedles extending from a backing structure. The devices also may include a collection matrix for collecting ISF and/or means for facilitating ISF mobilization.

22 Claims, 23 Drawing Sheets

Related U.S. Application Data on Jan. 30, 2018, provisional application No. 62/608,865, filed on Dec. 21, 2017.

(51) Int. Cl.
  *A61B 10/00* (2006.01)
  *A61M 37/00* (2006.01)

(52) U.S. Cl.
  CPC ......... *A61B 5/14507* (2013.01); *A61B 5/1451* (2013.01); *A61B 5/15* (2013.01); *A61B 5/150015* (2013.01); *A61B 2010/008* (2013.01); *A61M 37/0015* (2013.01); *A61M 2037/0023* (2013.01); *A61M 2037/003* (2013.01); *A61M 2037/0038* (2013.01); *A61M 2037/0046* (2013.01); *A61M 2037/0061* (2013.01)

(58) Field of Classification Search
  CPC ............... A61B 5/15; A61B 5/150015; A61B 2010/008; A61B 18/00; A61B 2018/143; A61B 5/150068; A61B 5/150099; A61B 5/150748; A61B 5/150984; A61B 17/205; A61B 5/150022; A61M 37/0015; A61M 2037/0023; A61M 2037/003; A61M 2037/0038; A61M 2037/0046; A61M 2037/0061
  See application file for complete search history.

(56) References Cited

U.S. PATENT DOCUMENTS

| | | | |
|---|---|---|---|
| 6,611,707 B1 | 8/2003 | Prausnitz et al. | |
| 6,652,478 B1 | 11/2003 | Gartstein et al. | |
| 6,713,211 B2 | 3/2004 | Morishita et al. | |
| 6,743,211 B1 | 6/2004 | Prausnitz et al. | |
| 7,226,439 B2 | 6/2007 | Prausnitz et al. | |
| 7,344,499 B1 | 3/2008 | Prausnitz et al. | |
| 7,828,749 B2 | 11/2010 | Douglas et al. | |
| 9,302,903 B2 | 4/2016 | Park et al. | |
| 10,105,080 B1 | 10/2018 | Kam et al. | |
| 10,441,205 B2 | 10/2019 | Litherland et al. | |
| 10,441,691 B2 | 10/2019 | Todd et al. | |
| 10,542,922 B2 | 1/2020 | Sia et al. | |
| 10,624,567 B2 | 4/2020 | Feldman et al. | |
| 10,638,963 B2 | 5/2020 | Beyerlein et al. | |
| 10,653,342 B2 | 5/2020 | Rogers et al. | |
| 2002/0045850 A1* | 4/2002 | Rowe | A61B 5/15136 604/501 |
| 2003/0135161 A1 | 7/2003 | Fleming et al. | |
| 2007/0270672 A1* | 11/2007 | Hayter | A61B 5/150526 600/309 |
| 2008/0269666 A1* | 10/2008 | Wang | A61B 17/205 604/173 |
| 2009/0049243 A1 | 2/2009 | Dubrovsky et al. | |
| 2009/0099427 A1* | 4/2009 | Jina | A61B 5/685 600/309 |
| 2009/0198152 A1* | 8/2009 | Kim | A61B 5/150022 600/583 |
| 2012/0296187 A1* | 11/2012 | Henning | A61B 5/14503 600/347 |
| 2013/0079605 A1* | 3/2013 | Bandaru | A61B 5/1486 600/347 |
| 2016/0166185 A1 | 6/2016 | Liepmann et al. | |
| 2016/0213908 A1 | 7/2016 | McAllister et al. | |
| 2019/0000365 A1* | 1/2019 | Beyerlein | A61B 5/150022 |

OTHER PUBLICATIONS

"Localized edema", National Library of Medicine, accessed on Jul. 25, 2024, accessed at https://www.ncbi.nlm.nih.gov/medgen/4453#:~:text=Definition,from%20NCI%5D (Year: 2024).*

Miller, Philip R., et al., "Extraction and biomolecular analysis of dermal interstitial fluid collected with hollow microneedles," Communications Biology Oct. 22, 2018, https://www.nature.com/articles/s42003-018-0170-z, accessed Jun. 30, 2020 (11 pages).

European Search Report for EP Application No. 18890093.0 mailed Aug. 4, 2021 (7 pages).

European Third Party Observation for EP Application No. 20180890093.0 mailed May 16, 2022 (4 pages).

* cited by examiner

METHODS AND SYSTEMS FOR IMPROVED COLLECTION OF INTERSTITIAL FLUID

CROSS-REFERENCE TO RELATED APPLICATIONS

This application claims priority to U.S. Provisional Patent Application No. 62/741,591, filed Oct. 5, 2018, U.S. Provisional Patent Application No. 62/623,662, filed Jan. 30, 2018, and U.S. Provisional Patent Application No. 62/608,865, filed Dec. 21, 2017, which are incorporated herein by reference.

BACKGROUND

Biomarkers are molecules that can provide information regarding physiological status, and are found in body fluids, such as blood, urine, and saliva. Diagnosis and monitoring can be an important aspect of effective healthcare (e.g., diabetes management by blood glucose testing, quick detection of infectious diseases like HIV, and/or the ability to characterize cancers by blood sampling). Blood monitoring, however, is limited by the need for expert training, the one or more difficulties associated with continuous monitoring, the pain and/or apprehension associated with drawing blood, and the limitation of only being able to assay biomarkers that are found in blood. Urine and saliva are more accessible, but typically host limited biomarkers of variable concentrations.

Tissue interstitial fluid (ISF) is an extracellular fluid found in tissues, such as the skin (dermis), as well as in other tissues of living organisms. ISF bathes and surrounds the cells and tissues of the body, and constitutes about 60% to about 70%, by weight, of an average human's body fluid, and about 15% to about 25% of an average human's body weight.

ISF contains a number of compounds, including analytes, metabolites, biomarkers, drug molecules, etc. Therefore, an analysis of ISF can be used, at least in part, to determine the concentration of these compounds in tissues. Some of the compounds of ISF are found in other body fluids, but some of the compounds of ISF are only found in ISF. It has been shown, for example, that ISF contains unique biomarkers that are not found in plasma (see, e.g., Niedzwiecki, M. M. et al., Anal. Chem. 2018, 90, 3786; Tran, B. Q., et al., Journal of Proteome Research 17.1 (2017): 479-485; and Kool, J., et al., Proteomics, 2007. 7(20): p. 3638-50). Some of the compounds of ISF are present at concentrations in ISF that are similar to or different than concentrations observed for the same compounds in other body fluids. Some compounds of ISF may partition (e.g., from blood) into ISF and/or accumulate in ISF. Some compounds of ISF may be generated and/or consumed in ISF.

As a result, ISF is a source of biomarkers, which may compliment conventional sources of biomarkers, such as blood, urine, etc. Compared to blood, ISF contains less protein (e.g., albumin) and does not clot, thereby making certain analyses easier to conduct.

For these reasons, collecting and analyzing ISF can be useful in a number of areas, including, but not limited to, disease diagnosis and/or monitoring, pharmacology, the detection and/or discovery of biomarkers, etc. ISF can be analyzed to determine health status, physiological status, previous exposure to external compounds that entered the body, the status of a tissue from which ISF was collected, the status of tissues other than the tissue from which ISF was collected, etc.

ISF, however, has received limited attention as a source of biomarkers or otherwise, due at least in part to a lack of reliable and/or simple collection methods. The barriers provided by the stratum corneum and viable epidermis typically prevent easy access to the underlying dermal ISF. Bound water and low flow conductivity in skin also may make collection of ISF difficult. Various methods of overcoming these barriers and sampling ISF through the skin have been devised, but each method suffers from one or more disadvantages.

For example, suction blisters have been widely used to sample ISF from skin, but this technique requires specialized equipment for generating a vacuum over extended periods, well-trained personnel to perform the procedure, and injury at the site of treatment that frequently takes weeks to heal.

Microdialysis and microperfusion also have been used for the continuous measurement of free, unbound analyte concentrations in the extracellular fluid of a number of tissues. Microdialysis, however, is poorly suited for the measurement of proteins, because of the molecular weight cut-off and low rates of diffusion. Open flow microperfusion requires the implantation of a stainless-steel mesh into the skin, and the direct liquid pathway between the probe's perfusate and the surrounding ISF provides a diluted ISF sample.

Reverse iontophoresis has been used to analyze ISF, but since this technique relies on an indirect measurement of concentration that is influenced by a variety of parameters, frequent calibration typically is required to maintain the accuracy of the devices used to implement this technique.

Microneedles (MNs), which are micron-scale needles, have been used for drug delivery applications and ISF sampling. ISF sampling with MNs, however, has generally been limited to sub-microliter sampling volumes. Prior approaches have employed solid, swellable MNs, but ISF collection is limited by MN volume (Caffarel-Salvador, E., et al., *HydrogelForming Microneedle Arrays Allow Detection of Drugs and Glucose In Vivo: Potential for Use in Diagnosis and Therapeutic Drug Monitoring*. PLoS ONE, 2016. 10(12): p. e0145644).

Hollow MNs also have been used for collecting biomarkers by diffusion or convection of ISF through the hollow MNs by capillary action. This technique, however, is typically slow and/or collects relatively small ISF volumes (Ranamukhaarachchi, S. A., et al., *Integrated hollow microneedle-optofluidic biosensor for therapeutic drug monitoring in sub-nanoliter volumes*. Scientific Reports, 2016. 6: p. 29075). These prior methods provide a driving force for ISF flow within MNs, but rely on slow diffusion of ISF through dermis to the dermis-MN interface.

There remains a need for methods of collecting ISF, including methods of collecting ISF from skin that are simple, faster, minimally invasive, and/or capable of collecting relatively large volumes of ISF.

BRIEF SUMMARY

Provided herein are methods of collecting ISF that are simple, reliable, faster, and/or minimally invasive. The methods and devices herein, in some embodiments, can collect relatively large volumes (e.g., $\geq 1$ µL) of ISF from skin. ISF collected by the methods described herein can be a source of biomarkers, including biomarkers unique to ISF, and/or serve as a non-clotting alternative to blood for a number of tests, including biomarker monitoring.

In one aspect, methods for collecting ISF are provided. In some embodiments, the methods include inserting a plurality of microneedles into the patient's skin at an insertion site to form a plurality of apertures in the stratum corneum at the insertion site; collecting ISF that flows from the apertures to the surface of the patient's skin. The methods also may include facilitating ISF mobilization within the patient's skin about the insertion site of the patient's skin to increase the rate and/or total amount of ISF flowing from the apertures.

In another aspect, devices for collection of ISF are provided. In some embodiments, the devices include an array of solid microneedles configured for insertion across the stratum corneum of the patient's skin, each solid microneedle having an outer surface, an insertion tip end portion, and a base end portion; a backing structure from which the array of microneedles extend; and means for facilitating ISF mobilization within the patient's skin about an insertion site of the patient's skin to increase the rate and/or total amount of ISF flowing from apertures created by the microneedles following their insertion into the skin.

In some embodiments, the devices include an array of solid microneedles configured for insertion across the stratum corneum of the patient's skin, each solid microneedle having an outer surface, an insertion tip end portion, and a base end portion; a backing structure from which the array of microneedles extend; and an ISF collection matrix disposed in proximity to the base end portion of the microneedles to receive ISF flowing along the outer surface toward the base end portion of the microneedles when the microneedles are inserted to the patient's skin.

In yet another aspect, methods for detection and/or monitoring of disease, injury, environmental exposure, or physiological or drug pharmacokinetic status are provided. In some embodiments, the methods include collecting interstitial fluid (ISF) from a biological tissue; and analyzing the collected ISF for the presence or concentration of (i) a biomarker indicative of a specific disease, injury, environmental exposure, or physiological status, (ii) a pharmaceutical compound, (iii) a metabolite, or (iv) a combination thereof; wherein collecting ISF comprises inserting a plurality of microneedles into the biological tissue at an insertion site to form a plurality of apertures in the biological tissue at the insertion site, collecting ISF that flows from the apertures to the surface of the biological tissue; and facilitating ISF mobilization within the biological tissue about the insertion site of the biological tissue to increase the rate and/or total amount of ISF flowing from the apertures.

Additional aspects will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1A:
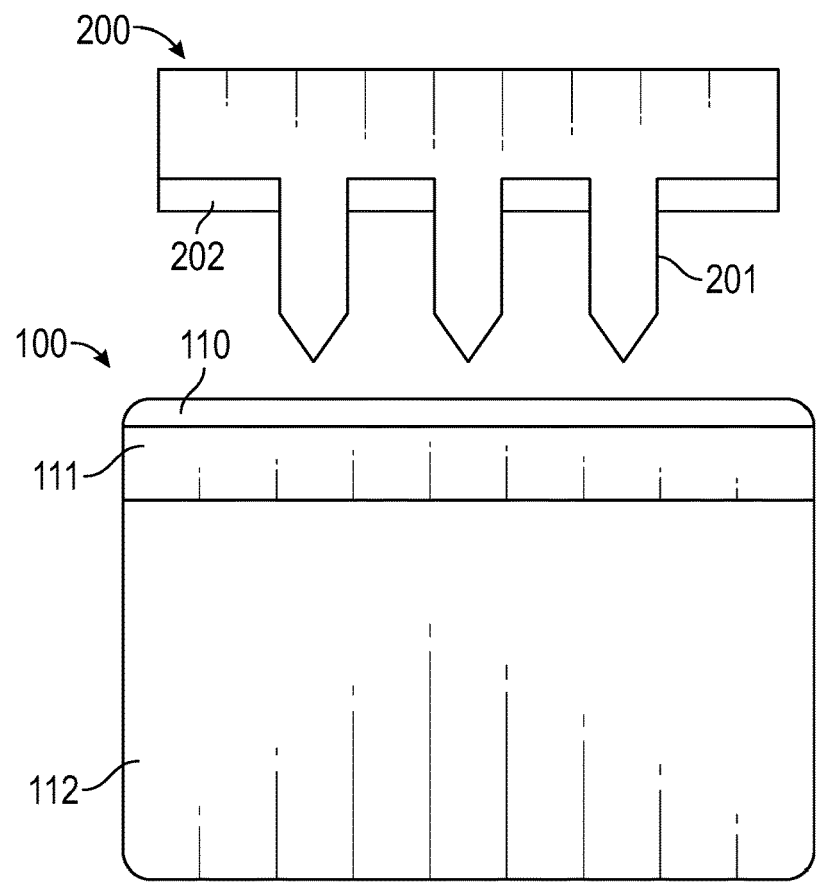
FIG. 1A and FIG. 1B are schematics depicting an embodiment of the methods described herein.

Improved methods and devices for collecting ISF have been developed. The methods and devices described herein may provide a convective driving force for transport of ISF and the compounds thereof. The devices described herein may be used for the continuous or periodic collection/analysis of ISF, because ISF, unlike blood, does not clot.

In some embodiments, the methods and devices described herein may be configured to sample clinically relevant quantities of ISF during a typical doctor visit. ISF extracted by the methods described herein may have no or minimal contamination from blood, and/or have a reduced amount of artifacts, thereby benefitting the accuracy of biomarker analysis.

Methods

In one aspect, methods for collecting ISF are provided. In some embodiments, the methods include inserting a plurality of microneedles into the patient's skin at an insertion site to form a plurality of apertures in the stratum corneum at the insertion site; collecting ISF that flows from the apertures to the surface of the patient's skin; and facilitating ISF mobilization within the patient's skin about the insertion site of the patient's skin to increase the rate and/or total amount of ISF flowing from the apertures.

The microneedles generally may be inserted into the patient's skin at any angle. In some embodiments, the microneedles are inserted into the skin at an angle of about 90° (i.e., substantially perpendicular to a surface of the patient's skin). In some embodiments, the microneedles are inserted into the skin at an angle less than 90° relative to the skin surface. For example, the microneedles may be inserted into the skin at an angle of about 10° to about 45° relative to the skin surface, about 10° to about 30° relative to the skin surface, about 10° to about 20° relative to the skin surface, or about 10° to about 15° relative to the skin surface. In some embodiments, the microneedles are inserted into the skin at an angle less than 10° relative to the skin surface. In some embodiments, inserting the microneedles into the skin at an angle less than 90° can facilitate insertion into the skin, because such lesser angles of insertion may deform the skin's surface less than greater angles relative to the skin surface. Insertion at a lower angle may reduce the likelihood of puncturing blood vessels (e.g., capillaries), because the lower insertion angle reduces the depth of penetration achieved by the microneedles.

In some embodiments, the methods described herein are performed in a manner that the collected ISF is substantially (i.e., ≤5%, by weight) or completely blood-free. One or more factors of the methods described herein may determine whether the collected ISF is substantially or completely blood-free, including, but not limited to, the length of the microneedles, the angle of insertion of the microneedles, the strength of vacuum applied to apertures, or a combination thereof.

In some embodiments, the plurality of microneedles is inserted into the patient's skin once in the methods described herein. In some embodiments, the plurality of microneedles is inserted into the patient's skin more than once. For example, the plurality of microneedles may be inserted into the patient's skin two, three, four, five, or more times. Therefore, the plurality of microneedles may be inserted into and removed from the insertion site several times before or during the collecting of ISF. In some embodiments, puncturing skin more than once with a plurality of microneedles can create a plurality of apertures very close to each other (e.g., within a few millimeters of each other, about 1 mm from each other, less than 1 mm from each other, or at the same location, where microneedle insertions puncture the skin at sites that at least partially overlap with sites on the skin that were previously punctured). In some embodiments, the plurality of microneedles may be inserted into the patient's skin in a manner than produces two or more regions of apertures that are very close to each other. The regions may be one or more centimeters apart. The regions of closely spaced punctures may provide a local pumping action, wherein each microneedle's insertion and removal creates an oscillating pressure in the skin that facilitates ISF flow. The closely spaced punctures may, in some instances, create local injury or irritation that facilitates ISF flow or creation (e.g., extravasation from nearby capillaries) at the site of repeated microneedle puncture.

The patient's skin at the insertion site may be manipulated to be held in a taut and/or curved position during (i) inserting the plurality of microneedles, and/or (ii) collecting the ISF. The manipulation of the skin may be performed during each of the one or more insertions of the plurality of microneedles.

Upon creation of apertures by insertion of a plurality of microneedles in the patient's skin, ISF may flow from the apertures before and/or after removal of the plurality of microneedles from the patient's skin. In some embodiments, the plurality of microneedles is removed from the patient's skin before ISF collection. For example, as depicted at FIG. 11C and FIG. 11D, microneedles may be removed from a patient's skin before ISF is collected. After microneedle removal, ISF may be collected by applying a collection matrix at or near the insertion site, applying vacuum or pressure to the insertion site, or any other known technique.

In some embodiments, the plurality of microneedles is not removed from the patient's skin before ISF collection. Although it was expected that the presence of inserted solid microneedles in the skin would prevent or reduce ISF flow from the apertures, it was surprisingly discovered that ISF flows from the apertures along the outer surfaces of the microneedles, while the microneedles remain inserted in the patient's skin or while being moved in and out of the apertures in the skin. In some embodiments, at least a portion of the outer surfaces of the microneedles is hydrophilic. For example, the entire surface of a microneedle or selective regions of an outer surface of a microneedle may be hydrophilic. The hydrophilic regions may be used to achieve at least some degree of control over ISF flow, e.g., direction of flow toward a collection site.

In some embodiments, the methods described herein include collecting ISF by absorbing the ISF into a collection matrix. The collection matrix may include a fiber mat, which includes woven or non-woven fibers, formed of a hydrophilic material.

In some embodiments, the microneedles are part of a device that also includes means for collecting ISF. The means for collecting ISF may include a collection matrix. The collection matrix may include a fibrous, porous, or otherwise absorbent matrix, such as paper. The fibrous, porous, or otherwise absorbent matrix may be selected and/or configured to absorb a desired quantity of ISF, or up to a desired quantity of ISF. For example, in some embodiments, a fibrous, porous, or otherwise absorbent matrix may be placed in contact with ISF until the matrix is saturated with (i.e., "full of") ISF, thereby permitting the collection of a predetermined volume of ISF. When the microneedles are part of a device that also includes a fibrous, porous, or otherwise absorbent matrix, such as paper, the fibrous, porous, or otherwise absorbent matrix may be integrated into the microneedle device in any manner. For example, the fibrous, porous, or otherwise absorbent matrix may be adhered to a surface of one or more of the microneedles, and/or the fibrous, porous, or otherwise absorbent matrix may be part of a base substrate from which the plurality of microneedles extends. In some embodiments, the microneedles are inserted into the patient's skin, and while the microneedles are inserted into the skin, ISF flows to the fibrous, porous, or otherwise absorbent matrix, where it is collected. The fibrous, porous, or otherwise absorbent matrix may include microfluidic elements that at least partially controls ISF flow.

Figure 1B:
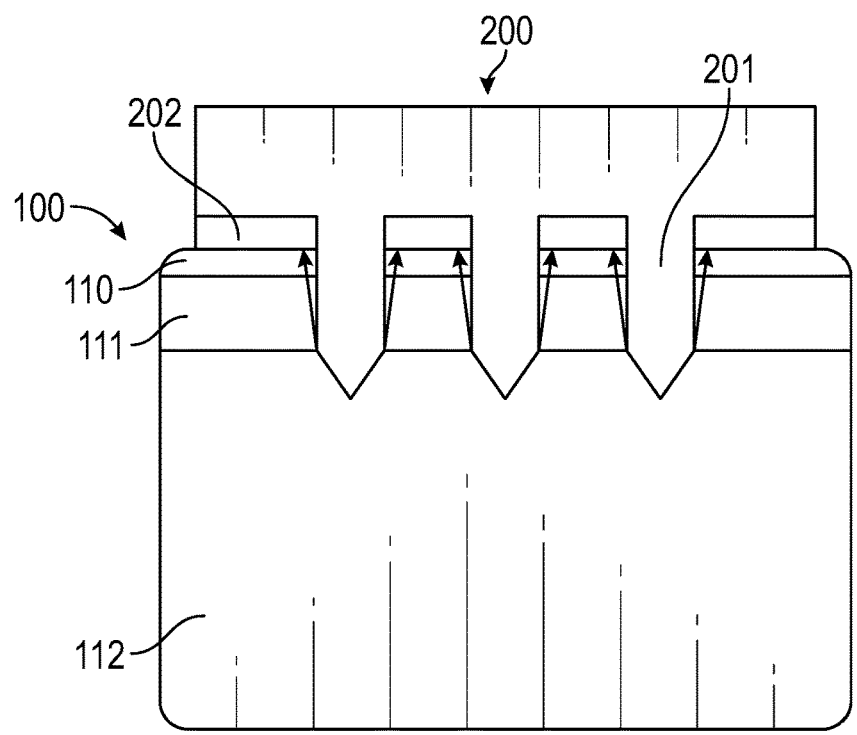

FIG. 1A and FIG. 1B are schematics showing an embodiment of the methods described herein. FIG. 1A depicts a sample of skin 100 that includes the stratum corneum 110, the viable epidermis 111, and the superficial dermis 112. Also depicted at FIG. 1A is a microneedle patch 200 that includes a plurality of microneedles 201, and a fibrous matrix 202 applied to the base substrate of the microneedle patch 200. FIG. 1B depicts the microneedle patch 200 after insertion of the plurality of microneedles 201 into the skin 100. The insertion of the plurality of microneedles 201 into the skin 100 may generate an injury response, thereby inducing local edema. After insertion, a portion of the plurality of microneedles 201 rests in the superficial dermis 112, and the fibrous matrix 202 collects ISF that flows along the outside of the plurality of microneedles 201. ISF flow is represented by the arrows of FIG. 1B. The microneedle patch 200 may be removed from the skin 100 and ISF may be separated from the fibrous matrix 202. Alternatively, one or more characteristics of the ISF (e.g., presence or concentration of one or more analytes) may be conducted in situ (i.e., while the ISF remains absorbed by the fibrous, porous, otherwise absorbent matrix). The in situ analysis may be performed with, or with the aid of, analyte binding, electromagnetic field enhancement, or other interactions with the fibrous, porous, or otherwise absorbent matrix to facilitate the assay.

In some embodiments, a fibrous, porous, or otherwise absorbent matrix is not part of a device that includes a plurality of microneedles. Before, during, and/or after removal of microneedles from a patient's skin, a fibrous, porous, or otherwise absorbent matrix may be separately applied to the skin surface to collect ISF.

In some embodiments, the methods described herein also include analyzing the collected ISF for the presence or concentration of one or more substances. The one or more substances may include a biomarker indicative of a specific disease, injury, environmental exposure, or physiological status. In some embodiments, the one or more substances includes a pharmaceutical compound or metabolite.

The methods described herein may be used for disease detection and/or monitoring in humans or other animals (e.g., mammals). In some embodiments, the methods include collecting interstitial fluid (ISF) from a biological tissue; and analyzing the collected ISF for the presence or concentration of (i) a biomarker indicative of a specific disease, injury, environmental exposure, or physiological status, (ii) a pharmaceutical compound, (iii) a metabolite, or (iv) a combination thereof; wherein collecting ISF includes inserting a plurality of microneedles into the biological tissue at an insertion site to form a plurality of apertures in the stratum corneum at the insertion site, collecting ISF that flows from the apertures to the surface of the biological tissue; and facilitating ISF mobilization within the biological tissue about the insertion site of the biological tissue to increase the rate and/or total amount of ISF flowing from the apertures. The biological tissue generally may be any human or animal tissue that is an internal or external tissue. In some embodiments, the biological tissue is mammalian skin, particularly human skin.

In some embodiments, the methods described herein are used to detect or determine an amount of troponin I in ISF. Troponin I is a sensitive marker of myocardial injury, and is necessary for establishing the diagnosis of myocardial Infarction (MI). In some embodiments, the methods described herein include inserting a plurality of microneedles into the skin of a patient showing symptoms of MI, collecting ISF in a fibrous, porous, or otherwise absorbent matrix, such as a fibrous, porous, or otherwise absorbent matrix functionalized to selectively bind with troponin I, and analyzing the ISF (e.g., by a spectroscopic measurement, a colorimetric detection method, or other method) to determine an increase in troponin I in ISF.

In some embodiments, the methods described herein are used to detect infectious diseases, such as Zika or influenza. In some embodiments, the methods described herein include inserting a plurality of microneedles into the skin of a patient, collecting ISF in a fibrous, porous, or otherwise absorbent matrix, such as a fibrous, porous, or otherwise absorbent matrix functionalized with antibodies specific to the antigen, and analyzing the ISF (e.g., with a paper based enzymatic assay, colorimetric transduction method, or other method) to determine the presence/concentration of antibodies to diagnose the infectious disease.

In some embodiments, the methods described herein are used to detect exposure to one or more hazardous substances, including those commonly associated with terrorism or chemical warfare. In some embodiments, the methods described herein include inserting a plurality of microneedles into the skin of a patient, collecting ISF in a fibrous, porous, or otherwise absorbent matrix, such as a fibrous, porous, or otherwise absorbent matrix functionalized with nanoparticles, and analyzing the ISF (e.g., with a Surface Enhanced Raman Spectroscopic method, or other method) to determine the presence of the hazardous substance.

In some embodiments, the methods and/or devices described herein are used to monitor, optionally continuously, concentrations of drugs and/or biomarkers in ISF. For example, as described herein, the methods and/or devices may be for therapeutic drug monitoring.

Facilitating ISF Mobilization

The methods described herein may include facilitating ISF mobilization. The facilitating of ISF mobilization may occur at any time and for any duration during the methods described herein. In some embodiments, the facilitating of ISF mobilization occurs before inserting the plurality of microneedles. In some embodiments, the facilitating of ISF mobilization occurs during the collection of ISF. In some embodiments, the facilitating of ISF mobilization occurs before inserting the plurality of microneedles, and during the collecting of ISF. In some embodiments, the facilitating of IS mobilization occurs between sequential rounds of inserting the plurality of microneedles.

ISF mobilization may be facilitated by any suitable technique. In some embodiments, the facilitating of ISF mobilization includes inducing local edema at the insertion site. Inducing local edema may be effected by locally increasing arterial blood flow, decreasing venous blood flow, decreasing lymphatic fluid flow, or a combination thereof, in a manner effective to lead to a build-up of ISF at the insertion site.

In some embodiments, inducing local edema is effected by selective application of pressure and/or heat to the patient's skin at or about the insertion site. The selective application of pressure may include applying pressure at a specific location with specific intensities using a pressure cuff or elastic band to restrict venous flow and/or lymphatic flow, but restrict arterial flow to a lesser extent. The selective application of pressure may include applying pressure with a device element to which the plurality of microneedles is connected.

In some embodiments, inducing local edema is effected by selective application of electromagnetic energy to the patient's skin at or about the insertion site. The electromagnetic energy may be in the form one or more electric pulses applied with at least two electrodes, or in the form of visible light or ultraviolet radiation (e.g., UVA, UVB, UVC).

In some embodiments, inducing local edema is effected by inserting microneedles, optionally repeatedly, at the insertion site effective to generate an injury response.

In some embodiments, inducing local edema is effected by application of a bioactive agent to the patient's skin at or about the insertion site, to increase the local vasodilation, to increase local vascular permeability, to increase interstitial oncotic pressure, to decrease plasma oncotic pressure, or a combination thereof. As used herein, the phrase "application to the skin", "application of an agent to the patient's skin", and the like, generally include the application of an agent on and/or in the skin. In some embodiments, the bioactive agent induces vascular leakage or an inflammatory response at the insertion site. In some embodiments, the bioactive agent does not induce an inflammatory response at the insertion site. A bioactive agent may be disposed on one or more outer surfaces of an array of microneedles, so that the bioactive agent is applied to the patient's skin at or about the insertion site when the array of microneedles contacts and/or is inserted into a patient's skin. For example, the bioactive agent may be delivered into the skin using a microneedle, such as by coating the bioactive agent on the microneedle's outer surface, by encasing the bioactive agent with the microneedle or in porosities of the microneedles or by increasing skin permeability using microneedles, which permits the bioactive agent to enter the skin more effectively.

In some embodiments, inducing local edema is effected with a laser, which may be used to achieve an ablative or non-ablative fractional laser treatment of skin. While fractional laser treatment is typically used for cosmetic procedures, it can also be used to generate inflammation in the skin, as demonstrated before in the context of generating improved immune responses to vaccine administered to skin (see, for example, Wang J, Shah D, Chen X, Anderson R R, Wu M X. *A micro-sterile inflammation array as an adjuvant for influenza vaccines*. Nature Communications 2014; 5:4447). In some embodiments, a patient's skin is treated with laser before and/or during collection of interstitial fluid. For example, the laser may produce light in the near infrared (e.g., 1.410 nm), and emit an array of light with coverage of about 1% to about 25%, or about 10% to about 20%, creating laser injury spots of about 10 to about 1000 per $cm^2$, about 50 to about 500 per $cm^2$, about 75 to about 200 per $cm^2$, or about 75 to about 100 per $cm^2$, employing energy of about 5 to about 100 mJ per microbeam, about 10 to about 50 mJ per microbeam, or about 25 to about 50 mJ per microbeam.

In some embodiments, inducing local edema is effected with radiofrequency (RF) energy, including a fractional treatment of the skin using, for example, monopolar, bipolar or multipolar RF energy application. In some embodiments, the RF energy is applied using microneedles as electrodes. While RF treatment is typically used for cosmetic procedures, it can also be used to generate inflammation in the skin, as demonstrated before in the context of generating improved immune responses to vaccine administered to skin (see, for example, Cao Y, Zhu X, Hossen M N, Kakar P, Zhao Y, Chen X. *Augmentation of vaccine-induced humoral and cellular immunity by a physical radiofrequency adjuvant*. Nature Communications. 2018; 9(1):3695). In some embodiments, the skin is treated with RF energy before and/or during collection of interstitial fluid. For example, RF energy can be applied for about 10 s to about 10 min, about 30 s to about 5 min, or about 1 min to about 3 min, at a frequency of about 0.1 MHz to about 10 MHz, about 0.5 MHz to about 2 MHz, or about 1 MHz using energy settings typical of those used for RF treatment for skin tightening.

In some embodiments, local edema is effected by treating the skin with ultraviolet, visible, near infrared, or infrared light, which may be continuous or pulsed. Edema may also be generated in the skin using heat, such as heating skin to a temperature of about 42° C. to about 60° C., about 42° C. to about 55° C., about 42° C. to about 50° C., about 45° C. to about 60° C., about 45° C. to about 55° C., about 45° C. to about 50° C., about 50° C. to about 60° C., or about 50° C. to about 55° C. Without being bound to any mechanistic theory, such exposures to light can induce production of heat shock protein in the skin (see, for example, Hsu W L, Yoshioka T. *Role of TRP channels in the induction of heat shock proteins (Hsps) by heating skin*. Biophysics (Nagoyashi). 2015; 11:25-32.) In some embodiments, skin is treated with ultraviolet, visible, near infrared, or infrared light before and/or during collection of interstitial fluid. In some embodiments, skin is treated with heat before and/or during collection of interstitial fluid. In some embodiments, the skin is treated to increase heat shock protein in the skin before and/or during collection of interstitial fluid.

In some embodiments, facilitating ISF mobilization includes the application of a vacuum (i.e., applying a negative gauge pressure, which is less than atmospheric pressure or the pressure inside the skin) or pressure (i.e., applying a positive gauge pressure, which is greater than atmospheric pressure or the pressure inside the skin) to the skin at the insertion site. The application of the vacuum or pressure may be ramped up at a rate slow enough to avoid bleeding through the apertures, and/or the application of the vacuum may be delayed for a period following insertion of the microneedles, e.g., to avoid bleeding through the apertures.

In some embodiments, inducing local edema is carried out at a first time, and the collection of ISF occurs at or after a second time several minutes after the first time. It was expected that ISF collection should be initiated immediately after the creation of apertures in the skin in order to increase or maximize the volume of ISF collected, because apertures formed by microneedles are susceptible to narrowing relatively quickly, thereby making ISF collection progressively more difficult. It was surprisingly discovered, however, that delaying ISF collection after forming the apertures can result in the collection of a greater volume of ISF. Not wishing to be bound by any particular theory, this was believed to be due to the fact that the puncturing of skin with microneedles can create local injury and/or irritation, which facilitates ISF flow or creation (e.g., extravasation from nearby capillaries) at the insertion site. In some embodiments, local edema is carried out at a first time, and the collection of ISF occurs about 1 minute to about 15 minutes, about 2 minutes to about 15 minutes, about 3 minutes to about 15 minutes, about 5 minutes to about 15 minutes, about 7 minutes to about 15 minutes, about 10 minutes to about 15 minutes, about 3 minutes to about 10 minutes, about 3 minutes to about 7 minutes, about 3 minutes to about 5 minutes, or about 5 minutes to about 10 minutes after the first time.

In some embodiments, the methods include inducing local edema by inserting microneedles repeatedly at one or more insertion sites, then, after a delay of about 1 minute to about 15 minutes, inserting the microneedles, one or more times, at or near the one or more insertion sites and collecting ISF that flows from the apertures to the surface of the patient's skin.

In some embodiments, a pressure is applied to skin before and/or during ISF collection. The application of pressure may facilitate ISF flow out of the skin. Imparting pressure to skin by pinching, stretching, or otherwise, can make the skin taut and/or impart curvature to the skin, which may facilitate ISF mobilization, at least because pressure may cause or increase ISF flow, skin tautness and/or curvature may facilitate microneedle insertion and/or reduce the likelihood of aperture narrowing or closure, or a combination thereof.

In some embodiments, the methods described herein also include determining a volume of ISF collected. Water may evaporate from ISF, therefore, embodiments of the methods herein may include determining the actual volume of ISF that was collected, despite the fact that a portion of water may have evaporated prior to ISF analysis. In some embodiments, determining a volume of ISF collected includes determining an amount of a marker compound that is present in ISF. The marker compound may be a compound, such as sodium, that is present at a relatively constant concentration in typical human patients, or is administered to a patient to provide a reference concentration. Once determined, the amount of a marker compound that is present in an ISF sample can be used to determine the initial volume of ISF collected.

Devices

In some embodiments, the devices described herein include an array of solid microneedles configured for insertion across the stratum corneum of the patient's skin, each solid microneedle having an outer surface, an insertion tip end portion, and a base end portion; a backing structure from which the array of microneedles extend; and means for facilitating ISF mobilization within the patient's skin about an insertion site of the patient's skin to increase the rate and/or total amount of ISF flowing from apertures created by the microneedles following their insertion into the skin.

In some embodiments, the devices include an array of solid microneedles configured for insertion across the stratum corneum of the patient's skin, each solid microneedle having an outer surface, an insertion tip end portion, and a base end portion; a backing structure from which the array of microneedles extend; and an ISF collection matrix disposed in proximity to the base end portion of the microneedles to receive ISF flowing along the outer surface toward the base end portion of the microneedles when the microneedles are inserted to the patient's skin. In some embodiments, the ISF collection matrix is disposed at a location to avoid contacting a surface of the patient's skin when the array of solid microneedles is inserted into the patient's skin (for example, as in FIG. 22, wherein a collection matrix is disposed on a side of a backing structure).

Collection Matrix

In some embodiments, the devices described herein include an ISF collection matrix. The ISF collection matrix may be disposed in proximity to a base end portion of the microneedles to receive ISF flowing along the outer surface toward the base end portion of the microneedles when the microneedles are inserted to the patient's skin. In some embodiments, the ISF collection matrix is part of a backing structure. In some embodiments, the ISF collection matrix is an independent component. For example, the ISF collection matrix may be an independent component that is applied at or about an insertion site after an array of microneedles has been removed from the patient's skin.

In some embodiments, an ISF collection matrix includes a fibrous, porous, or otherwise absorbent matrix. As used herein, the phrase "fibrous matrix" refers to an absorbent three-dimensional material that (i) includes fibers, and/or (ii) is capable of being separated into fibers. As used herein, the phrase "porous matrix" refers to an absorbent three-dimensional material that includes a plurality of pores. A collection matrix may be fibrous and porous. In some embodiments, the ISF collection matrix includes paper.

Figure 2:
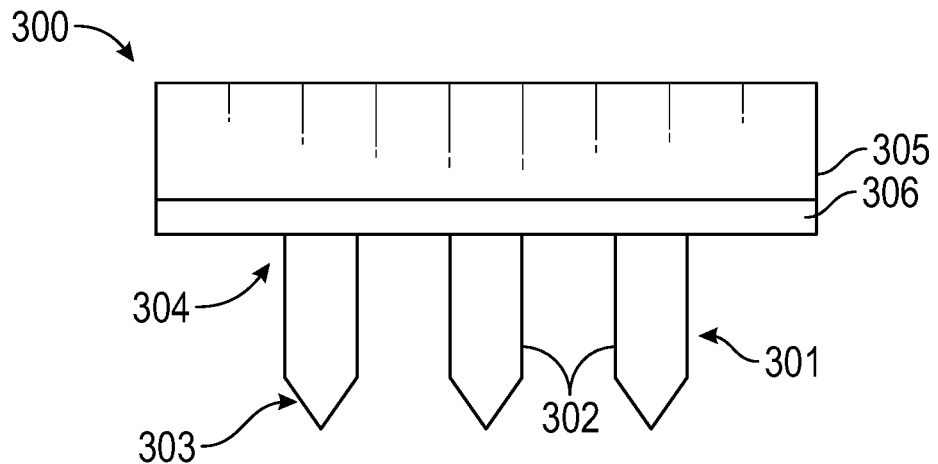
FIG. 2 depicts an embodiment of a device described herein.

In some embodiments, the ISF collection matrix is part of the backing structure. For example, a collection matrix may be disposed in a hollow portion of a backing structure. The backing structure may have one or more channels through which ISF may flow to contact the backing structure. A backing structure may include a transparent portion (e.g., a window) that permits a user to view a collection matrix that is disposed in a hollow portion of the backing structure. As a further example, a collection matrix may be disposed on at least a portion of the backing structure. A side-view of such an embodiment is depicted at FIG. 2. The device 300 of FIG. 2 includes an array of microneedles 301 that are configured for insertion across the stratum corneum. Each microneedle of the array of microneedles 301 has an outer surface 302, an insertion tip end portion 303, and a base end portion 304. The device 300 also includes a backing structure 305 from which the array of microneedles 301 extends. The device 300 also includes an ISF collection matrix 306 that is disposed in proximity to the base end portion 305. In the embodiment depicted at FIG. 2, the ISF collection matrix 306 is in the form of a sheet that is disposed on the backing structure 305 and penetrated by the array of microneedles 301. The ISF collection matrix 306 may receive ISF flowing along the outer surfaces 302 of the array of microneedles 301 following the insertion of the array of microneedles 301 into skin.

In some embodiments, the devices described herein also include an occlusive barrier configured to reduce or eliminate evaporation of water or other volatile compounds from collected ISF. It can be desirable to reduce or eliminate water evaporation from the collected ISF. The occlusive barrier may be disposed on all or a portion of a collection matrix. When an occlusive barrier is disposed on a portion of a collection matrix, the portion of the collection matrix on which the occlusive barrier is not disposed may serve as a "window" through which electromagnetic radiation used during an analytical method may be applied to the collection matrix and ISF. The occlusive barrier may be selectively removable from the collection matrix. In some embodiments, the barrier is partially or completely transparent to electromagnetic radiation (e.g., light, magnetic field, electric field, etc.) used during an analytical method. An occlusive barrier that is partially or completely transparent to electromagnetic radiation may permit an assay of ISF to be performed while the occlusive barrier is still disposed on a collection matrix. In some embodiments, an occlusive barrier includes a first portion that is partially or completely transparent to electromagnetic radiation, and a second portion that is not transparent to electromagnetic radiation. The first portion may provide a "window" that may define the area and/or volume of ISF assayed, and the second portion may have one or more desired properties (e.g., mechanical strength). Analysis using electromagnetic radiation may include colorometric/fluorescence, ultraviolet/visible spectroscopy, fluorescence spectroscopy, nuclear magnetic resonance, surface-enhanced Raman spectroscopy, Localized Surface Plasmon Resonance, or other methods known in the art.

In some embodiments, the ISF collection matrix is selectively detachable from the device following ISF collection. In some embodiments, the ISF collection matrix is not detachable from the device following ISF collection, and ISF analysis is conducted while the ISF collection matrix is attached to the device (e.g., the backing structure, the base end portion of the microneedles, etc.). In some embodiments, ISF or components or solutes in ISF are eluted from the ISF collection matrix for analysis performed separately from the device.

In some embodiments, the ISF collection matrix is functionalized to facilitate analysis of collected ISF. In some embodiments, the ISF collection matrix includes binding agents selected for specific binding to an analyte of interest. In some embodiments, the ISF collection matrix includes gold nanoparticles with which the binding agents are functionalized.

For example, a fibrous, porous, or otherwise absorbent matrix could be functionalized to facilitate selective collection of certain analytes of interest, while reducing the likelihood that other analytes are collected. A fibrous, porous, or otherwise absorbent matrix may be functionalized to selectively bind analytes of interest. Such selectivity could be a property of all or part (e.g., a region) of the fibrous, porous, or otherwise absorbent matrix. Such selectivity could be used to promote selective retention of certain analytes in the fibrous, porous, or otherwise absorbent matrix, for example, after a washing step to remove unbound analytes. A fibrous, porous, or otherwise absorbent matrix may provide selectivity in detection. For example, a fibrous, porous, or otherwise absorbent matrix could be functionalized to enhance assay signal, which could facilitate assay of analytes of interest possibly at lower concentration and/or with greater precision and/or accuracy. A fibrous, porous, or otherwise absorbent matrix may facilitate analysis by surface-enhanced Raman spectroscopy (SERS) or Localized Surface Plasmon Resonance (LSPR). This feature may be achieved by immobilizing nanoparticles (e.g., gold nanoparticles) functionalized with binding agents specific to the analyte of interest on a fibrous, porous, or otherwise absorbent matrix, such as paper. Upon collection of ISF, the analyte of interest may bind to the functionalized nanoparticles. The porous matrix of a device could then be analyzed by Raman spectroscopy. Gold nanoparticles are known to enhance the Raman signal, thereby allowing the detection of low quantities of analyte without the need for labeling. The sensitivity of the fibrous, porous, or otherwise absorbent matrix may be tuned by modifying the shape of the nanoparticles, the size of the nanoparticles, the wave length of excitation, the affinity of the binding agent, or a combination thereof.

In some embodiments, ISF is analyzed with LSPR spectroscopy. Upon collection of ISF, a functionalized fibrous, porous, or otherwise absorbent matrix could be excited with a laser and the red shift in Raman spectrum could be tested.

A fibrous, porous, or otherwise absorbent matrix, such as paper, may be functionalized with binding agents through one or more known techniques, such as covalent binding and/or low/atmospheric pressure plasma deposition. A fibrous, porous, or otherwise absorbent matrix, such as paper, may be functionalized using a chromogen agent, which may permit quantitative analysis based on colorimetric chemistry to be performed. A fibrous, porous, or otherwise absorbent matrix, such as paper, may be functionalized to direct ISF flow, for example, a fibrous, porous, or otherwise absorbent matrix may include a first portion that is hydrophobic, and a second portion that is hydrophilic, thereby promoting ISF flow to the second portion.

Means for Facilitating ISF Mobilization

The devices described herein may include means for facilitating ISF mobilization within the patient's skin about an insertion site of the patient's skin to increase the rate and/or total amount of ISF flowing from apertures created by the microneedles following their insertion into the skin.

Mechanisms of ISF mobilization can include increasing the driving force of transport of ISF or components of ISF, such as solutes in ISF. Increasing the driving force of transport may be effected by increasing applied pressure gradient, for example, by applying vacuum or pressure at or near a site of ISF collection; increasing the osmotic pressure gradient, for example, by administering osmolytes, such as compounds that dissolve in ISF at or near the site of ISF collection; increasing capillary pressure to induce flow through a capillary by capillary action at or near the site of ISF collection; increasing rate of diffusion of ISF or components of ISF by increasing the concentration gradient of the ISF or components of ISF, for example, by withdrawing ISF or components of ISF at or near the site of ISF collection, or by increasing the temperature of the skin at or near the site of ISF collection to increase the rate of diffusion of the ISF or components of ISF; or a combination thereof. Other methods known in the art also may be used alone or in combination with any of the foregoing.

Mechanisms of ISF mobilization may include decreasing the resistance to transport of ISF or components of ISF. One cause of resistance to transport of ISF or components of ISF is the presence of skin fibers, such as collagen, elastic and glycosaminoglycans (GAGs). Resistance to transport of ISF or components of ISF may be reduced by altering the structure of skin fibers. This can be effected, for example, by administering enzymes, such as collagenases, elastases, proteinases, GAG-degrading enzymes, or a combination thereof. The enzymes may be administered to the skin using microneedles, for example, coating the enzymes onto the outer surfaces of the microneedles. Resistance to transport of ISF or components of ISF can be reduced by decreasing attractive physicochemical interactions between ISF or components of ISF and skin fibers. Water or other components of ISF may be bound to skin fibers. This can be effected by adding chemicals, such as surfactants or non-aqueous solvents. Resistance to transport of ISF or components of ISF may be reduced by increasing the water content of the skin, for example, by edema. Increasing water content can cause the fibers to be more widely spaced, thereby making pore size in the fiber matrix of skin larger, which has less drag (i.e., less resistance) on flow of ISF or components of ISF. Increasing water content can also decrease the fraction of water that is bound to skin fibers and correspondingly increase the fraction of water that is not bound to skin fibers. Unbound water generally experiences less resistance to flow compared to bound water.

Figure 3:
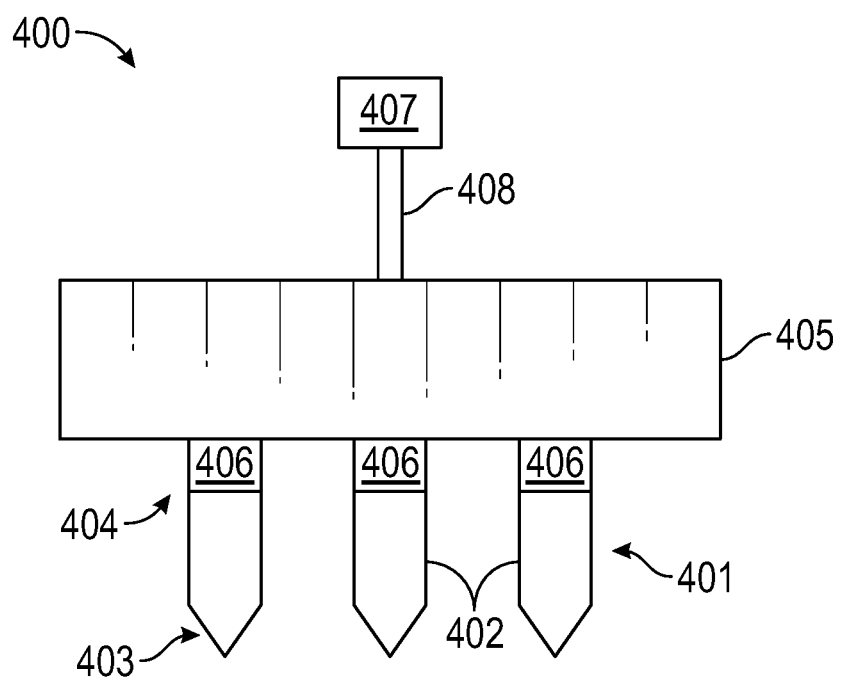
FIG. 3 depicts an embodiment of a device described herein.

In some embodiments, the means for facilitating ISF mobilization includes a pump configured to apply a vacuum to the skin at the insertion site, which generates a pressure difference to drive transport of ISF or components of ISF. The pump may be configured to apply vacuum to the skin at the insertion while an array of microneedles is inserted in a patient's skin, after removal of an array of microneedles from a patient's skin, or a combination thereof. A side-view of an embodiment of a device that includes a pump is depicted at FIG. 3. The device 400 of FIG. 3 includes an array of microneedles 401 that is configured for insertion across the stratum corneum. Each microneedle of the array of microneedles 401 has an outer surface 402, an insertion tip end portion 403, and a base end portion 404. The device 400 also includes a backing structure 405 from which the array of microneedles 401 extends. The device 400 also includes an ISF collection matrix 406 that is disposed in proximity to the base end portion 405. In the embodiment depicted at FIG. 3, the ISF collection matrix 406 includes discrete portions arranged at the base end portion 405 of each of the array of microneedles 401. The ISF collection matrix 406 may receive ISF flowing along the outer surfaces 402 of the array of microneedles 401 following the insertion of the array of microneedles 401 into skin. The device 400 of FIG. 3 also includes a pump 407 that is connected to the backing structure 405 by a tube 408. The pump 407 is configured to apply a vacuum to the skin at the site at which the array of microneedles 401 is inserted. The backing structure 405 may include one or more channels through which the vacuum may be applied. Additionally or alternatively, a pump may be attached to a chamber that contacts the skin surrounding a device and/or apertures created by a microneedle array, such that a vacuum is created within the chamber (see, e.g., FIG. 11D). The interface between the chamber and the skin may provide a seal that permits a vacuum to be created within the chamber.

In some embodiments, the means for facilitating ISF mobilization includes osmolytes configured to create an osmotic pressure different in the skin at the insertion site, which generates a pressure difference to drive transport of ISF or components of ISF. The osmotic pressure gradient may be created by introducing osmolytes into the skin at or near the apertures in the skin created by microneedles. This can be effected by using the microneedles to deliver the osmolyte into the skin, for example, by coating the microneedles with osmolyte and allowing the osmolyte to dissolve off the microneedles in the skin. This can be effected by using the apertures created by the microneedles as a pathway for transport of osmolytes into the skin, for example, from a reservoir on the surface of the skin. The osmolytes may result in a higher molar concentration of solutes at or near the skin apertures than at locations in the skin distant from the skin apertures. Osmolytes may include water-soluble molecules such as sugars, salts, and/or other molecules that will dissolve in the skin. In some embodiments, movement of the osmolytes is constrained by a membrane that surrounds them, such that the membrane allows little or no transport of the osmolyte across the membrane, but the membrane does allow greater transport of water and optionally analytes of interest across the membrane. In some embodiments, the membrane is on or near the skin surface and/or along part or all of the periphery of one or more apertures.

Figure 4:
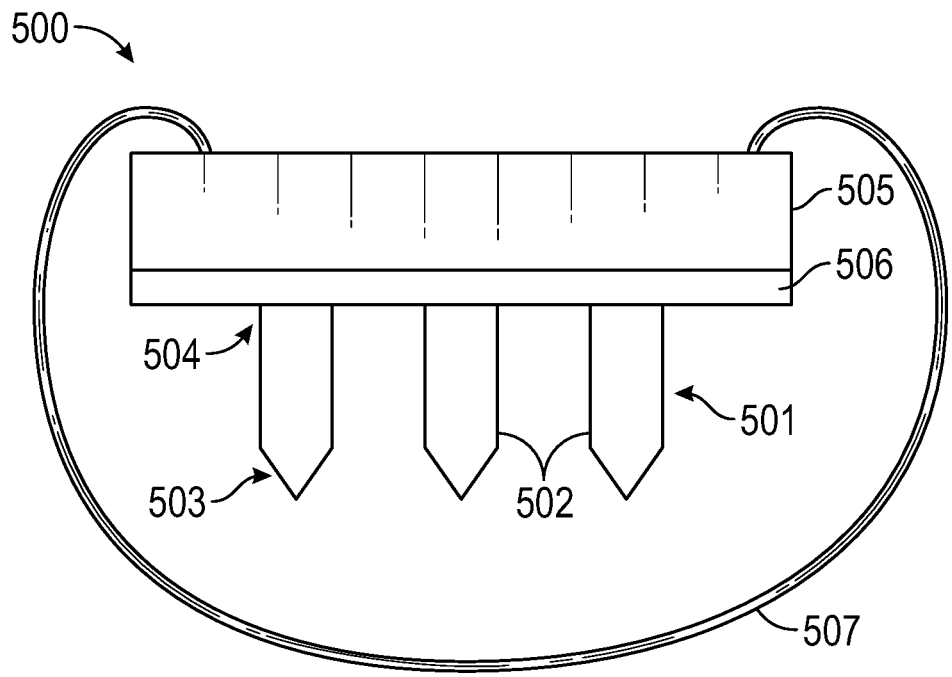
FIG. 4 depicts an embodiment of a device described herein.

In some embodiments, the means for facilitating ISF mobilization is configured to increase water content in the skin, for example, by inducing local edema at the insertion site. For example, the means for facilitating ISF mobilization to induce local edema may include at least one pressure concentration element for applying a pressure to the patient's skin at or about the insertion site. The at least one pressure concentration element may include an elastic band configured to constrict a region of the patient's skin near the insertion site. A side-view of an embodiment of a device that includes an elastic band is depicted at FIG. 4. The device 500 of FIG. 4 includes an array of microneedles 501 that is configured for insertion across the stratum corneum. Each microneedle of the array of microneedles 501 has an outer surface 502, an insertion tip end portion 503, and a base end portion 504. The device 500 also includes a backing structure 505 from which the array of microneedles 501 extends. The device 500 also includes an ISF collection matrix 506 that is disposed in proximity to the base end portion 505. In the embodiment depicted at FIG. 4, the ISF collection matrix 506 is in the form of a sheet that is disposed on the backing structure 505, and penetrated by the array of microneedles 501. The ISF collection matrix 506 may receive ISF flowing along the outer surfaces 502 of the array of microneedles 501 following the insertion of the array of microneedles 501 into skin. The device 500 of FIG. 4 also includes an elastic band 507, which is configured to constrict a region of a patient's skin near a site at which the array of microneedles 501 is inserted. The elastic band 507 may be positioned around a body part, such as the arm, leg, finger, toe, head, etc.

In some embodiments, the at least one pressure concentration element includes a raised ridge or ring extending from the backing structure, optionally around the array, for pressing into and elastically deforming the skin without penetrating the stratum corneum.

Figure 5:
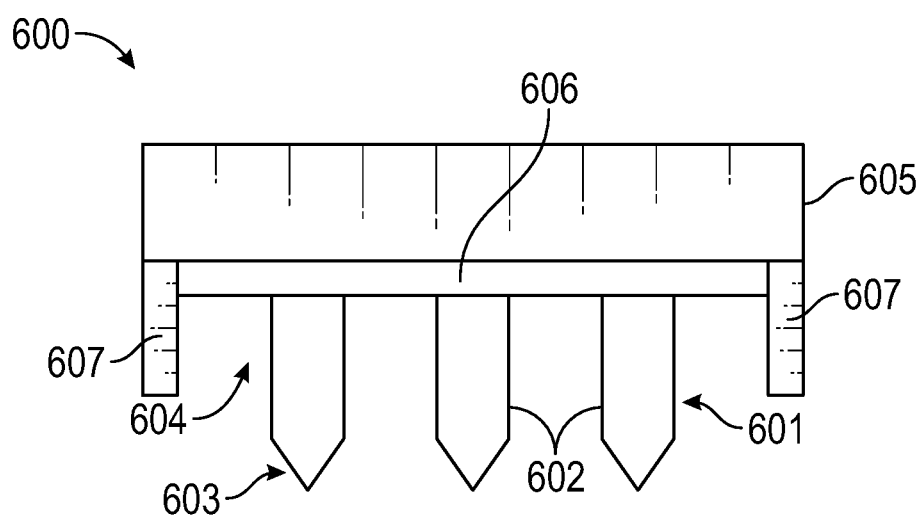
FIG. 5 depicts an embodiment of a device described herein.

A side-view of an embodiment of a device that includes an example of a raised ridge is depicted at FIG. 5. The device 600 of FIG. 5 includes an array of microneedles 601 that is configured for insertion across the stratum corneum. Each microneedle of the array of microneedles 601 has an outer surface 602, an insertion tip end portion 603, and a base end portion 604. The device 600 also includes a backing structure 605 from which the array of microneedles 601 extends. The device 600 also includes an ISF collection matrix 606 that is disposed in proximity to the base end portion 605. In the embodiment depicted at FIG. 5, the ISF collection matrix 606 is in the form of a sheet that is penetrated by the array of microneedles 601. The ISF collection matrix 606 may receive ISF flowing along the outer surfaces 602 of the array of microneedles 601 following the insertion of the array of microneedles 601 into skin. The device 600 of FIG. 5 also includes an embodiment of a raised ridge 607 extending from the backing structure 605. Upon deployment of the device 600, the raised ridge 607 is configured to press into and elastically deform the skin without penetrating the stratum corneum. The raised ridge 607 of FIG. 5 has two sections, each arranged at opposite sides of the array of microneedles 601, but a raised ridge may surround an array of microneedles, thereby forming a ring, an example of which is depicted at FIG. 6A and FIG. 6B.

Figure 6A:
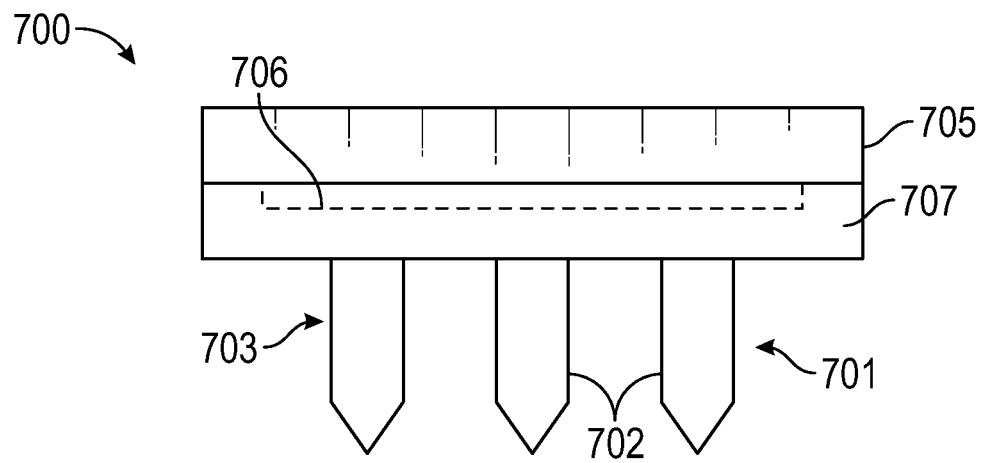
FIG. 6A and FIG. 6B depict a side-view and a bottom view, respectively, of an embodiment of a device described herein.
Figure 6B:
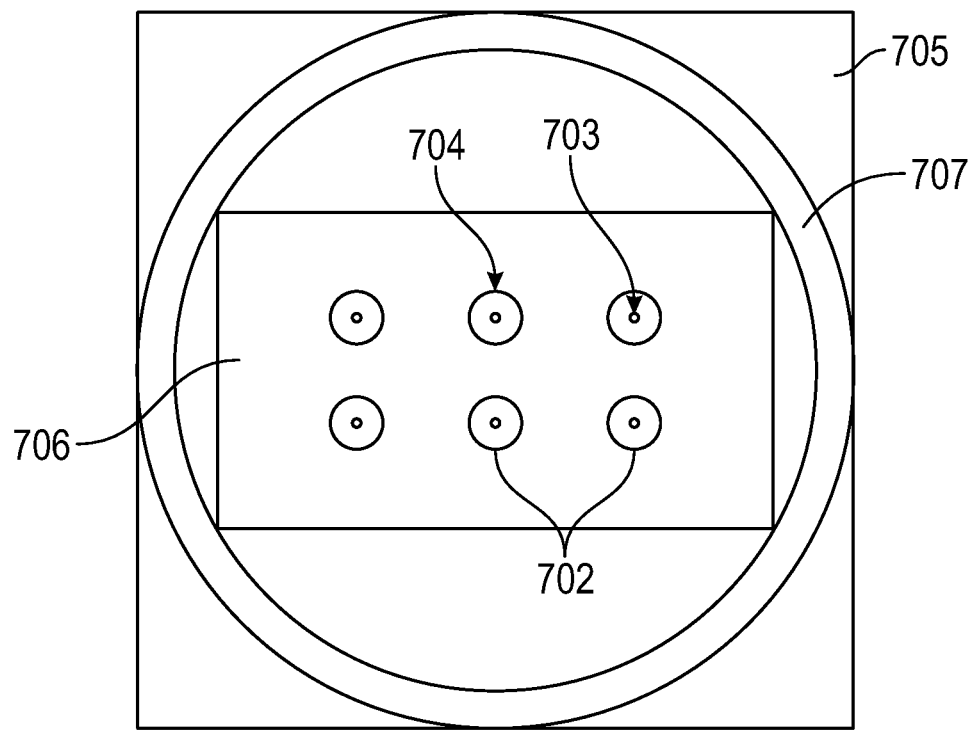

A side-view and a bottom-view of an embodiment of a device that includes an embodiment of a raised ring are depicted at FIG. 6A and FIG. 6B, respectively. The device 700 of FIG. 6A and FIG. 6B includes an array of microneedles 701 that is configured for insertion across the stratum corneum. Each microneedle of the array of microneedles 701 has an outer surface 702, an insertion tip end portion 703, and a base end portion 704. The device 700 also includes a backing structure 705 from which the array of microneedles 701 extends. The device 700 also includes an ISF collection matrix 706 that is disposed in proximity to the base end portion 705. In the embodiment depicted at FIG. 6A and FIG. 6B, the ISF collection matrix 706 is in the form of a sheet that is penetrated by the array of microneedles 701. The ISF collection matrix 706 may receive ISF flowing along the outer surfaces 702 of the array of microneedles 701 following the insertion of the array of microneedles 701 into skin. The device 700 of FIG. 6 also includes an embodiment of a ring 707 extending from the backing structure 705. Upon deployment of the device 700, the ring 707 is configured to press into and elastically deform the skin without penetrating the stratum corneum.

Figure 7:
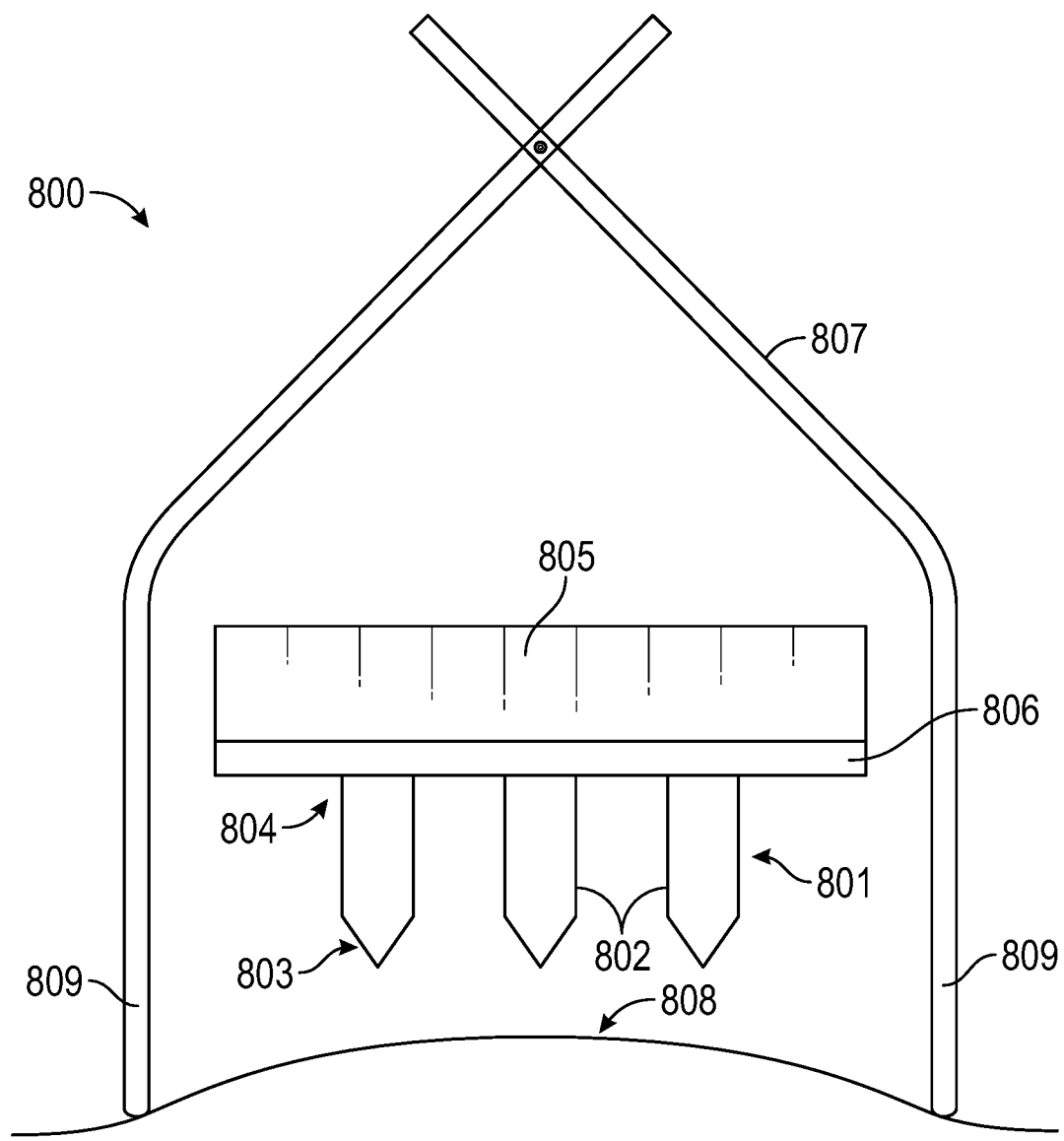
FIG. 7 depicts an embodiment of a device described herein.

In some embodiments, the at least one pressure concentration element includes two or more members configured to pinch or otherwise manipulate an area of the skin about the insertion site into a taut and/or curved position during (i) inserting the plurality of microneedles, and/or (ii) collecting the ISF. A side-view of an embodiment of a device that includes an example of two or more members configured to pinch or otherwise manipulate an area of the skin is depicted at FIG. 7. The device 800 of FIG. 7 includes an array of microneedles 801 that is configured for insertion across the stratum corneum. Each microneedle of the array of microneedles 801 has an outer surface 802, an insertion tip end portion 803, and a base end portion 804. The device 800 also includes a backing structure 805 from which the array of microneedles 801 extends. The device 800 also includes an ISF collection matrix 806 that is disposed in proximity to the base end portion 805. In the embodiment depicted at FIG. 7, the ISF collection matrix 806 is in the form of a sheet that is penetrated by the array of microneedles 801. The ISF collection matrix 806 may receive ISF flowing along the outer surfaces 802 of the array of microneedles 801 following the insertion of the array of microneedles 801 into skin. The device 800 of FIG. 7 also includes an embodiment of a pressure concentration element 807 having two members 809 configured to impart curvature to a skin surface 808. In another embodiment, portions of the device are elastic, such that upon application of the device to the skin, the elastic portions contract, thereby pulling the edges of the device inward toward the center of the device, which may impart a force on the skin that causes it to deform and create curvature. In another embodiment, the elastic portions of the device can expand upon application of the device to the skin, thereby pushing the edges of the device outward away from the center of the device, which imparts a force on the skin that cause it to become stretched or taut.

In some embodiments, the means for facilitating ISF mobilization to induce local edema comprises a heater for heating an area of the skin about the insertion site. The heater may be an independent component that is applied to a patient's skin at an insertion site separately from an array of microneedles. In some embodiments, the heater and the array of microneedles are integral components of the same device (i.e., the heater and the array of microneedles are connected to each other directly or via one or more other parts of the device).

Figure 8:
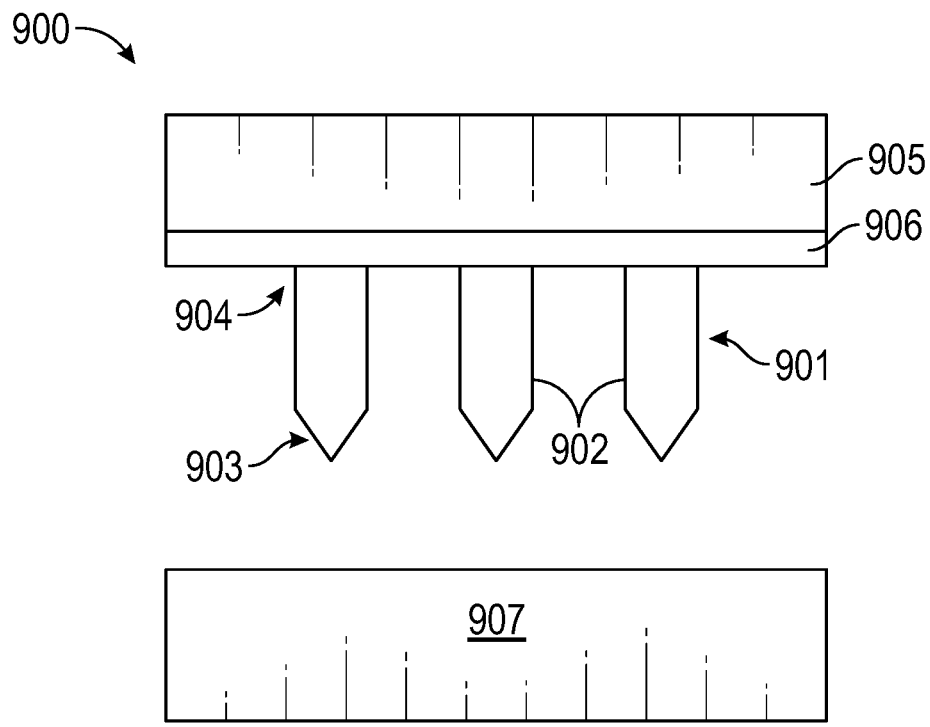
FIG. 8 depicts an embodiment of a device described herein.

A side-view of an embodiment of a device that includes a heater is depicted at FIG. 8. The device 900 of FIG. 8 includes an array of microneedles 901 that is configured for insertion across the stratum corneum. Each microneedle of the array of microneedles 901 has an outer surface 902, an insertion tip end portion 903, and a base end portion 904. The device 900 also includes a backing structure 905 from which the array of microneedles 901 extends. The device 900 also includes an ISF collection matrix 906 that is disposed in proximity to the base end portion 905. In the embodiment depicted at FIG. 8, the ISF collection matrix 906 is in the form of a sheet that is penetrated by the array of microneedles 901. The ISF collection matrix 906 may receive ISF flowing along the outer surfaces 902 of the array of microneedles 901 following the insertion of the array of microneedles 901 into skin. The device 900 of FIG. 8 also includes a heater 907 configured for heating an area of skin about the site of insertion of the array of microneedles 901.

In some embodiments, the devices described herein are configured to insert the microneedles into the skin at an angle less than 90°, such as from about 10 to about 45° relative to the skin surface. For example, the devices may be configured to insert the microneedles into the skin at an angle of about 10° to about 45° relative to the skin surface, about 10° to about 30° relative to the skin surface, about 10° to about 20° relative to the skin surface, or about 10° to about 15° relative to the skin surface. In some embodiments, the devices are configured to insert the microneedles into the skin at an angle less than 10° relative to the skin surface. The angle "relative to the skin surface" is the angle that exists, at the moment prior to insertion, between a microneedle and the surface of the skin prior to the optional application of pressure or other forces that may impart a temporary shape (e.g., curvature) to the skin.

Figure 9:
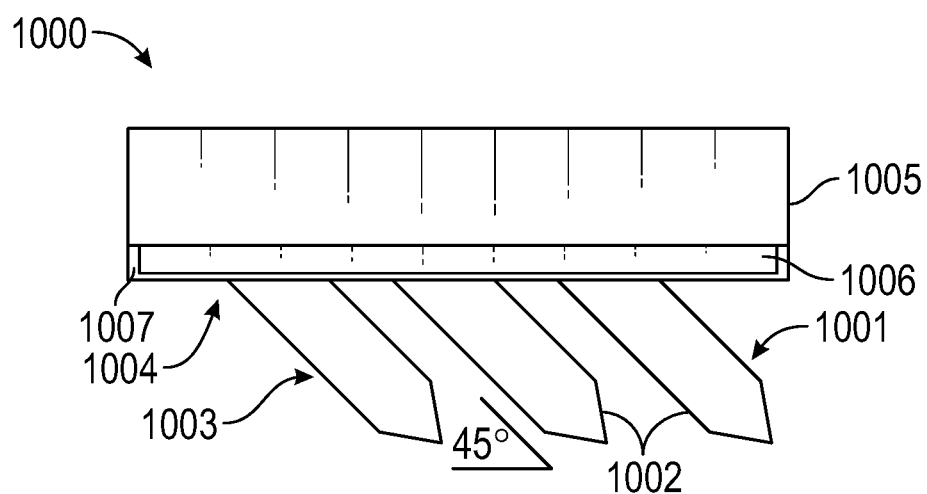
FIG. 9 depicts an embodiment of a device described herein.

FIG. 9 depicts a cross-sectional view of an embodiment of a device that includes microneedles configured for insertion at an angle of 45° relative to the skin surface. The device 1000 of FIG. 9 includes an array of microneedles 1001 that is configured for insertion across the stratum corneum at an angle of about 45° relative to a the skin surface. Each microneedle of the array of microneedles 1001 has an outer surface 1002, an insertion tip end portion 1003, and a base end portion 1004. The device 1000 also includes a backing structure 1005 from which the array of microneedles 1001 extends. The device 1000 also includes an ISF collection matrix 1006 that is disposed in proximity to the base end portion 1005. In the embodiment depicted at FIG. 9, the ISF collection matrix 1006 is in the form of a sheet that is penetrated by the array of microneedles 1001, and an occlusive barrier 1007 is disposed on the collection matrix 1006. The ISF collection matrix 1006 may receive ISF flowing along the outer surfaces 1002 of the array of microneedles 1001 following the insertion of the array of microneedles 1001 into skin.

Arrays of Microneedles

The microneedle arrays include two or more microneedles which extend from a backing structure. Each microneedle has a base end portion attached to the backing structure, and an insertion tip end portion, which is sharp and effective for insertion into skin. The skin may be the skin of a human or other mammal. It is envisioned that the present devices and methods may also be adapted to other biological tissues and other animals.

The microneedles may have tapered sidewalls between the proximal and distal ends. The tapered sidewall may extend all or a portion the distance between the proximal and distal ends of the microneedles.

The length of a microneedle ($L_{MN}$) may be between about 50 µm and about 2 mm. In most cases, $L_{MN}$ is between about 200 µm and about 1200 and ideally between about 200 µm and about 500 µm, or between about 200 µm and about 250 µm. In one embodiment, the array of microneedles includes from 10 to 1000 microneedles.

Figure 22:
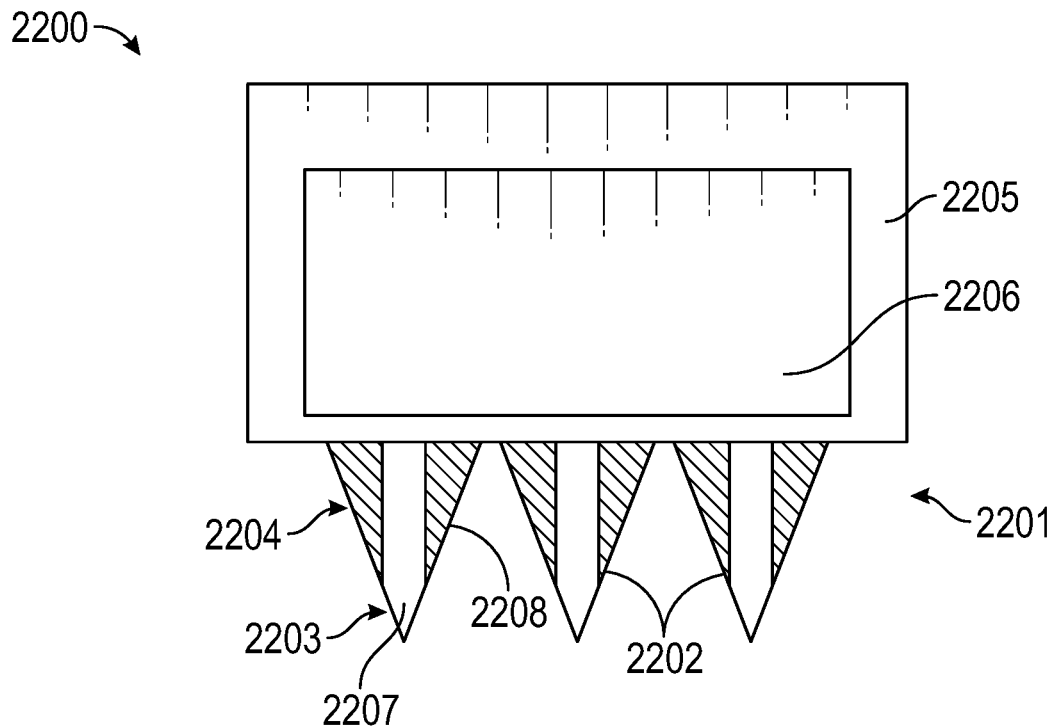
FIG. 22 depicts an embodiment of a device in which the outer surfaces of the microneedles have a portion that is hydrophobic and a portion that is hydrophilic.

The microneedles have an outer surface. In some embodiments, the outer surfaces of the microneedles and/or the backing structure have a first portion that is hydrophobic, and a second portion that is hydrophilic. The second portion that is hydrophilic may be configured to form a "track" for ISF flow from the apertures. A desired hydrophilicity/hydrophobicity of all or a portion of an outer surface of the microneedles and/or a backing structure may be achieved by [1] plasma treatment, as described herein, [2] a coating that is hydrophilic and/or hydrophobic, or [3] a combination thereof. For example, parylene, which is a hydrophobic material, may be applied to an outer surface of microneedles and/or a backing structure. A coating may be applied to only a portion of an outer surface of the microneedles and/or backing structure. The coating applied to only a portion of an outer surface of the microneedles and/or a backing structure may be configured to control ISF flow, for example, by providing a hydrophilic "track" for ISF flow from the apertures. FIG. 22 depicts a side-view of an embodiment of a device that includes microneedles having a hydrophilic "track" for ISF flow. The device 2200 of FIG. 22 includes an array of microneedles 2201 that is configured for insertion across the stratum corneum. Each microneedle of the array of microneedles 2201 has an outer surface 2202, an insertion tip end portion 2203, and a base end portion 2204. The device 2200 also includes a backing structure 2205 from which the array of microneedles 2201 extends. The device 2200 also includes an ISF collection matrix 2206 that is disposed in proximity to the base end portion 2204. In the embodiment depicted at FIG. 22, the ISF collection matrix 2206 is in the form of a sheet that is disposed the side of the backing structure 2205. A first portion of the outer surfaces 2202 of each microneedle is coated with a hydrophobic material 2208, and a second portion of the outer surfaces 2202 of each microneedle is coated with a hydrophilic material 2207. The hydrophilic material 2207 is configured to form a "track" for ISF flow. The ISF collection matrix 2206 may receive ISF flowing along the hydrophilic material 2207 of the outer surfaces 2202 of the array of microneedles 2201 following the insertion of the array of microneedles 2201 into skin.

Figure 23:
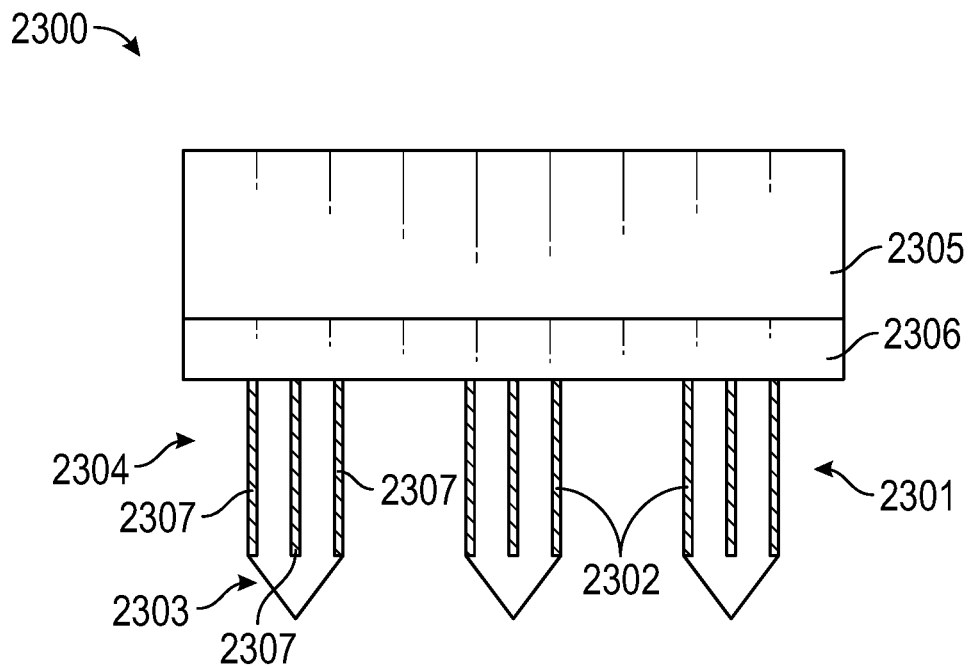
FIG. 23 depicts an embodiment of a device having a type of grooves in the microneedles.

In some embodiments, the outer surfaces of the microneedles and/or backing structure include one or more grooves configured to direct ISF flow. For example, the one or more grooves may be configured to direct ISF from the apertures to a collection matrix or skin surface. The one or more grooves may be formed by etching or any other known technique. The one or more grooves may traverse all or a portion of the length of the microneedles and/or backing structure. FIG. 23 depicts a side-view of an embodiment of a device that includes microneedles having grooves in their outer surfaces. The device 2300 of FIG. 23 includes an array of microneedles 2301 that is configured for insertion across the stratum corneum. Each microneedle of the array of microneedles 2301 has an outer surface 2302, an insertion tip end portion 2303, and a base end portion 2304. The device 2300 also includes a backing structure 2305 from which the array of microneedles 2301 extends. The device 2300 also includes an ISF collection matrix 2306 that is disposed in proximity to the base end portion 2304. In the embodiment depicted at FIG. 23, the ISF collection matrix 2306 is in the form of a sheet that is disposed on the side of the backing structure 2305 from which the array of microneedles 2301 extends. The outer surfaces 2302 include grooves 2307 that are configured to direct ISF flow. The ISF collection matrix 2306 may receive ISF flowing in the grooves 2307 of the outer surfaces 2302 of the array of microneedles 2301 following the insertion of the array of microneedles 2301 into skin.

Figure 24:
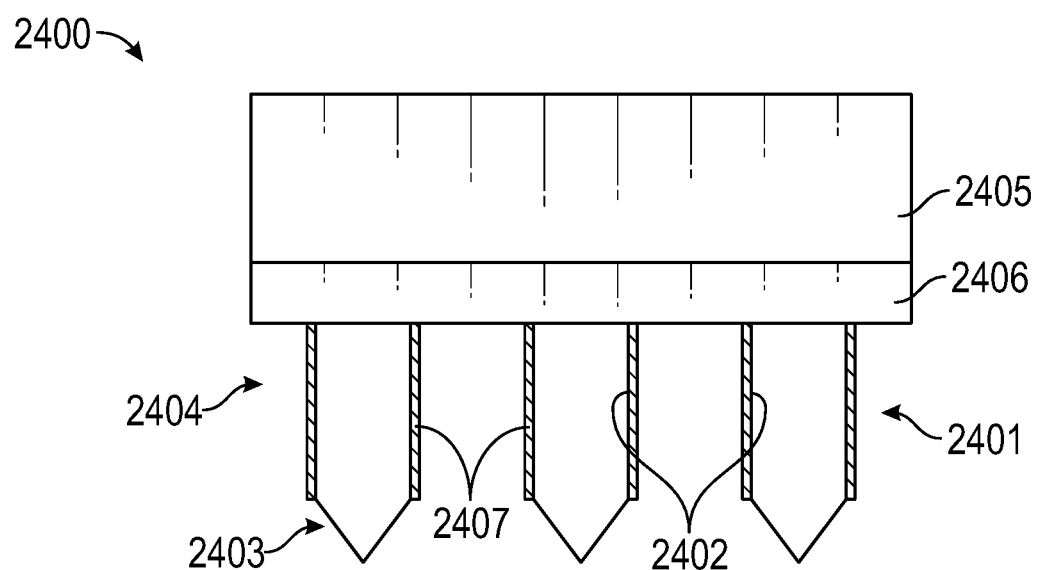
FIG. 24 depicts an embodiment of a device having a coating that includes a bioactive agent.

In some embodiments, an agent, such as a bioactive agent, is disposed on the outer surfaces of the microneedles. The agent may be applied as a coating to the outer surfaces of the microneedles, and the coating may cover all or a portion of the outer surfaces of the microneedles. The bioactive agent may be one that is capable of inducing local edema at or about an insertion site. The bioactive agent may be an enzyme, that, for example is able to degrade skin fibers. The bioactive agent may be an osmolyte that, for example, is able to increase osmotic pressure gradient in the skin at or about an insertion site. The agent, such as a bioactive agent, may be combined with an excipient prior to being disposed on the outer surfaces of the microneedles. FIG. 24 depicts a cross-sectional view of an embodiment of a device that includes microneedles coated with a bioactive agent. The device 2400 of FIG. 24 includes an array of microneedles 2401 that is configured for insertion across the stratum corneum. Each microneedle of the array of microneedles 2401 has an outer surface 2402, an insertion tip end portion 2403, and a base end portion 2404. The device 2400 also includes a backing structure 2405 from which the array of microneedles 2401 extends. The device 2400 also includes an ISF collection matrix 2406 that is disposed in proximity to the base end portion 2404. In the embodiment depicted at FIG. 24, the ISF collection matrix 2406 is in the form of a sheet that is disposed on the side of the backing structure 2405 from which the array of microneedles 2401 extends. The outer surfaces 2402 of the array of microneedles 2401 are coated with a bioactive agent 2407.

Figure 10:
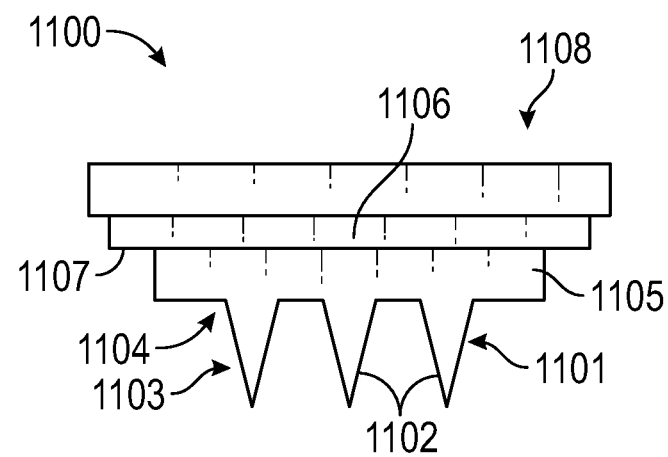
FIG. 10 depicts an embodiment of a device described herein.

In some embodiments, the devices described herein are adapted for self-administration by a patient. In some embodiments, the devices are configured as a wearable patch. The wearable patch may include an adhesive layer that may be applied to the skin. An embodiment of a wearable patch is depicted at FIG. 10. The wearable patch 1100 of FIG. 10 includes an array of microneedles 1101 having a base end portion 1104 and an insertion tip end portion 1103. The array of microneedles 1101 extend from a backing structure 1105. The wearable patch 1100 includes an adhesive layer 1106 having an adhesive surface 1107. The adhesive layer 1106 is arranged between the backing structure 1105 and a support layer 1108.

The methods and devices described herein may have a number of commercial applications, including, but not limited to, the discovery and/or validation of novel biomarkers, the monitoring of concentrations of drugs and/or biomarkers in ISF during drug development, continuous monitoring of biomarkers, therapeutic drug monitoring, or a combination thereof.

As used in this specification and the appended claims, the singular forms "a," "an," and "the" include plural referents unless the content clearly dictates otherwise. Thus, for example, reference to "a collection matrix" can include a combination of two or more components; reference to "a raised ridge" can include two different raised ridges, and the like. The term "about", as used herein, indicates the value of a given quantity can include quantities ranging within 10% of the stated value, or optionally within 5% of the value, or in some embodiments within 1% of the value.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, numerical end points of ranges disclosed herein are approximate. As a representative example, Applicant discloses, in some embodiments, the microneedles are inserted into the skin at an angle of about 10° to about 20° relative to the skin surface. This disclosure should be interpreted as encompassing values of about 10° to about 20°, and further encompasses "about" each of 11°, 12°, 13°, 14°, 15°, 16°, 17°, 18°, and 19°, including any ranges and sub-ranges between any of these values.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Microneedle (MN) Patch Fabrication

In this example, MN patches were designed in SOLIDWORKS® 2016 software (SOLIDWORKS®, Waltham, MA) and fabricated from grade 316 stainless steel as five-needle planar arrays (Tech-Etch, Plymouth, MA) by photo etching. The MN length in this example varied from 250 μm to 650 μm, with a cross-sectional area of 200 μm by 25 μm at the base and a sharp tapered tip of 10 μm diameter.

The MN patches were disinfected by washing with sterile 70% isopropyl alcohol (VWR, Radnor, PA) in a class II BSL hood (Thermo Fisher Scientific, Waltham, MA), packaged into self-sealing sterilization pouches (Crosstex International, Englewood, CO) and sterilized using an ethylene oxide sterilization cycle (AN74i Anprolene Gas Sterilizer, Andersen Products, Haw River, NC) that was validated using a product immersion method (WuXi AppTec, Marietta, GA).

Example 2—ISF Sampling Using Microneedle Patches

In this example, the MN patches of Example 1 were used to collect relatively large quantities of ISF (i.e., ≥1 μL) with a minimally invasive method that was well-tolerated, rapid, and relatively simple. Moreover, the sample of this method used equipment that is commercially available at relatively low cost.

The ISF collection method of this example used MNs to create pathways for ISF flow from the skin using vacuum as a convective driving force. The vacuum application initiated a convective driving force that moved ISF through the dermis to the skin surface through MN-generated pathways. These micropores were created by pressing the patch of Example 1 into skin and then removing it. Vacuum was applied over the micropores to transport ISF through dermis and micropores to the skin surface.

Figure 11A:
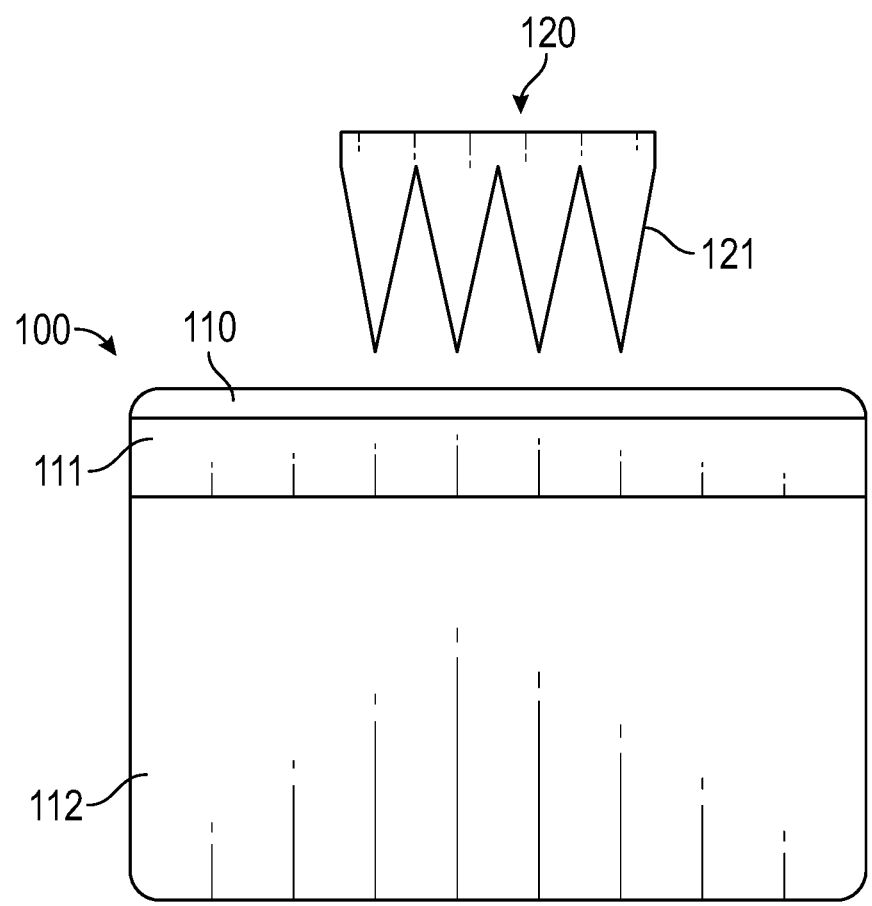
FIG. 11A depicts an embodiment of an array of microneedles prior to insertion in a patient's skin.
Figure 11B:
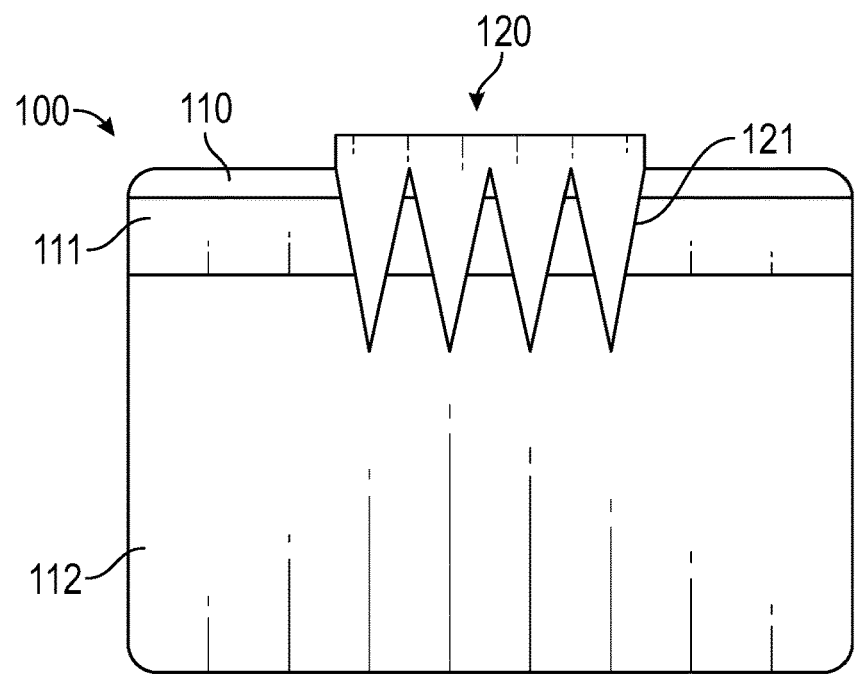
FIG. 11B depicts an embodiment of an array of microneedles after insertion in a patient's skin.
Figure 11C:
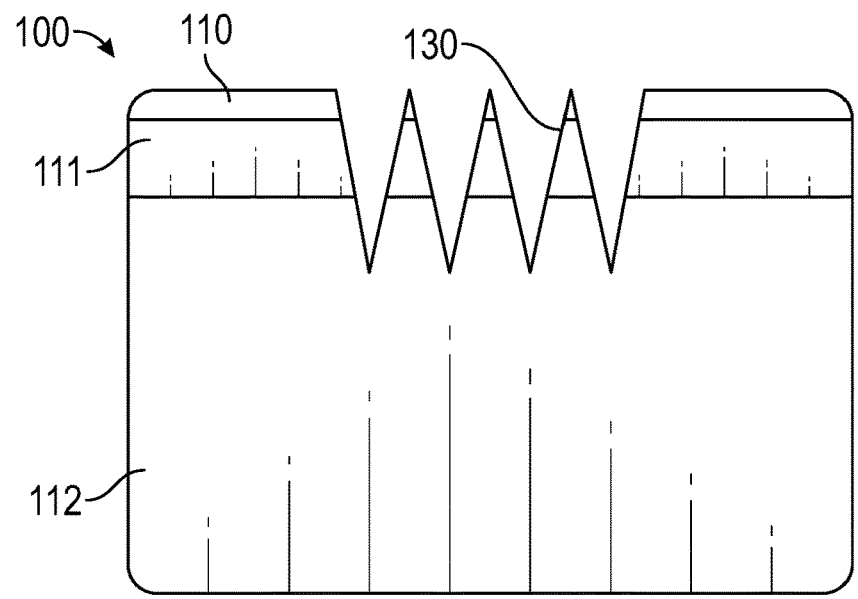
FIG. 11C depicts a plurality of apertures in a patient's skin formed by an embodiment of an array of microneedles.
Figure 11D:
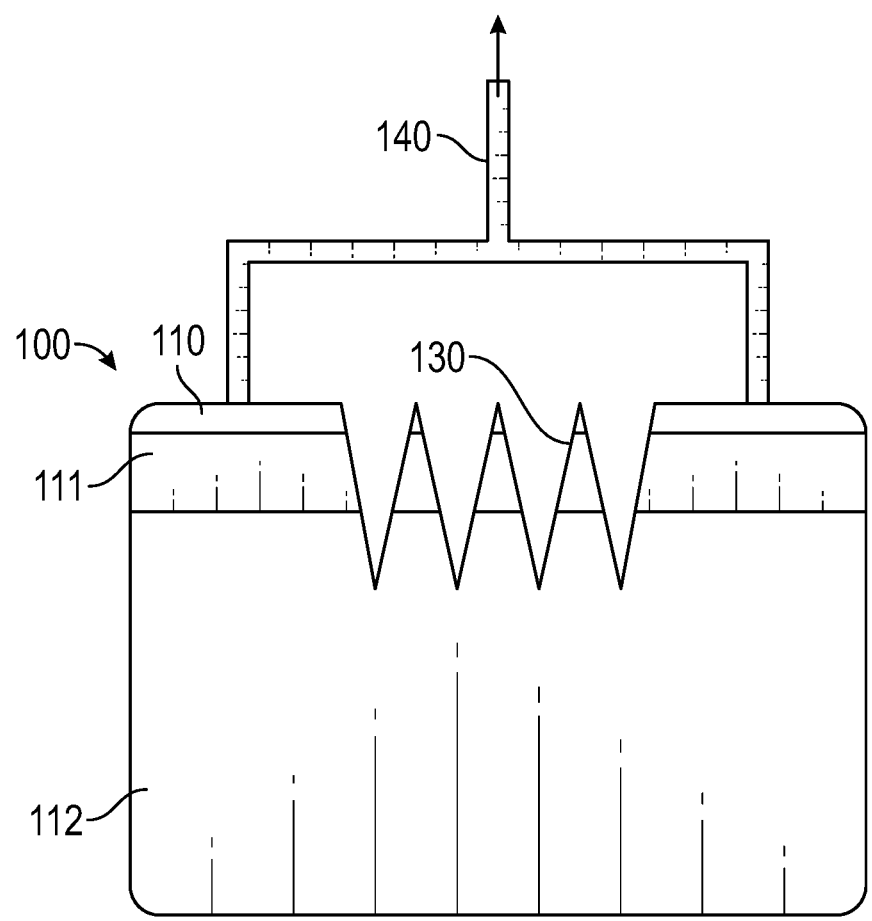
FIG. 11D depicts an embodiment of a vacuum applied to a plurality of apertures in a patient's skin formed by an embodiment of an array of microneedles.

FIG. 11A, FIG. 11B, FIG. 11C, and FIG. 11D are schematics depicting the method of this example. FIG. 11A depicts a sample of skin 100 that includes the stratum corneum 110, the viable epidermis 111, and the superficial dermis 112. Also depicted at FIG. 11A is a microneedle patch 120 that includes a plurality of microneedles 121. FIG. 11B depicts the microneedle patch 120 after insertion of the plurality of microneedles 121 into the skin 100. After insertion, a portion of the plurality of microneedles 121 rests in the superficial dermis 112. After the removal of the microneedle patch 120 from the skin sample 100, the skin sample 100, as depicted at FIG. 11C, includes a plurality of apertures 130. FIG. 11D depicts an apparatus 140 placed on the skin sample 100 to apply vacuum to the plurality of apertures 130 in order to drawn ISF from the plurality of apertures 130.

The acceptability of the method of this example was analyzed by studying skin tolerability, pain, and the patients' opinions. The utility of the method of this example also was analyzed by comparing the MN results against ISF collection from suction blisters and plasma collection by venipuncture. ISF collected using the MNs of this example was analyzed for biomarkers of clinical interest and/or unique to dermal ISF. This example also includes a comparison of the pharmacokinetics of a model biomarker in ISF versus plasma.

ISF sampling through skin using the MN patches of Example 1 was a two-step process: MN patches were applied to create micropores in the skin followed by the application of vacuum to draw out ISF through the micropores.

The site of MN patch application on the patient's forearm was disinfected using an alcohol swab (BD Alcohol Swab, BD, Franklin Lakes, NJ), and an area of about 50 $mm^2$ was marked with a pen. The investigator inserted a patch that included a five-MN planar array at the site and then removed it immediately. This process was rapidly repeated 20 times per site to create an array of 100 micropores at each site. It is possible, however, to use a single patch that includes, for example, 100 MNs inserted simultaneously.

Vacuum was applied using a Negative Pressure Cutaneous Suction System (NP-2, Electronic Divestities, Ridge Road, Finksburg, MD). The vacuum chamber was aligned with skin sites that received MN treatment. Each chamber had a bottom plate with up to five 8 mm diameter orifices through which vacuum contacted the skin. Vacuum as low as −50 kPa (gauge) was applied for up to 20 minutes. In this example, vacuum was slowly ramped down to about −50 kPa over the course of about 3 minutes. After stopping the vacuum and removing the orifice plate, clear fluid on the skin surface was collected using sterile medical gauze (Ultrapure non-woven sponges, CrossTex International, Lawrenceville, GA) and stored in a low protein-binding tube (Eppendorf North America, Westbury, NY) prior to being placed in a −80° C. freezer.

Two optimization studies were performed on a cohort of 3 male and 2 female human participants of ages of 28±4 years.

In the first study, patches containing MNs having lengths of 250 μm, 450 μm or 650 μm were applied to skin as described above to create 100 micropores at each skin site. Vacuum was then applied at −17 kPa, −34 kPa or −50 kPa (gauge). The skin was observed for up to 5 minutes to determine if bleeding occurred.

In the second study, patches containing MNs having lengths of 250 μm were applied to the skin to create 100 micropores at each skin site. Then, (i) vacuum of −17 kPa (gauge) was applied immediately after MN patch treatment, or (ii) vacuum of −50 kPa (gauge) was applied 0, 5, or 10 minutes after MN patch treatment, or (iii) vacuum was slowly ramped down from 0 to −50 kPa (gauge) over the course of about 3 minutes after MN patch treatment. If bleeding occurred, vacuum was stopped at 15 seconds, and any fluid on the skin surface was collected. In the absence of bleeding, fluid was collected after 20 minutes of vacuum application.

Figure 12:
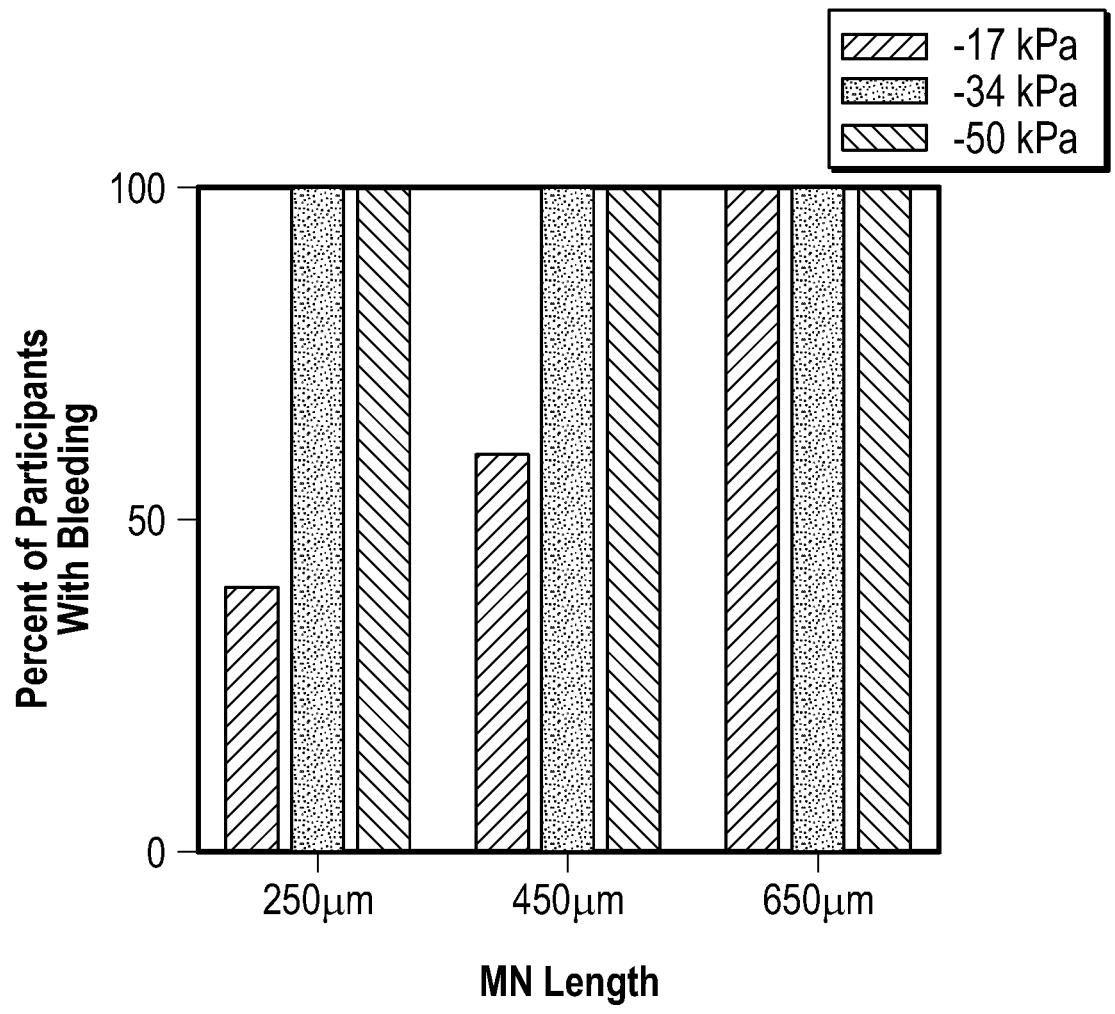
FIG. 12 depicts the effect of microneedle length and vacuum pressure on bleeding in one embodiment of a method described herein.
Figure 13A:
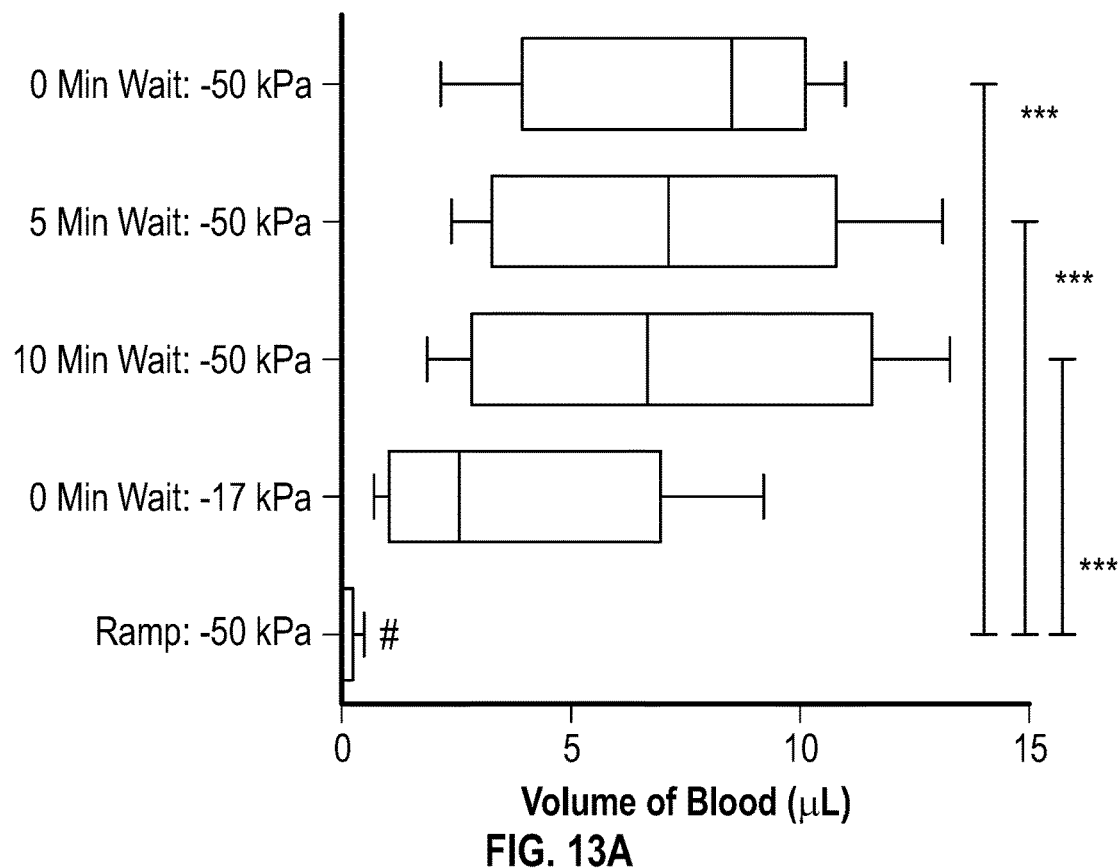
FIG. 13A depicts the effect of the timing of vacuum application on bleeding in one embodiment of a method described herein.
Figure 13B:
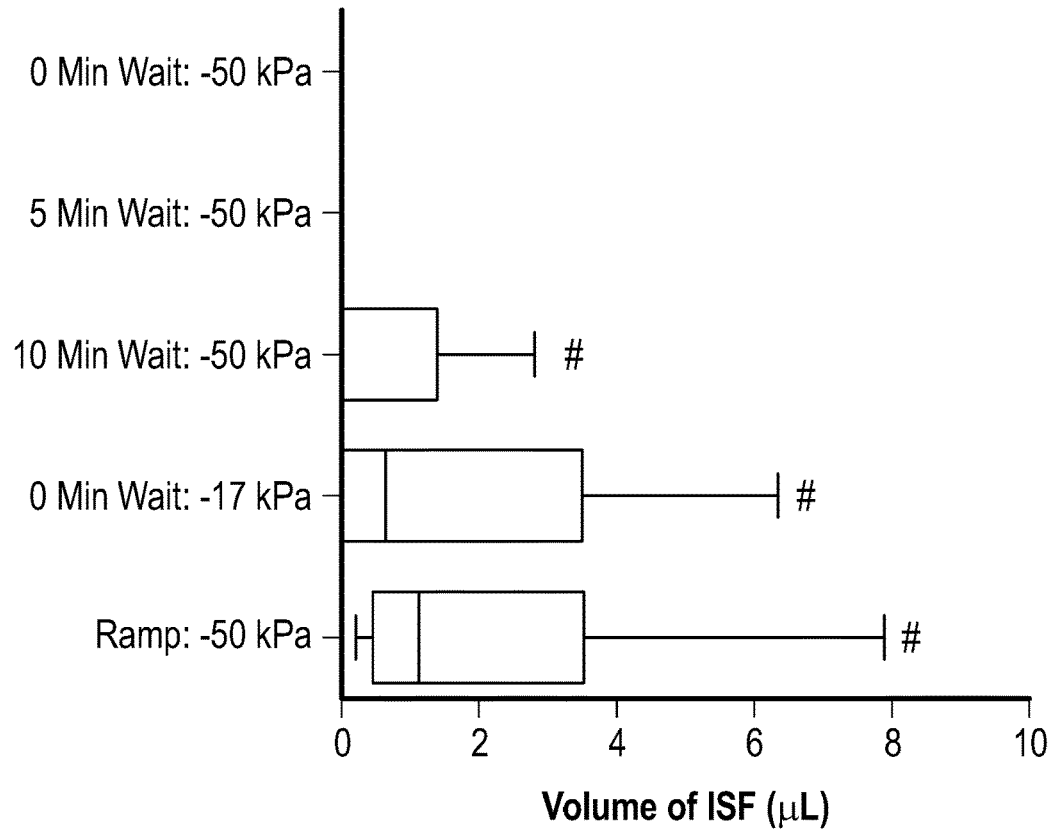
FIG. 13B depicts the effect of the timing of vacuum application on ISF sampling in one embodiment of a method described herein.

In this example, the parameters that could affect bleeding were studied. Since skin is highly vascularized, the application of vacuum to skin punctured with MNs collected blood, in some instances, along with ISF. The effect of several parameters, therefore, was studied, including the effect of MN length, vacuum pressure, and timing of vacuum application in human participants. It was discovered that in the method of this example, reducing MN length from 650 μm to 250 μm reduced the likelihood of blood contamination upon vacuum application, as depicted at FIG. 12. Delaying vacuum application for up to 10 minutes after MN application did not affect bleeding in this example, but reducing vacuum pressure from −50 kPa to −17 kPa reduced bleeding, as depicted at FIG. 13A. Bleeding, in this example, was eliminated by slowly increasing vacuum to −50 kPa over the course of about 3 minutes after puncture with 250 μm MNs. The effect of the timing of vacuum application on bleeding and ISF sampling from the skin of 5 human participants is depicted at FIG. 13A and FIG. 13B, respectively. FIG. 13A depicts the volume of blood collected from skin within 15 seconds, FIG. 13B depicts the volume of ISF collected after vacuum application at −17 kPa or −50 kPa (gauge) either 0, 5 or 10 minutes after MN patch treatment. The "#" symbol indicates that blood was collected over 20 minutes (not just 15 seconds). The MN patches includes 250 μm long MNs that were used to generate 100 micropores. Box plots show $5^{th}$, $25^{th}$, $50^{th}$, $75^{th}$ and $95^{th}$ percentiles (n=5 replicates).

In view of these tests, the ISF sampling method of this example was configured to permit reliable collection of 1-10 μL of pure ISF from skin within 20 min, in a manner that minimized contamination with blood. The method of this example collected 2.3±2.6 μL clear ISF with no visual traces of blood within 20 minutes.

In this example, ISF was collected from 21 human participants including 10 males and 11 females aged 28±7 years. The procedure involved covering skin with a transparent film skin dressing (Tegaderm) containing 1-cm diameter openings where MN treatment was performed. Insertion and removal of MNs was well tolerated with faint visual evidence of micropores in skin. After administration of vacuum over the micropores for up to 20 minutes, the skin appearance was largely unchanged. Closer examination revealed droplets of ISF on the skin surface. Collection and examination of ISF showed it was a clear fluid, with a slight yellow tinge. One day later, there was generally no evidence of MN treatment, which indicated swift recovery of skin. Overall, ISF collection with the MN treatment of this example was a simple, minimally invasive, and relatively rapid method that was well tolerated by human participants.

For comparison, epidermis and dermis were separated to form ISF-filled suction blisters by applying vacuum at 40° C. for up to 1 hour. Draining the blister with a needle and syringe collected suction blister fluid (SBF), which was similar in appearance to ISF collected by MN. The comparative suction blister treatment caused local erythema and edema, which resolved within a few days, and, in some cases, induced prolonged skin pigmentation. Compared to MN treatment, suction blister treatment caused significantly more severe and longer-lived tissue trauma, was more cumbersome and time-consuming to perform, and produced ISF that likely includes artifacts due to tissue injury.

Although MN treatment did not induce apparent adverse effects to skin, histopathological analysis of skin biopsies from MN-treated hairless rats were carried out to further assess safety. Visual observation of skin after MN treatment showed slight swelling and erythema that resolved within a few hours. Examination of histopathological tissue sections by a board-certified dermatopathologist revealed minor focal inflammation at 4 hours after MN treatment that resolved within 24 hours.

Participants reported that pain during MN treatment was not different from suction blister or venipuncture, while suction blister sampling was significantly more painful than venipuncture. Ongoing pain after the procedure was reported by almost half of participants with suction blisters, but only by 5% after MN treatment. Tenderness was reported by 90% of participants at suction blister sites, but only 24% after MN treatment. Erythema was seen at 89% of suction blister sites, split between grade 1 and grade 2 in severity, whereas erythema at MN sites was less common (76%) and less severe (all grade 1). Localized swelling observed at 40% of suction blister sites and 57% of MN sites was always contained within the 1-cm$^2$ sites of vacuum application. Overall, MN treatment of Example 2 was well tolerated and generally had fewer adverse effects compared to suction blisters.

Blood Collection by Venipuncture: Venipuncture samples were taken from the forearm, collected into K3 EDTA tubes (BD Vacutainer Blood Collection Tube) and spun down at 1,400 relative centrifugal force (rcf) for 15 minutes (Eppendorf centrifuge 5702 RH, Eppendorf AG, Hamburg, Germany) to separate the plasma, which was collected in Protein lo-bind tubes (Eppendorf Lo-bind). Capillary blood samples were collected by lancet puncture on the fingertip (Unistik 2 Normal, Owen Mumford, Marietta, GA) and collected into heparin mini collection tubes (MiniCollect Lithium Heparin with Gel Separator, Gernier Bio One North America, Monroe, NC). The tubes were spun down at 1,400 rcf for 15 minutes (Eppendorf centrifuge 5702 RH) to separate the plasma, which was collected in Protein lo-bind tubes. All plasma samples were stored at −80° C. until analysis.

Suction blister fluid (SBF) collection from suction blisters: SBF was collected by the method developed by Kiistala, U., The Journal of Investigative Dermatology, 1968. 15(2): p. 129-137. Suction blisters were created on the thigh of each participant at a site easily accessible when wearing shorts and one that could be discretely covered for cosmetic reasons until suction blisters have fully healed. The skin site was first thoroughly disinfected with an alcohol swab. Suction was then applied using a Negative Pressure Cutaneous Suction System (Powell, L., *Negative pressure cutaneous suction system, in Electronic Diversities*, Finksburg MD. p. 1-5). Sterile orifice plates with 3 holes (8 mm diameter each) along with the suction cup were firmly attached to the skin using straps. Suction at −50 to −70 kPa (gauge) was applied at 40° C. for about 45 minutes until blister formation was complete. Fluid from intact and hemoglobin-free blisters was collected using a Micro-Fine syringe (BD Biosciences, San Jose, CA) and stored in Protein lo-bind Eppendorf tubes at −80° C.

Skin Surface Swab: Sterile medical gauze wetted with sterile USP-grade water was rubbed against the skin for 30 seconds and stored in Protein lo-bind Eppendorf tubes at −80° C.

Histopathological Analysis of Skin: Six hairless rats (6 months old, female, Charles River Laboratories, Wilmington, MA) each received three treatments. MN patch plus vacuum, MN patch only, and vacuum only. For MN patch application, a patch including five 250 μm-long MNs was applied repeatedly on the back to create an array of 100 micropores as described above. For vacuum application, vacuum was applied at −50 kPa (gauge) for 10 min. At 4 or 24 hours post-treatment, animals were euthanized by carbon dioxide gas asphyxiation and the treated skin was collected using an 6-mm biopsy punch along with untreated skin controls. After fixation in formalin, skin was prepared for histopathological analysis by sectioning and staining with hematoxylin and eosin followed by microscopic examination by a dermatopathologist.

Pain: To assess pain, participants were asked if a procedures was painful. If yes, they were asked to rate the pain on a Visual Analog Scale of 1 (no pain) to 10 (worst possible pain).

Skin Tolerability: Skin tolerability was measured using a quantitative skin scoring scale adapted for MN patches using established guidelines for clinical studies (Arya, J., et al., *Tolerability, usability and acceptability of dissolving microneedle patch administration in human subjects*. Biomaterials, 2017. 128: p. 1-7). Each skin site was scored for pain, tenderness, erythema (size and intensity) and swelling on a grading scale of 0 to 4. Pain and tenderness were scored based on the participant's response, whereas erythema and swelling were measured by the investigator. Participants were asked if they felt pain at the skin site at various times after skin treatment (e.g., MN patch administration) was complete. This pain was assessed separately from the pain associated with MN patch application. Tenderness was defined as any pain felt at the skin site when the investigator gently touched it. Erythema size was measured using a ruler scale and intensity was measured by visual observation of the skin site. Swelling was measured by the investigator by gently moving her thumb over the skin site to identify any raised surfaces on the skin. The investigator recorded a numerical score for each of these tests and photographically imaged the skin at each time point.

Sensory Perceptions: Participants were asked if they felt the following sensory perceptions during skin treatment (e.g., MN patch administration): pain, burning, stinging, tingling, itching, warmth and tightness. If the participant replied yes to any of the above sensations, the participant was further asked to rate those sensations as very slight, slight, moderate, strong or very strong, and was also asked if those sensations felt comfortable.

Determination of Blood Volume: Collected blood volume was measured by determining hemoglobin content in blood samples using a Triton/NaOH-based method (Hemoglobin Assay Kit, Sigma-Aldrich, St. Louis, MO). Hemoglobin content in a blood sample was normalized against hemoglobin content in the capillary blood of the same participant to obtain the amount of blood in each sample.

Determination of ISF Volume: Collected ISF volume was measured by determining sodium ion concentration in the collected fluid. Sodium ion concentration was determined using a sodium ion sensitive electrode (perfectION comb NA, Mettler Toledo Inc., Columbus, OH). The sodium ion content measured in the samples was normalized against a standard sodium ion concentration in ISF of 135 mmol/L to determine ISF volume. This method relied on the expectation that sodium ion concentration is constant in the body fluids of heathy participants (Sieg, A., R. H. Guy, and M. B. Delgado-Charro, *Noninvasive glucose monitoring by reverse iontophoresis in vivo: application of the internal standard concept*. Clin Chem, 2004. 50(8): p. 1383-90).

Example 3—Analysis of Biomarkers

In this example, ISF, SBF and plasma were collected using the methods of Example 2 from 20 human participants, and more than 10,000 features were found by LC-MS analysis, more than two-thirds of which were common to ISF and plasma. This indicated that ISF may be a surrogate for plasma, at least in some cases. More features (14%) were determined to be unique to ISF by using a C18 column compared to 1% using HILIC. It was possible that the skin contained more lipophilic molecules that were captured more effectively by C18 compared to HILIC. Altogether, the data indicated that biomarkers in ISF derive mostly from plasma, there were also biomarkers specific to skin, many of which probably result from metabolic processes in the tissue.

Using a targeted approach to detect clinically valuable biomarkers, it was found that most biomarkers detected in plasma were also in ISF, further supporting the conclusion that ISF may be a substitute for blood for diagnostic tests, such as those test that measure cholesterol, urea, creatinine, glucose, etc. Biomarkers found uniquely in skin included nucleosides associated with RNA, such as nebularine, hypoxanthine (biomarker for cardiac ischemia), and inosine (cardiac biomarker and neuroprotective agent for possible treatment of Parkinson's disease and multiple sclerosis). Also found were porphobilinogenis (currently used to detect porphyria in urine-based tests) and arginosuccinic acid (biomarker for urea cycle disorders). Several dermatologically relevant biomarkers like sphingosine (structural component of skin with signaling functionality) and diethanolamine (carcinogen found in skin products) were also detected in ISF. Additionally, exogenous molecules probably from environmental exposures were found, such as bromocholoroacetic acid (possible carcinogen associated with water purification), tributylin chloride (reproductive toxin found in paint), and barbaloin (found in cosmetic formulations).

The analyses of this example also compared biomarkers in ISF and SBF, and 21% were found only in ISF, and 10% were found only in SFB, probably due to differences in sampling methods. For example, 2-arachidonoylglycerol and corticosterone (biomarkers associated with inflammation) were found only in SBF, which may represent a response to tissue damage during suction blister generation. In contrast, Leukotrine B4 (biomarker for vasodilation) was found in ISF samples, possibly because MN application can cause mild erythema.

The following table lists several categories of markers that were found uniquely or elevated in ISF, relative to plasma and SBF.

Truncated Listing of Categories of Biomarkers and Biomarkers Found Uniquely or at Elevated Levels in ISF

| Metabolite | Significance | Prevalence of biomarker[§] | | |
| --- | --- | --- | --- | --- |
| | | Plasma | ISF | SBF |
| Amino acid derivatives and metabolism | | | | |
| Urocanic acid | photocarcinogenesis, UV chromophore | 0% | 100% | 100% |
| 4-Guanidino-butanoic acid | biomarker of cirrhosis | 10% | 100% | 90% |
| Succinylhomo-serine | biomarker of H1N1-induced pneumonia in mouse model | 0% | 95% | 75% |

Truncated Listing of Categories of Biomarkers and Biomarkers
Found Uniquely or at Elevated Levels in ISF

| | | Prevalence of biomarker[§] | | |
|---|---|---|---|---|
| Metabolite | Significance | Plasma | ISF | SBF |
| Vitamins and cofactors | | | | |
| Lumichrome | vitamin B5 derivative | 5% | 100% | 10% |
| Ergocalciferol | vitamin D2 | 5% | 100% | 0% |
| Tocopherol | form of vitamin E, micronutrient | 5% | 100% | 0% |
| Nucleotide-related metabolism | | | | |
| N6-(delta2-Isopentenyl)-adenine | plant growth regulator | 0% | 100% | 85% |
| Nebularine | nucleoside | 0% | 100% | 20% |
| Cytidine monophosphate (CMP) | biomarker of several cancers | 10% | 95% | 100% |
| Cytidine | biomarker of kidney function, several cancers | 5% | 95% | 70% |
| Inosine | biomarker of cardiac disease | 5% | 80% | 100% |
| 3-Methyladenine | biomarker of DNA damage from chemotherapy | 10% | 75% | 0% |
| Nicotinamide ribotide | agent for diabetes treatment, neuroprotection, anti-aging | 0% | 50% | 100% |
| Neurotransmitters/indoles | | | | |
| N-Methyltryptamine | psychoactive alkaloid | 5% | 70% | 5% |
| Amines | | | | |
| Sphingosine* | signaling molecule in skin | 10% | 100% | 50% |
| Leukotrienes | | | | |
| 20-COOH-Leukotriene B4* | involved in vasodilation | 5% | 55% | 5% |
| Carbohydrate Metabolism | | | | |
| Stachyose | found in human milk, soy milk | 10% | 100% | 60% |
| Gulonolactone | biomarker of oxidative stress after exercise | 0% | 100% | 10% |
| Fructose 6-phosphate | fructose derivative | 0% | 85% | 100% |
| Rhamnose | biomarker of gut permeability | 10% | 65% | 25% |
| Organic acids | | | | |
| Oxalic acid | biomarker of sleep restriction | 0% | 90% | 30% |
| Phosphoenol-pyruvic acid | | 5% | 85% | 100% |
| Dietary/Xenobiotics | | | | |
| Diethanolamine* | cosmetic formulations, carcinogen | 5% | 100% | 60% |
| Cyclohexane-1,2-diol | cyclohexene oxide metabolite | 5% | 100% | 10% |
| Triethanolamine* | commonly used in skin care products | 0% | 90% | 0% |
| Methyl jasmonate | plant defense chemical | 0% | 85% | 0% |

[§]Prevalence among 20 samples; *Biomarker has dermatological significance.

As described in Example 2, ISF was collected from MN treatment, SBF from suction blisters, and plasma from venipuncture from the cohort of 21 participants, and, in this example, the biomarker compositions of the three fluids was compared. High-quality data were available for 20 participants from high-resolution metabolomics using liquid chromatography-mass spectrometry (LC-MS).

This analysis detected 10,338 features with hydrophilic interaction chromatography (HILIC), which was better suited for detecting lipophilic compounds, and 7,703 features with reverse-phase C18 chromatography, which was better suited for detecting polar compounds.

Figure 14A:
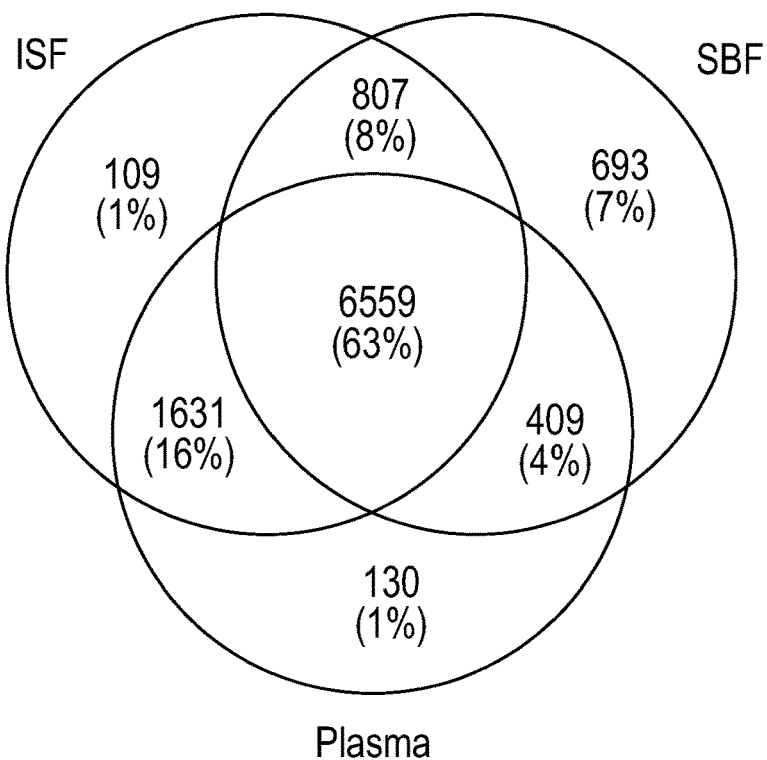
FIG. 14A and FIG. 14B are Venn diagrams showing the overlap of features in ISF from an embodiment of a method described herein, suction blister fluid, and plasma from venipuncture.
Figure 14B:
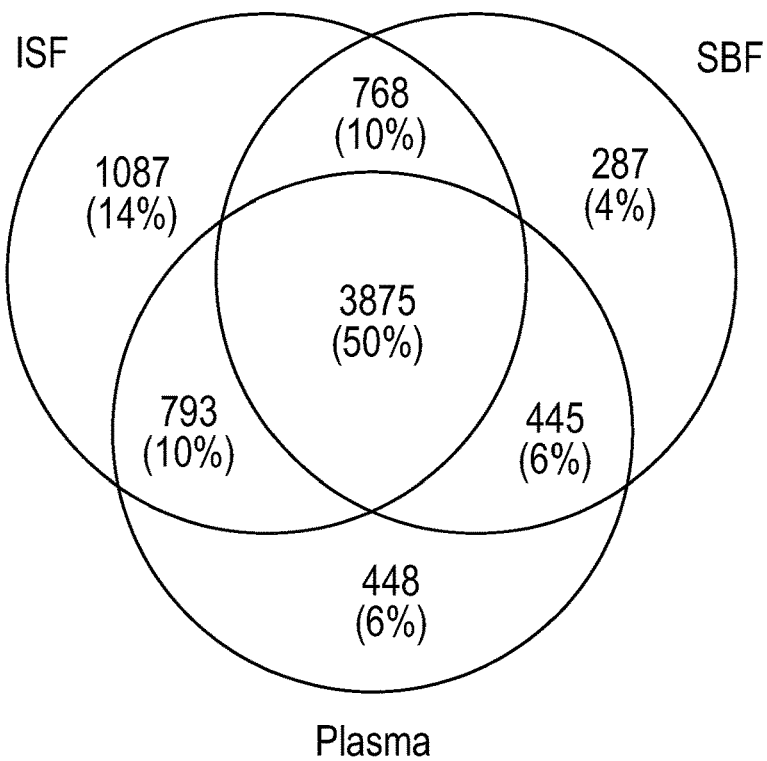

FIG. 14A and FIG. 14B are Venn diagrams showing the overlap of features in ISF from MN treatment, suction blister fluid, and plasma from venipuncture. Samples were analyzed using (FIG. 14A) hydrophilic interaction chromatography (HILIC), and (FIG. 14B) reverse-phase C18 liquid chromatography. After filtering, a total of 10,338 and 7,703 features were detected with HILIC and C18, respectively. A feature was considered "present" in a fluid if the feature was detected in that fluid in more than 10% of samples (≥3 of 20 samples). FIG. 14A and FIG. 14B are not drawn to scale.

Among features found in HILIC, 63% were common to all three body fluids; 79% were common to plasma and ISF, which suggested that these metabolite measurements in ISF may be a surrogate for plasma; and 1% were unique to ISF, which suggested that these biomarkers can be uniquely assayed in ISF. Similar data were obtained from C18 chromatography, except 14% of features were unique to ISF, indicating that polar metabolites are more likely to be specifically found in ISF compared to lipophilic metabolites.

Comparing the 10,208 features found in ISF or SBF by HILIC, only 72% were common to both fluids, which demonstrated that ISF and SBF are not identical fluids, probably because of their different methods of sampling. To better interpret the differences between ISF and SBF, a swab was wiped across intact skin and analyzed for biomarkers. Because ISF was collected from the skin surface, it may have contained more epidermal and skin surface biomarkers than SBF. Consistent with this expectation, among the 1,740 features detected in ISF and absent from SBF, 58% were found in the skin wipe. Among the 1,102 features detected in SBF and absent from ISF, 65% were found in the skin wipe. However, it should also be noted that 70% of features detected in skin swabs were also found in plasma, which indicated that biomarkers found on the skin surface were not necessarily contaminants. Dermal and systemic biomarkers can be collected from the skin surface.

A targeted evaluation of 90 medically-relevant biomarkers in ISF, SBF, and plasma was performed. Of these, 68 were detected in at least one fluid. The following table shows a truncated list.

Prevalence of selected clinically relevant biomarkers in ISF, SBF, and plasma in matched samples from 20 human participants.

| | Prevalence of biomarker[†] | | |
|---|---|---|---|
| Biomarker | Plasma | ISF | SBF |
| Clinical Markers | | | |
| Cholesterol | 100% | 80% | 100% |
| Cortisol[§] | 100% | 30% | 80% |
| Creatinine | 100% | 100% | 100% |
| Homocysteine* | 20% | 55% | 55% |
| Urea | 100% | 100% | 100% |
| Glucose | 100% | 100% | 100% |
| Lactic acid* | 75% | 100% | 100% |
| Uric acid | 100% | 100% | 100% |
| Nucleotide-related Metabolism | | | |
| Hypoxanthine* | 0% | 80% | 100% |
| Xanthine* | 25% | 90% | 100% |

Prevalence of selected clinically relevant biomarkers in ISF, SBF, and plasma in matched samples from 20 human participants.

| Biomarker | Prevalence of biomarker[†] | | |
|---|---|---|---|
| | Plasma | ISF | SBF |
| Uridine | 100% | 100% | 100% |
| Vitamins and Cofactors | | | |
| Choline | 100% | 100% | 100% |
| Pantothenic acid (Vitamin B5) | 50% | 60% | 95% |
| Tetrahydrofolic acid* | 40% | 60% | 30% |
| Fatty Acid Metabolism | | | |
| Acetyl-carnitine[§] | 85% | 40% | 100% |
| Methyl-histidine[§] | 80% | 25% | 55% |
| Margaric acid* | 60% | 100% | 25% |
| Myristoleic acid | 85% | 100% | 45% |
| Palmitoleic acid | 90% | 100% | 55% |
| Stearic acid | 75% | 100% | 15% |
| Lipid Metabolism | | | |
| Sphingosine* | 10% | 100% | 50% |
| Leukotriene B4* | 50% | 100% | 50% |
| Respolvin E2 | 100% | 100% | 75% |
| Sterol Metabolism | | | |
| Deoxycholic acid[§] | 100% | 55% | 100% |
| Taurodeoxycholic acid[§] | 100% | 50% | 100% |

[†]Prevalence among 20 samples; [§]Biomarkers found with high frequency in plasma, but not in ISF; *Biomarkers found with high frequency in ISF, but not in plasma.

Most biomarkers (65%) were found with high frequency (presence in >18/20 samples) in all three fluids. Only 7% were frequently detected in plasma but not in ISF, which further emphasized that ISF contains many of the same biomarkers as plasma. In contrast, 11% of biomarkers were commonly found in ISF but not in plasma, which shows that ISF contains unique information.

In this example, biomarkers frequently found in ISF and generally absent in plasma were studied. Among 26 clinically-significant biomarkers (see the following table), 13 were not frequently present (i.e., in <50% of samples) in SBF, possibly because they were more prevalent in epidermis or skin surface. Ten of these 13 biomarkers were also commonly detected in the skin swab, supporting this hypothesis.

Prevalence of clinically relevant biomarkers detected uniquely or predominately in ISF compared to plasma in matched samples from 20 human participants.

| Biomarker | Medical significance | Prevalence of biomarker[§] | | |
|---|---|---|---|---|
| | | Plasma | ISF | SBF |
| Urocanic acid* | photocarcinogenesis, UV chromophore | 0% | 100% | 100% |
| N-Acetyl-D-glucosamine | micronutrient and drug, suppresses immune response, used to treat autoimmune diseases | 10% | 100% | 90% |
| Glycogen | energy storage | 10% | 100% | 60% |
| Diethanolamine* | cosmetic formulations, carcinogen | 5% | 100% | 60% |
| Sphingosine* | signaling molecule in skin | 10% | 100% | 50% |
| Nebularine | nucleoside | 0% | 100% | 20% |
| Tributyltin chloride | environmental pollutant used as antifouling agent, now largely banned | 10% | 100% | 10% |
| Citicoline | naturally occuring and also a nutrient supplement | 10% | 100% | 5% |
| Angiotensin (5-8) | angiotensin cascade modulates vasoconstriction | 5% | 100% | 5% |
| Pentadecanoic acid | marker for intake of milk fat | 10% | 100% | 0% |
| Gamma Tocopherol | form of vitamin E, micronutrient | 5% | 100% | 0% |
| Estradiol cypionate | natural form of estrogen - plays a role in reproduction, lactation | 0% | 100% | 0% |
| Arginosuccinic acid | biomarker for urea cycle disorder | 0% | 95% | 25% |
| Porphobilinogen | biomarker for acute porphyrias, currently urine based detection | 10% | 95% | 20% |
| $N^1,N^{12}$-Diacetylspermine | cancer biomarker | 0% | 95% | 15% |
| Triethanolamine* | commonly used in skin care products | 0% | 90% | 0% |
| Prostanoic acid | basic building block of prostaglandins | 5% | 85% | 55% |
| 6-Ethylchenodeoxycholic acid | bile acid derivative - reduces liver fat and fibrosis | 0% | 85% | 0% |
| Inosine | cardiac disease biomarker | 5% | 80% | 100% |
| Hypoxanthine | cardiac disease biomarker | 0% | 80% | 100% |
| Barbaloin | product of aloe vera - anti-inflammatory, cathartic properties | 0% | 70% | 10% |
| AMPA | neurological biomarker | 10% | 65% | 90% |
| Bromo-chloroacetic acid | present in brominated disinfected water and may cause adverse reproductive outcomes | 5% | 65% | 10% |
| 20-COOH-Leukotriene B4 | Involved in vasodilation | 5% | 55% | 5% |

[§]Prevalence among 20 samples; *Biomarker has dermatological significance.

It was found that 4 biomarkers were unique to SBF and not found in ISF (MN treatment was well tolerated), as depicted in the following table.

Metabolites identified unique to suction blister fluid (SBF) compared to microneedle (MN) patch derived ISF.

| Metabolite | Significance | Prevalence of biomarker[§] | | |
|---|---|---|---|---|
| | | Plasma | ISF | SBF |
| 11-Deoxycortisol (Reichstein's substance S) | cortisol precursor | 0% | 0% | 100% |
| Corticosterone | associated with stress and inflammation | 0% | 0% | 100% |
| S-Adenosylhomocysteine | biomarker of methylation status | 20% | 0% | 100% |
| 1-Oleoyl-rac-glycerol | | 5% | 0% | 90% |

[§]Prevalence among 20 samples

Of note in the foregoing table were 2-arachidonoylglycerol, an endocannabinoid produced in the epidermis that is involved in inflammatory regulation, and corticosterone, which activates in the skin in response to inflammation and other stressors. This indicated that SBF may contain artifacts that result from tissue trauma inherent to the suction blister sampling method.

High-resolution Metabolomics: Body fluids (ISF, SBF and plasma) were profiled using untargeted high-resolution metabolomics (HRM) with dual column/polarity liquid chromatography. Body fluid samples were diluted from 10 μL to 50 μL with distilled water, and 50 μL of diluted biofluid was added to 100 μL of acetonitrile and 2.5 μL of a mixture of 14 stable isotope standards. Samples were vortexed and allowed to equilibrate before proteins were precipitated by centrifuge. Samples were analyzed using hydrophilic interaction chromatography (HILIC;)(Bridge BEH Amide XP, 2.1 mm×50 mm×2.5 μm particle size, Waters, Milford, MA) in positive electrospray ionization mode, which better captured polar and semi-polar metabolites, and using reverse-phase C18 liquid chromatography (stainless steel column, 2.1 mm×50 mm×3 μm particle size, Higgins, Mountain View, CA) in negative-ion mode, which better captured fatty acids and other nonpolar metabolites. The dual chromatography setup interfaced to a high-resolution Fourier transform mass spectrometer (Q-Exactive HF, Thermo Scientific, Waltham, MA).

For each mode, analyses were performed with three technical replicates with an injection volume of 10 μL and mass-to-charge ratio (m/z) scan range of 85 to 1275. Body fluid types were analyzed in separate batches, with samples randomized within each fluid and distilled water blanks and pooled reference plasma (Q-Standard) samples analyzed prior to and following each batch to enable quality control. Data extraction was performed using apLCMS and xMSanalyzer as m/z features, with an m/z feature defined by m/z, retention time, and ion abundance. Triplicates were averaged prior to data analysis. A feature was defined as "present" in a sample if the ion intensity in the sample was greater than two times the mean ion intensity of that feature in the water blank samples. Data were filtered to remove features that were not present in ≥50% of samples in at least one body fluid.

Metabolite Identification: Clinically-relevant biomarkers were identified by comparing m/z features to base peaks generated from an in-house library of authentic reference standards run under similar assay conditions (Go, Y.-M., et al., *Reference standardization for mass spectrometry and high-resolution metabolomics applications to exposome research*. Toxicological Sciences 2015. 148(2): p. 531-543). Features were matched to metabolites in the library with a threshold of 10 ppm. Metabolites unique to ISF were identified with a custom dataset-wide deconvolution algorithm and Kyoto Encyclopedia of Genes and Genomes (KEGG) database matching (±10 ppm). High-confidence matches (metabolites with two or more correlated adducts and/or isotopes with similar retention times) were curated to remove unlikely peak groupings and/or biologically-implausible compounds. The presence of a metabolite was evaluated by examining the presence of the base peak in the feature grouping.

Example 4—Monitoring of Systemic Biomarker Pharmacokinetics in ISF and Plasma

The analyses of Example 3 compared the presence of biomarkers in different body fluids, but did not address dynamic relationships as biomarkers are transported between body compartments. Therefore, this example, the pharmacokinetics of a model biomarker (caffeine) in ISF compared to plasma was studied over an 8 hour period.

Caffeine is a small, hydrophilic molecule expected to transport and equilibrate easily between blood and ISF. Caffeine also can be safely and easily administered to human participants, and its pharmacokinetics are well known.

As explained in this example, the pharmacokinetics of caffeine (used as a safe model biomarker) in ISF closely matched plasma, likely because small, hydrophilic molecules like caffeine can rapidly equilibrate between blood and ISF across capillary walls (e.g., like glucose does). The tests of this example indicated the possibility of using ISF to monitor continuously biomarkers that are currently monitored in plasma, such as glucose, lactate, and urea, without indwelling, subcutaneous probes.

ISF and blood were sampled by MN treatment and fingerstick, respectively, in 9 healthy adult subjects who had abstained from caffeine consumption for 36 hours. Baseline caffeine concentrations in ISF and plasma in all participants were below 0.5 μg/mL, consistent with expected values >24 hours after caffeine abstention.

Figure 15A:
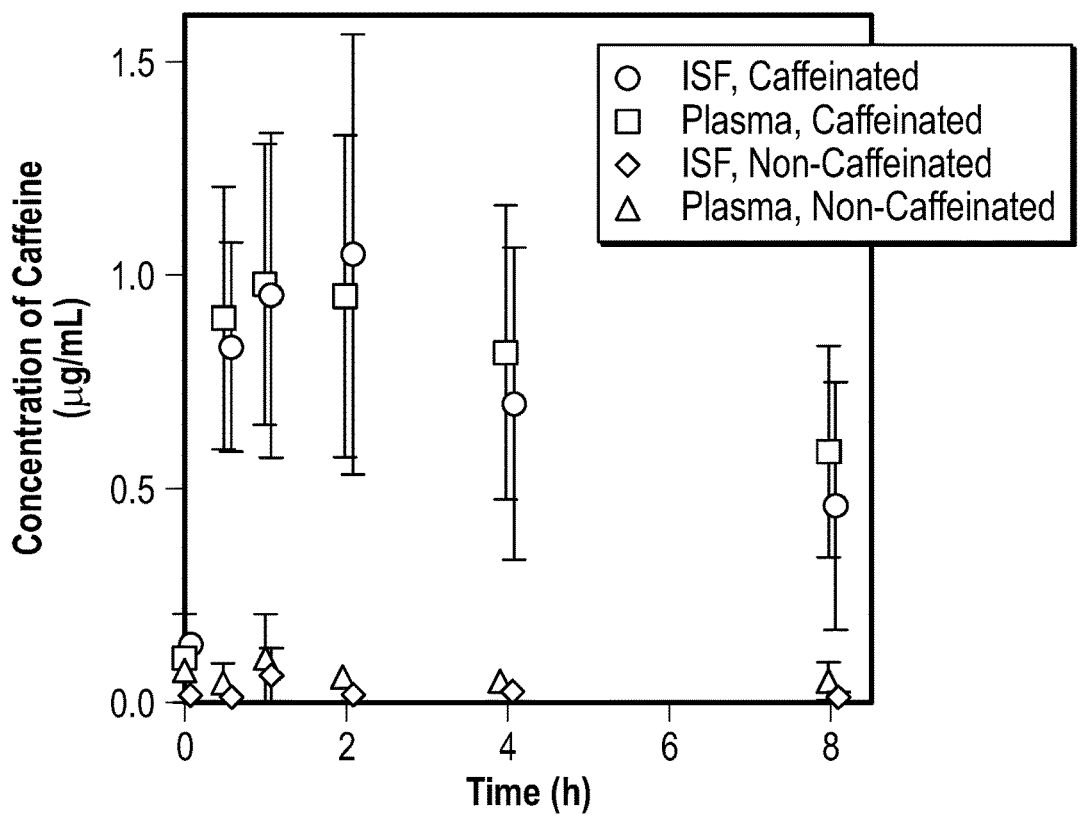
FIG. 15A depicts a concentration of caffeine in ISF and plasma for 8 hours after consumption of a caffeinated or caffeine-free DIET COKE® beverage.

After consuming a DIET COKE® beverage containing 43 mg of caffeine, caffeine concentrations in ISF and plasma increased for about 2 hours, and then decayed until the end of the 8 hour study, as depicted at FIG. 15A. FIG. 15A depicts the concentration of caffeine in ISF and plasma for 8 hours after consumption of caffeinated or caffeine-free DIET COKE® beverage.

Figure 15B:
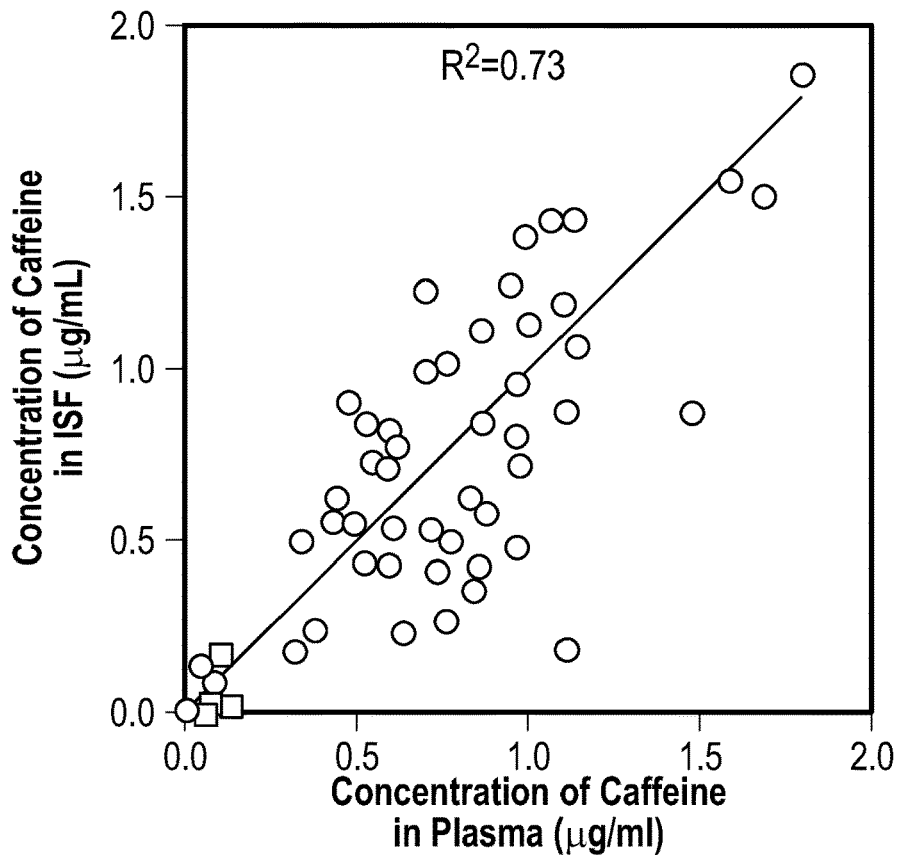
FIG. 15B depicts a correlation between caffeine concentrations in ISF compared to plasma.

There was a good correlation between caffeine in ISF and blood ($r^2$=0.73, FIG. 15B), with a mean ISF/blood ratio of 0.95±0.52. FIG. 15B depicts a correlation between caffeine concentrations in ISF compared to plasma. Caffeine pharmacokinetic parameters were not significantly different from each other (r>0.05) and were consistent with literature values (Collomp, K., et al., *Effects of moderate exercise on the pharmacokinetics of caffeine*. European Journal of Clinical Pharmacology, 1991. 40(3): p. 279-282).

| PK Parameter | Plasma | ISF |
|---|---|---|
| $C_{max}$ (μg/mL) | 1.06 (0.31) | 1.03 (0.42) |
| $T_{max}$ (h) | 1 (0.61) | 1 (0.61) |
| $AUC_{(0-8\,h)}$ (μg/mL · h) | 0.084 (0.031) | 0.148 (0.116) |
| $t_{1/2}$ (h) | 9.4 (3.9) | 7.5 (5.0) |
| CL (L/h) | 4.1 (2.9) | 4.7 (2.8) |

Pharmacokinetic parameters for caffeine concentrations in ISF and plasma. All data shown as mean (SD). See text for definition of symbols.

Three participants later drank caffeine-free DIET COKE® beverage, which resulted in caffeine concentrations in ISF and plasma below 0.25 μg/mL at all times (FIG. 15A).

Sensations reported by participants were similar for MN and fingerstick; participants reported very slight or slight pain and stinging. MN treatment induced mild erythema localized at the treatment sites that disappeared within a few days. No pain or swelling was reported. In contrast, fingerstick did not cause erythema but resulted in mild, transient tenderness.

Determination of Caffeine Concentration: The amount of caffeine in the collected ISF and plasma was measured using ELISA (Abraxis, Warminster, PA).

Calculation of Pharmacokinetic Parameters: $C_{max}$ was the highest caffeine concentration measured in ISF/plasma from each participant. $t_{max}$ was the time at which $C_{max}$ was measured. Area under the curve, $AUC_{(0-8h)}$, was calculated using the linear trapezoidal rule. To estimate half-life, $t_{1/2}$, an elimination rate constant ($k_e$) was obtained as the slope of the elimination curve on a semilog plot, and then $t_{1/2}$ was calculated as $t_{1/2}=\ln(2)/k_e$. To estimate clearance (CL), the apparent volume of distribution ($V_D$) was multiplied by $k_e$. $V_D$ was calculated as $D/C_0$ where D is the dose of caffeine (43 mg) and $C_0$ is the intercept of the elimination curve on the y axis.

Statistics: All statistical analysis was conducted using Graphpad Prism 7 Software (GraphPad Software, La Jolla, CA). Statistical differences were analyzed using Student's t-test. P-value of <0.05 was considered statistically significant.

Example 5—Monitoring Drug Pharmacokinetics and Immunologic Biomarkers in ISF In this example, an MN array was designed to collect ISF from skin. The MN array included an array of nine, 650 μm long MNs (to create micropores in the skin surface) extending from a backing layer (to facilitate handling), all made of stainless steel. Two strips of filter paper (to create a reservoir calibrated to collect ~2 μL of ISF in each strip) were each adhered to one side of the backing layer.

ISF collection was performed in this example by applying the MN array to the skin, thereby creating apertures ("micropores" in this example) and inducing flow of ISF out of the skin and into the paper reservoirs. MN insertion was repeated at a rate of ~1 insertion per second until 4 μL of ISF was collected, as indicated by fully wetted paper reservoirs. This process usually required 10-12 MN array insertions in this example, which was completed in less than 1 minute.

Figure 16A:
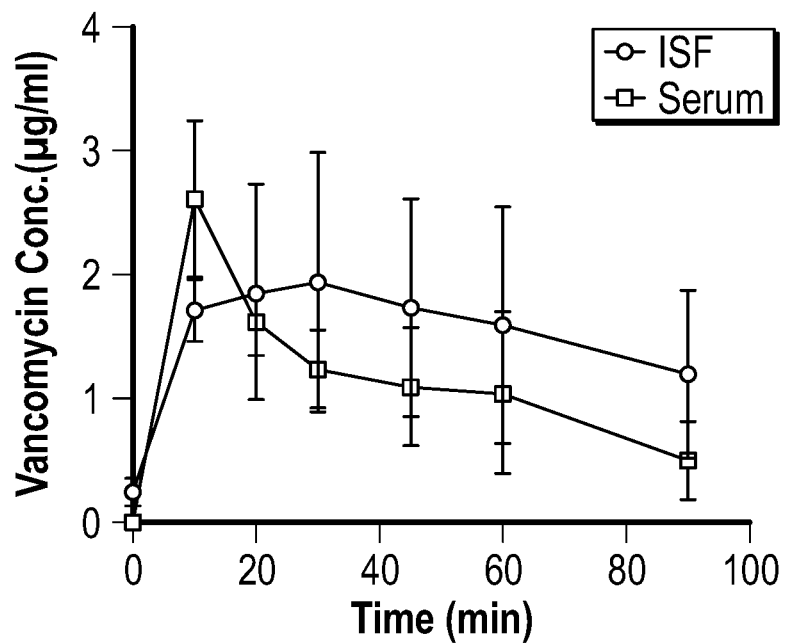
FIG. 16A depicts a pharmacokinetic profile of vancomycin concentration in ISF and serum samples collected from rats administered a 1 mg/kg bolus intravenous injection of vancomycin.

To assess a utility of ISF collection by MN array, the pharmacokinetics of vancomycin in ISF compared to the serum of rats was analyzed. For both ISF and serum, vancomycin concentration was rapidly increased according to the first measurement, which was made 10 minutes after bolus injection of vancomycin (FIG. 16A). After reaching a peak, the vancomycin concentration decayed, which followed the expected pharmacokinetic curve for this drug. Plotting paired individual ISF and serum drug levels yielded a roughly linear correlation with a slope of 0.75±0.06 (R2=0.40), indicating a generally higher vancomycin concentration in ISF compared to serum.

Figure 16B:
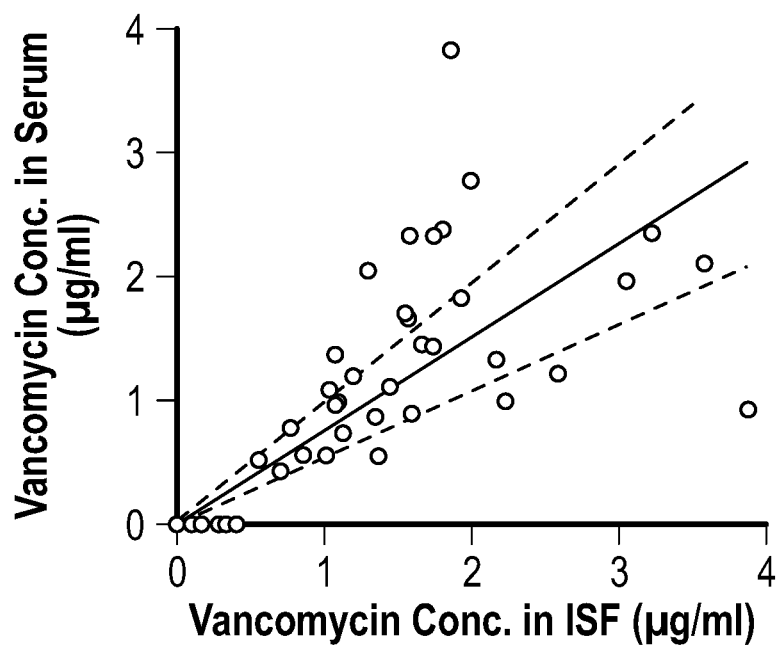
FIG. 16B depicts a correlation between vancomycin concentration in paired serum and ISF samples.

A one-way ANOVA analysis of the pharmacokinetic profiles of each rat showed no statistically significant difference between ISF and serum concentrations (p≥0.15) (FIG. 16B). Pharmacokinetic analysis showed that the average peak vancomycin concentration ($C_{max}$) and area under the curve (AUC) were not significantly different in ISF and serum (Student's t-test, p>0.8). A ~17 minute delay in time to peak vancomycin concentration ($T_{max}$) in ISF compared to serum was statistically significant (Student's t-test, p<0.05). This was consistent with prior literature, which reported correlation of vancomycin levels in ISF and blood and a delayed time for equilibration of vancomycin levels between ISF and blood.

In this example, each rat had ISF collected seven times over the course of 90 min (i.e., a total of 42 ISF collections among the six rats in the study). Each ISF collection was done at a different skin site.

These ISF collection procedures, which included insertion of MNs into the skin up to 12 times each, were well tolerated, with only very mild erythema and edema seen at the site of ISF collection. There were no other notable effects of the ISF collection procedure on the animals.

FIG. 16A depicts a pharmacokinetic profile of vancomycin concentration in ISF and serum samples collected from rats administered a 1 mg/kg bolus intravenous injection of vancomycin. Data points show mean±standard deviation (SD) (n=6 rats). FIG. 16B depicts a correlation between vancomycin concentration in paired serum and ISF samples (r=0.61, p<0.005, Pearson's correlation coefficient test). Dashed lines represent ±30% of the slope of the linear regression line (shown as solid black line), which are included as a visual guide. Data are the same as shown in FIG. 16A.

| Comparison of AUC, Cmax and Tmax values of vancomycin pharmacokinetics between ISF and serum | | | |
|---|---|---|---|
| Pharmacokinetic parameter[1] | ISF | Serum | Ratio (ISF:serum) |
| AUC (μg · min/ml) | 138 ± 43 | 106 ± 25 | 1.3 ± 0.2 |
| $C_{max}$ (μg/ml) | 2.5 ± 1 | 2.6 ± 0.6 | 0.9 ± 0.2 |
| $T_{max}$ (min) | 26.6 ± 16* | 10 ± 0 | 2.7 ± 1.6 |

[1]Data are presented as mean ± SD (n = 6 rats). AUC, area under the concentration-time curve. $C_{max}$, maximum concentration. $T_{max}$, time required to reach maximum concentration.
Asterisk (*) denotes parameter with statistically significant difference (p < 0.05) between ISF and the companion serum value.

Also assessed in this example was the utility of ISF collection by MN array in detection of anti-polio IgG responses in rats immunized with trivalent inactivated polio vaccine. Anti-polio IgG titers were negligible before and one week after vaccination. Three and four weeks after vaccination, IgG titer in both ISF and serum increased dramatically, but titers in ISF were about 23% lower than in serum (Student's t-test, p<0.03). Plotting paired individual ISF and serum IgG titers yielded a linear correlation with a slope of 1.27±0.09 (R2=0.81), which indicated a generally lower IgG titer in ISF compared to serum.

Figure 17A:
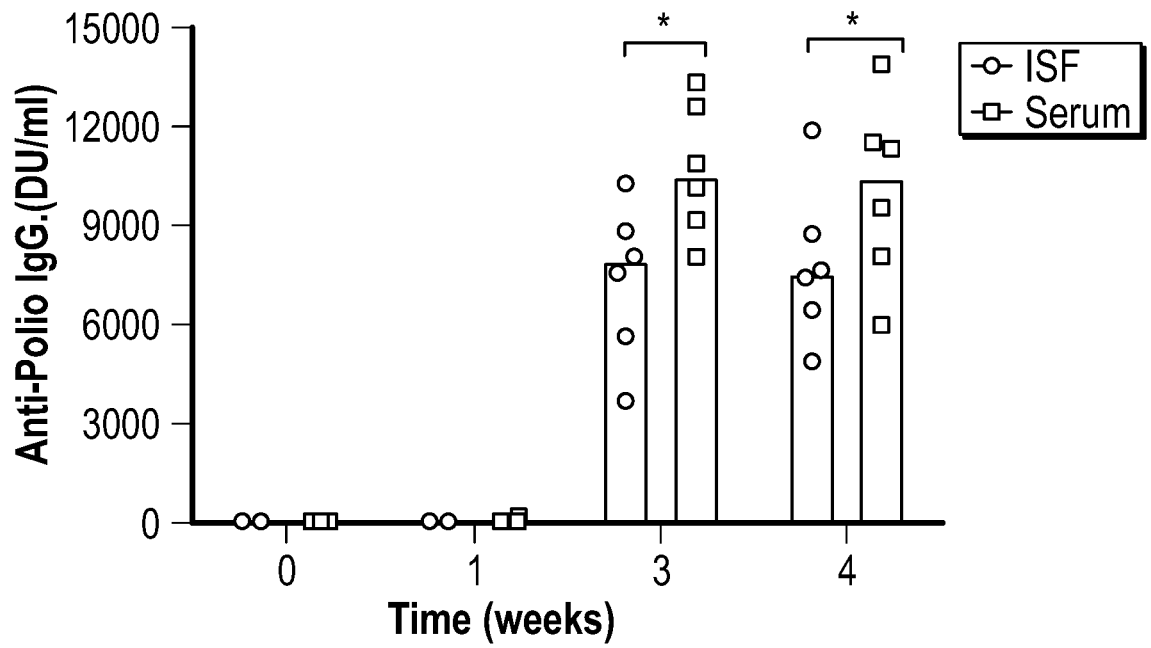
FIG. 17A and FIG. 17B depict anti-polio IgG responses to inactivated polio vaccination in rats.
Figure 17B:
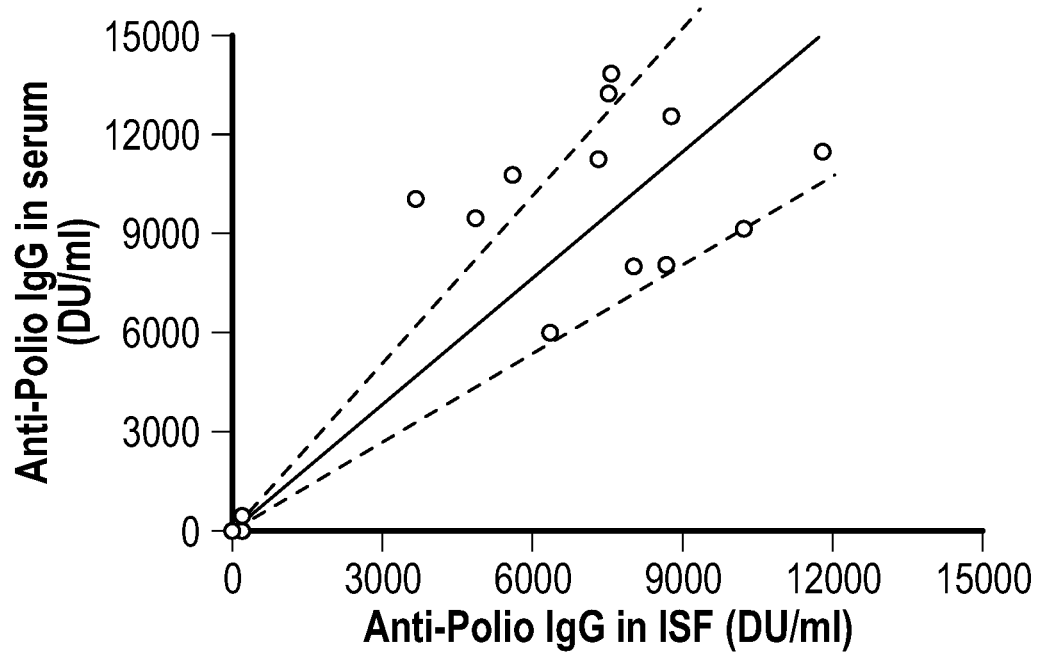

FIG. 17A and FIG. 17B depict anti-polio IgG responses to inactivated polio vaccination in rats. Specifically, FIG. 17A depicts anti-polio IgG titers determined by ELISA in ISF and serum samples collected before and 1, 3 and 4 weeks after vaccination with trivalent IPV by intramuscular injection. Each data point represents a single animal while the bars represents the median values of each group (n=6 rats). Asterisk (*) represents a significant difference (Student's t-test, p<0.03). FIG. 17B depicts a correlation between anti-polio IgG titers in paired serum and ISF samples (r=0.90, p<0.005, Pearson's correlation coefficient test). Dotted lines represent ±30% of the slope of the linear regression line (shown as solid black line), which are included as a visual guide. Data are the same as shown in FIG. 17A.

After observing the anti-polio IgG response in ISF, further analysis was performed to detect polio-specific neutralizing antibody responses by collecting ISF and companion blood samples after vaccinating the rats with a booster dose of trivalent inactivated polio vaccine. Before vaccination, neutralizing antibody titers in ISF and serum samples for all three serotypes were below the limit of detection. One and two weeks after vaccination, neutralizing antibody titers increased in both ISF and serum, but titers in ISF were about 30% lower than in serum (Student's t-test, p<0.01). This rapid increase of titer within one week was expected because responses to booster vaccination are typically seen on this time scale. Paired individual ISF and serum titers were linearly correlated with a slope of 1.36±0.07 ($R^2$=0.79), 1.41±0.06 ($R^2$=0.78) and 1.36±0.06 ($R^2$=0.82) for IPV types 1, 2 and 3, respectively, indicating a generally lower neutralizing antibody titer in ISF compared to serum.

Figure 18A:
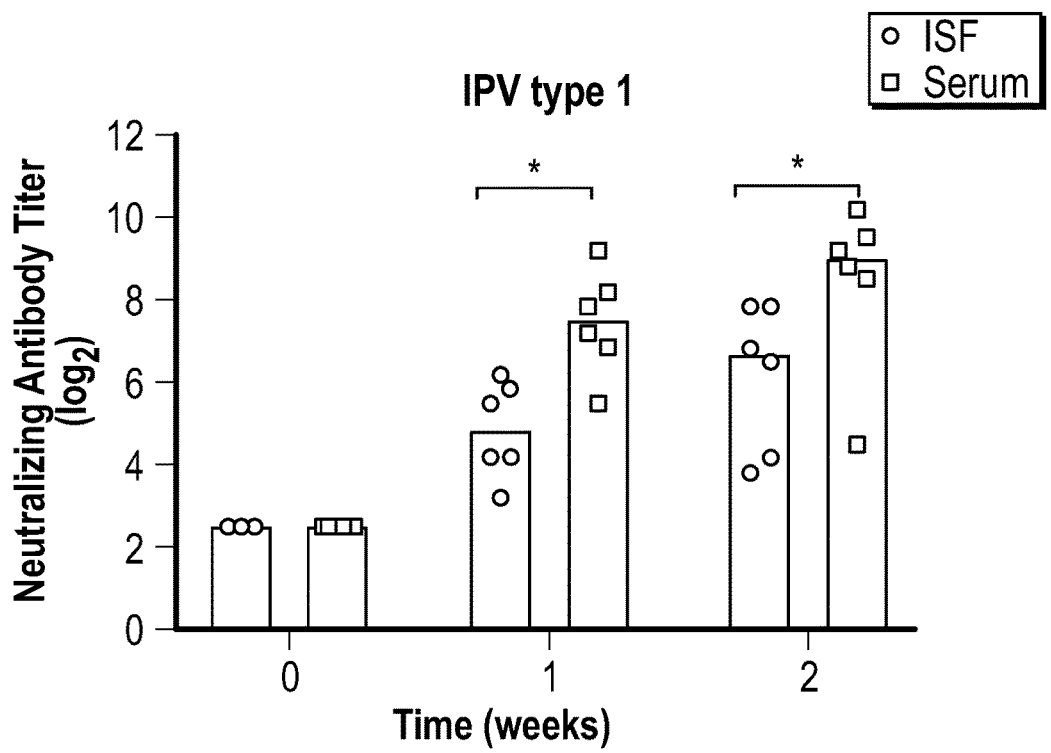
FIGS. 18A-C depict neutralizing antibody titers to (FIG. 18A) IPV type 1, (FIG. 18B) IPV type 2, and (FIG. 18C) IPV type 3 in ISF and serum samples collected before and 1 and 2 weeks after administration of a booster dose of trivalent IPV by intramuscular injection in rats.
Figure 18B:
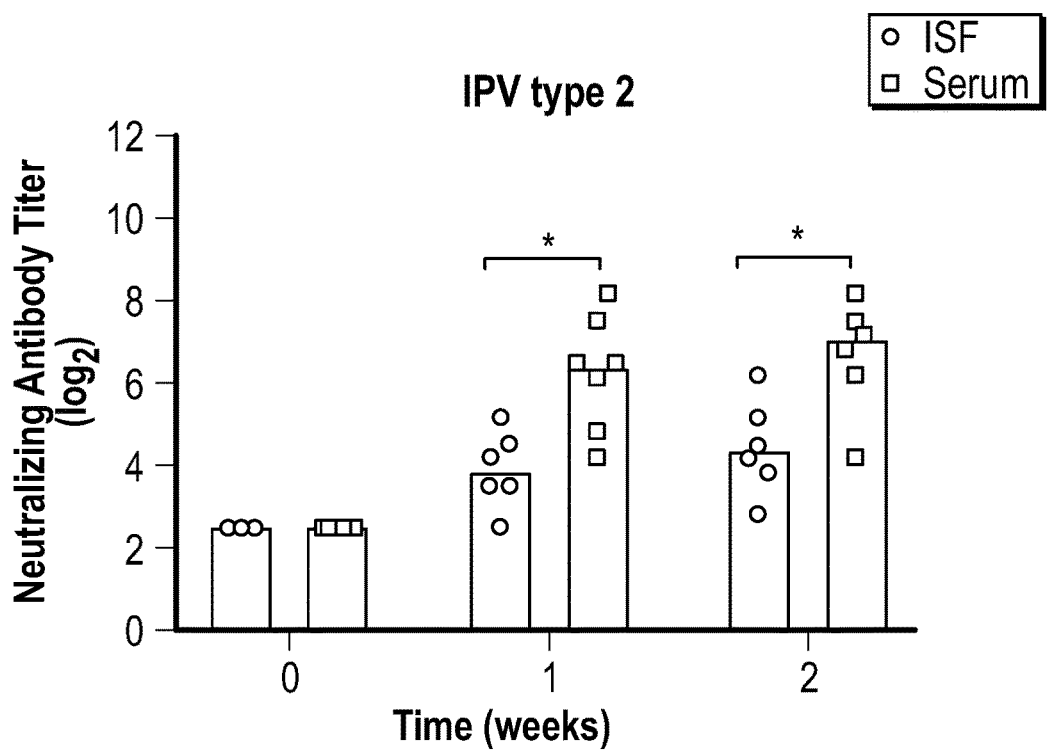
Figure 18C:
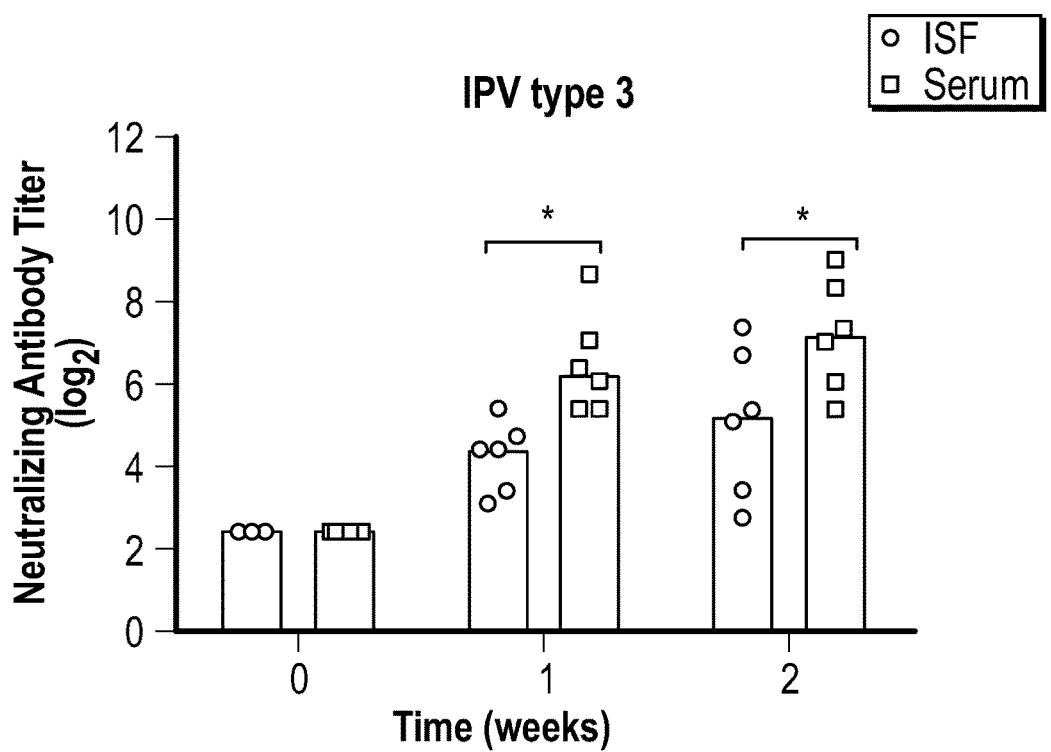
Figure 18D:
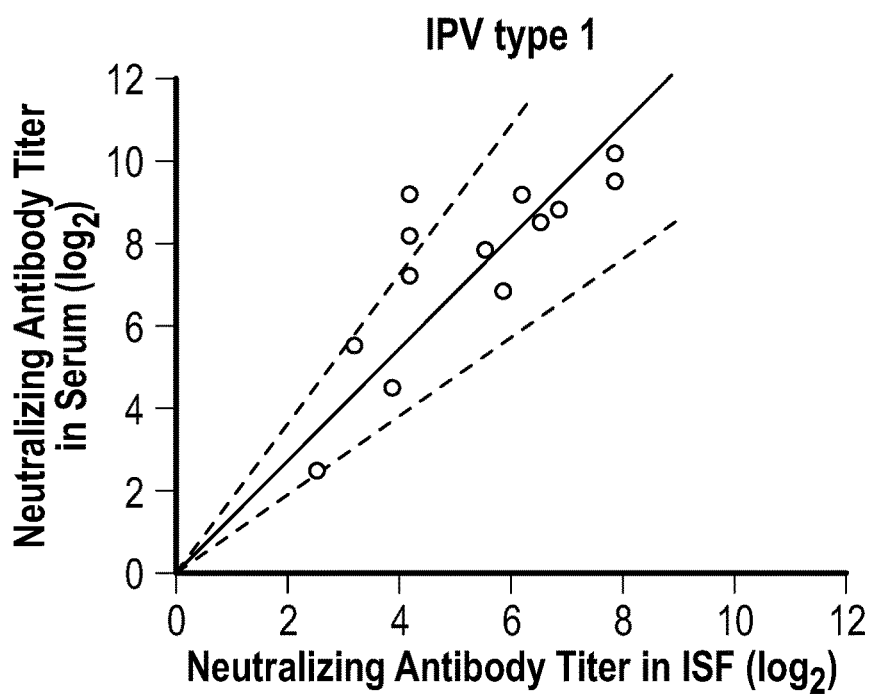
FIG. 18D-18F depict a correlation between neutralizing antibody titers in paired serum and ISF samples.
Figure 18E:
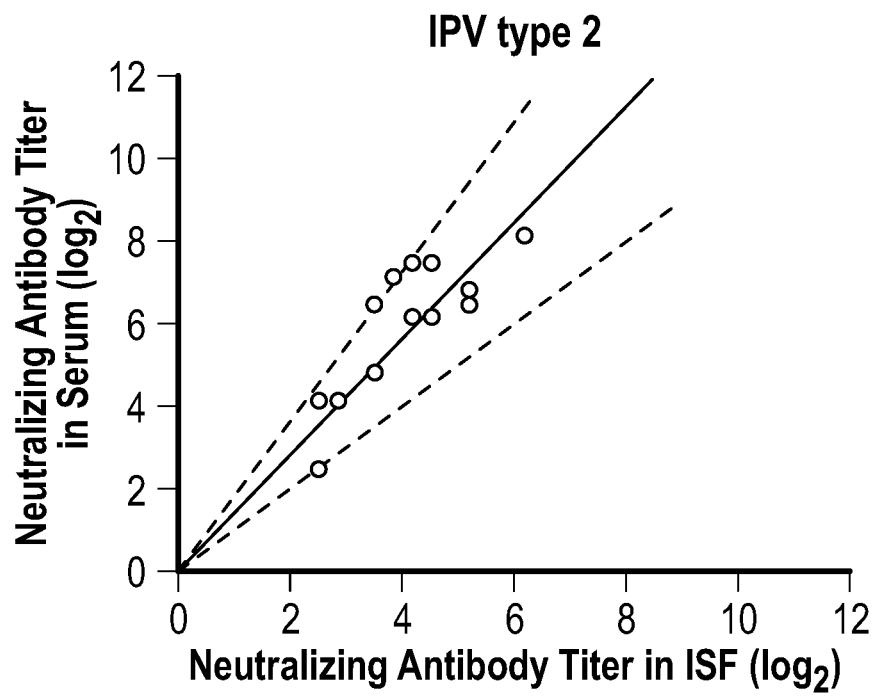
Figure 18F:
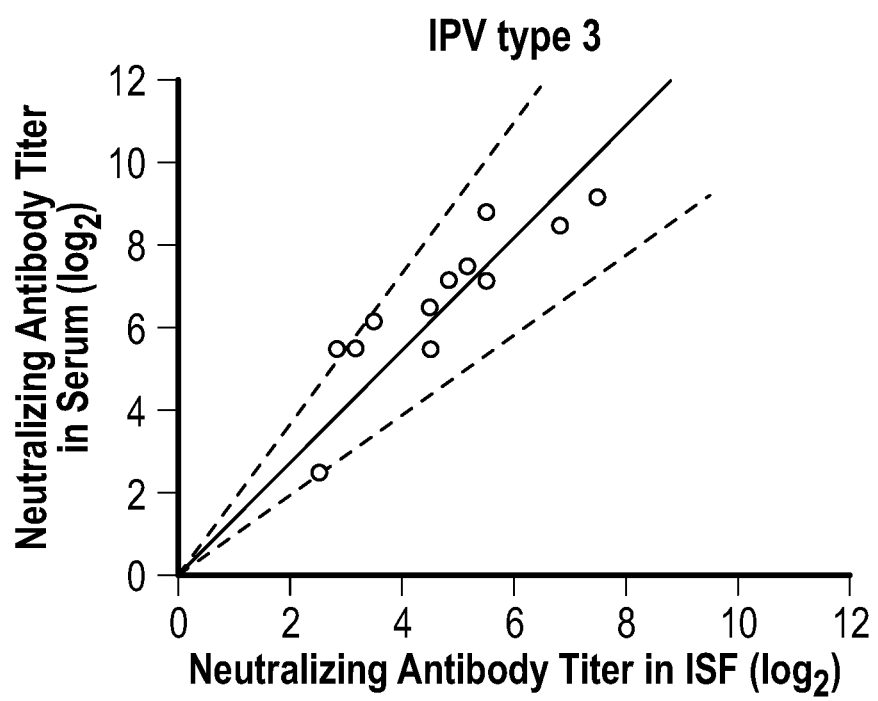

FIGS. 18A-C depict neutralizing antibody titers to (FIG. 18A) IPV type 1, (FIG. 18B) IPV type 2, and (FIG. 18C) IPV type 3 in ISF and serum samples collected before and 1 and 2 weeks after administration of a booster dose of trivalent IPV by intramuscular injection in rats (the first dose was administered 12 weeks earlier). The limit of detection for the assay was 2.5 $\log_2$. Each data point represents a single animal while the bars represents the median values of each group (n=6 rats). Asterisk (*) represents a significant difference (Student's t-test, p<0.01). FIG. 18D-E depict a correlation between neutralizing antibody titers in paired serum and ISF samples for (FIG. 18D) IPV type 1, (r=0.89, p<0.005, Pearson's correlation coefficient test), (FIG. 18E) IPV type 2 (r=0.87, p<0.005) and (FIG. 18F) IPV type 3 (r=0.91, p<0.005). Dotted lines represent ±30% of the slope of the linear regression line (shown as solid black line), which are included as a visual guide.

These were the same rats that were used in the study of polio-specific IgG, meaning that each rat had ISF collected seven times over the course of 14 weeks. The procedures were well tolerated, with only very mild, transient erythema and edema seen at the site of ISF collection.

The tests of this example demonstrated the ability of a minimally invasive MN array to quickly collect ISF and detect biomarkers of interest, which can provide an alternative approach to therapeutic drug monitoring in ISF. Microliters of ISF were collected within 1 min, which should be sufficient to run many assays to detect biomarkers of clinical significance. This contrasts with other MN-based methods that typically sample nanoliters of ISF and/or require as long as an hour of collecting. In this example, pharmacokinetics of vancomycin showed similar AUC and $C_{max}$ values in ISF and serum samples in rats, although vancomycin concentrations overall were slightly higher on average compared to serum levels. A delay in $T_{max}$ was observed in ISF, which is consistent with literature.

Materials: Monovalent, bulk inactivated polio vaccine (IPV) (Mahoney strain of type 1, Middle East Forces (MEF) strain of type 2 and Saukett strain of type 3) was provided by Bilthoven Biologicals (Bilthoven, Netherlands). The antigen concentrations were 1675, 963 and 950 D-antigen units (DU)/ml for IPV types 1, 2 and 3, respectively, determined by antigen-capture sandwich enzyme-linked immunosorbent (ELISA), as previously described 90.

Vancomycin hydrochloride from *Streptomyces Orientalis* was purchased from Sigma Aldrich (St. Louis, MO). HPLC-MS grade acetonitrile, methanol and water were purchased from MedSupply Partners (Atlanta, GA) and formic acid (98%, ACS grade) was obtained from EMD Millipore Chemicals (Darmstadt, Germany).

Microneedle Array Fabrication: MN array dimensions were drafted using AutoCAD software (Autodesk, Cupertino, CA) to prepare arrays by lithographically defined chemical etching (Tech Etch, Plymouth, MA). The arrays of this example included 9 MNs (650 µm long) each measuring 50 µm×150 µm in cross section at the base and tapering to a tip of <1 µm radius of curvature.

Whatman grade 1 filter paper (Sigma Aldrich, St. Louis, MO) was cut into rectangular strips of desired dimensions (2 mm×7 mm) using a $CO_2$ laser (New Hermes Gravograph Model LS500XL, Gravotech, Duluth, GA). The patterns were made using a vector cut at 24 W power and a speed of 8 mm/s. To prevent burning due to excessive temperature rise during laser cutting, the heat capacity of the filter paper was increased by attaching it to an adhesive backing (3M, Maplewood, MN), followed by soaking in DI water until completely wet.

The final MN array was prepared by adhering the paper strips to both sides of the backing structure of each MN patch to create a reservoir to collect ISF that flowed out of the skin during MN insertion.

ISF Collection Procedure: In this example, the MN array was applied to rat skin up to 12 times while pinching the skin with a force of 20-40 N. The amount of ISF collected was estimated to be 4 µL once the 2 mm×7 mm filter paper on both sides of the MN array were saturated with ISF. This estimate was performed by determining sodium ion content in the MN array paper backing using a sodium ion sensitive electrode (perfectION comb NA, Mettler Toledo, Columbus, OH). The sodium ion content measured in the samples was divided by the physiological sodium ion concentration in rat ISF of 143 mEq/L to determine ISF volume collected. This method relies on the expectation that sodium ion concentration is constant in the ISF of normal rats.

Vancomycin Pharmacokinetic Study: Procedures were performed on six Wistar rats (10-20 weeks old, female, Charles River Laboratories, Wilmington, MA) anesthetized by inhalation of isoflurane (AErrane, Baxter Healthcare, Deerfield, IL) in 100% oxygen during drug administration and sample collection. To administer vancomycin and collect blood, a silicone rubber tube was placed in the right jugular vein and kept locked with sodium heparin solution in physiological saline (100 U/mL). Care was taken to avoid administration of air bubbles, and blood samples were replaced with an approximately equal volume of heparinized saline to maintain blood volume. A 0.75 mg/mL solution of vancomycin hydrochloride in 0.9% NaCl injection solution (Hospira, Lake Forest, IL) was prepared and each rat was administered 1 mg/kg dose via the jugular vein tube.

Blood samples were obtained from the jugular tube before and 10, 20, 30, 45, 60 and 90 minutes after vancomycin administration. Companion ISF samples were also collected at the same time points. At the end of the study, the rats were euthanized by carbon dioxide gas asphyxiation.

Extraction of Vancomycin from ISF/serum Samples: The extraction of vancomycin from ISF and serum samples was performed according to a previously reported method (Ito, Y. et al., *Int. J. Med. Sci.* 2016, 13 (4), 271). Serum samples were diluted by mixing 4 µL of serum in 100 µL of deionized water. ISF was extracted from MN arrays by centrifuging 1 MN array in 100 µl of deionized water at 6000×g for 10 min. All samples were stored at 4° C. until testing. Then, 100 µL of formic acid/methanol (1:1, v/v) was added to each ISF or serum sample. The mixture was vortexed for 30 seconds and then centrifuged for 15 minutes at 12,000×g. The supernatant was removed, diluted with 300 µL of high-performance liquid chromatography-mass spectrometry (HPLC-MS) grade water, and then transferred to an HPLC vial for HPLC-MS/MS analysis.

HPLC-MS/MS Analysis: Calibrators were prepared by adding aliquots of vancomycin stock solution to a drug-free serum matrix to create the following concentrations: 1, 2, 6, 13, 32 and 75 µg/mL. The calibration curve was plotted using Mass Hunter QQQ Quantitative Analysis software (Agilent, Santa Clara, CA). The data were weighted 1/× and concentrations of vancomycin were calculated by the software.

Chromatography was performed by injecting 50 µL of extracted calibrator or sample onto an Agilent 1200 series HPLC fitted with an Agilent ZORBAX Eclipse C18 column (2.1×150 mm, 3.5 µm particle size). The column temperature was maintained at 35° C. and the flow rate was maintained at 0.4 mL/min. Mobile phase A consisted of 0.25% formic acid in water and mobile phase B consisted of 0.25% formic acid in acetonitrile. Vancomycin was separated using a gradient method as follows: 5.0% mobile phase B from 0.00-3.00 min, increased to 30% mobile phase B from 3.01-10.00 min, increased to 90% mobile phase B from 10.01-12.00 min, decreased to 5.0% mobile phase B from 12.01-14.00 min, then maintained at 5.0% mobile phase B from 14.01-16.00 min.

An Agilent 6410 triple quadrupole mass spectrometer was used to analyze samples in positive ion mode. The mass spectrometer parameters were as follows: capillary voltage of 3500 V, electron multiplier voltage at 300 V, gas temperature of 350° C., nebulizer pressure of 240 kPa and gas flow rate of 10 L/minute. Vancomycin was monitored using multiple reaction monitoring of the transition m/z 725.6→144.2. Chromatographic peaks were then manually integrated and analyzed using Agilent MassHunter software.

Polio Immunization: Six Wistar rats (10-20 weeks old, female, Charles River Laboratories) were anesthetized by isoflurane (AErrane, Baxter Healthcare) inhalation during all procedures. IPV stock solutions were combined and diluted using medium 199 to a concentration of 44, 8 and 36 DUs of IPV types 1, 2 and 3, respectively in 100 μL, as determined by ELISA. Two 100 μL intramuscular injections were administered per rat (one in each hind limb) for a total dose of 88, 16 and 72 DU of IPV types 1, 2 and 3, respectively.

Sera and ISF samples for polio-specific IgG testing were collected before and 1, 3 and 4 weeks after immunization. Twelve weeks after the initial vaccination, all animals were given a second dose of trivalent IPV in the same manner as the first dose. Sera and ISF samples for neutralizing antibody titer assay were collected before and 1, and 2 weeks after the second dose.

Blood samples (≤500 μl) were collected in microtainer collection tubes with clot activator (BD Diagnostics, Franklin Lakes, NJ) by tail bleeding after making a small incision in the tail using a surgical blade. ISF samples were collected from the lateral side of the rat after hair removal using electric shears followed by application of depilatory cream (Nair, Princeton, NJ). Hair removal was performed at least 1 day prior to ISF collection to avoid possible ISF contamination by the depilatory cream. At the end of the study, the rats were euthanized by carbon dioxide gas asphyxiation.

Serum was separated by centrifuging the blood samples at 6000×g for 1.5 min in an Eppendorf Centrifuge 5415R (Eppendorf AG, Hamburg, Germany). For the anti-polio IgG testing, 6 μL of serum was diluted with 120 μL of dilution buffer (provided with the ELISA kit) and the MN patch containing 4 μL of ISF was placed in an Eppendorf tube containing 80 μl of dilution buffer and centrifuged at 6000×g for 1.5 minutes.

For polio-specific neutralizing antibody titers, a 1:16 dilution of serum samples was performed by mixing 16 μL of serum with 240 μL of Dulbecco's modified Eagle Medium (DMEM, Gibco, Grand Island, NY) and 2% fetal bovine serum (FBS, Gibco) and a 1:16 dilution of ISF samples was performed by extracting ISF from the MN patches by centrifuging in DMEM (2 MN patches per 120 μl) at 6000×g for 1.5 min. The undiluted serum samples and the diluted ISF/serum samples were stored in Eppendorf tubes at −20° C. until used.

Anti-polio IgG Measurements and Polio-specific Neutralizing Antibody Titers: A commercially available ELISA IgG assay (Anti-Polio viruses 1-3 IgG ELISA kit, Alpha Diagnostics Intl, San Antonio, TX) was used for the detection and quantitative determination of IgG antibodies to polio virus in serum and ISF specimens. Prior to testing, the sera and ISF samples were thawed and diluted to 1:100 by adding 480 μl and 320 μl, respectively, of low Nsb diluent (provided with the ELISA kit).

Neutralizing antibody titers to poliomyelitis were measured from collected sera and ISF samples at the WHO Global Specialized Reference laboratory at CDC (Atlanta, GA) using methods previously described. Briefly, 80-100 CCID50 of Sabin strains 1, 2, and 3 poliovirus and two-fold serial dilutions of serum and ISF (starting at 1:4) were combined and incubated for 3 h at 35° C. prior to addition of HEp-2(C) cells. The plates were stained with crystal violet and cell viability was measured by optical density after 5 days of incubation at 35° C. and 5% $CO_2$. Each sample was run in triplicate. The neutralization titers were estimated by the Spearman-Karber method 92 and reported as the reciprocal of the calculated endpoint. The limit of detection for this assay is a 2.5 $\log_2$ titer, and the precision of detection is ±0.5 $\log_2$ titer.

Statistical Analysis: Statistics were calculated using either Prism software version 7.0 (Graphpad, La Jolla, CA) or Excel (Microsoft, Redmond, WA). Arithmetic mean and median values of the samples are reported. Comparison between three or more samples was performed by one-way ANOVA or two-way ANOVA. Correlation between data was determined by Pearson's correlation coefficient test. Probability (p) values of <0.05 were considered to be significant.

Example 6—Plasmonic Paper Microneedle Patch for On-Patch Detection of Biomarkers in ISF In this example, a plasmonic paper MN patch for on-patch SER-based detection of biomarkers was fabricated and its functionality was demonstrated using R6G as a model biomarker. The MN patch included a stainless steel MN array that created apertures (micropores in this example) in skin to access ISF, and included a plasmonic paper ISF reservoir, which was prepared by immobilizing poly(styrene sulfonate)(PSS)-modified gold nanorods (GNRs) on a thin strip of filter paper by plasmonic calligraphy. The negative charge on PSS-modified GNRs bound positively charged R6G in ISF, thereby enhancing the signal from R6G by LSPR for detection by SERS.

Because the plasmonic paper was integrated into the MN patch, it permitted on-patch detection of biomarkers without additional sample preparation. The utility of this patch was demonstrated by measuring the pharmacokinetic profile of R6G in ISF and serum from rats. The study of this example showed that a plasmonic paper MN patch can permit on-patch measurement of biomarkers in ISF, indicating that the devices described herein, such as the devices of this example, can be used for point-of-care diagnostic applications.

In this example, a plasmonic paper MN patch for SERS-based detection of biomarkers in ISF was fabricated and tested. The plasmonic paper MN patch was minimally invasive, capable of collecting ISF rapidly, and simple-to-use. This MN patch also had the capability to perform on-patch SERS-based detection of biomarkers using a paper reservoir that captured biomarkders with functionalized GNRs.

The plasmonic paper MN patch involved a simple, low-cost design using readily available materials. The MN array was fabricated from stainless steel sheets by chemical etching. The paper reservoir was made of conventional filter paper that had high surface area, and was low-cost, biodegradable, and compatible with conventional printing approaches. The selected filter paper also is commonly used in paper-based sensor devices. The plasmonic calligraphy method controlled test domain size in a simple manner by writing with a pen in the desired area. This method also offered the possibility of multiplexed biosensing of multiple biomarkers by simply "writing" different test domains with plasmonic nanostructures functionalized to target different biomarker.

The manufacturing process of this example was scalable due to possibility of inkjet printing of the plasmonic inks onto the paper.

Materials: Cetyltrimethylammonium bromide (CTAB), chloroauric acid (HAuCl4), ascorbic acid, sodium borohydride, poly(styrene sulfonate) (PSS) (Mw=70,000 g/mol), rat serum, filter paper (Whatman #1) and rhodamine 6G (R6G) were purchased from Sigma Aldrich (St. Louis, MO). Silver nitrate was purchased from VWR International (Radnor, PA). All chemicals were used as received.

Microneedle Patch Fabrication: MN patch dimensions were drafted using AutoCAD software (Autodesk, Cupertino, CA) and then prepared by lithographically defined chemical etching (Tech Etch, Plymouth, MA). Patches of this example included 9 MNs (650 μm long) each measuring 50 μm×150 μm in cross section at the base and tapering to a tip of <1 μm radius of curvature.

Whatman grade 1 filter paper was cut into rectangular strips of desired dimensions (2 mm×7 mm or 1 mm×7 mm) using a $CO_2$ laser (New Hermes Gravograph Model LS500XL, Gravotech, Duluth, GA). A vector cut at 24 W power and a speed of 8 mm/s was used to make the pattern. To avoid burning due to excessive temperature rise during laser cutting, the heat capacity of the filter paper was increased by attaching it to an adhesive backing (3M, Maplewood, MN), followed by soaking in deionized (DI) water until completely wet. The final MN patch was prepared by adhering the paper strip to the base of each MN patch without covering the needles using adhesive (3M, Maplewood, MN). The MN patches with 2 mm×7 mm filter paper were used as prepared while the MN patches with 1 mm×7 mm filter paper were further modified with gold nanorods (GNRs).

Plasmonic Paper Microneedle Patch Preparation: GNRs were synthesized using a seed-mediated approach. The seed solution was prepared by mixing 0.6 mL of 10 mM ice-cold sodium borohydride solution with 10 mL of CTAB (0.1 M) and HAuCl4 ($2.5 \times 10^{-4}$ M) solution under vigorous stirring. The growth solution was prepared by gently mixing 95 mL of CTAB (0.1 M), 0.5 mL of silver nitrate (10 mM), 4.5 ml of $HAuCl_4$ (10 mM), and 0.55 mL of ascorbic acid (0.1 M). GNR solution was prepared by adding 0.12 mL of freshly prepared seed solution to the growth solution, and left in the dark for 14 h. Prior to use, excess CTAB was removed from the GNR solution by centrifuging twice at 9300×g for 10 min in a centrifuge (Eppendorf 5810 R, Hamburg, Germany) and the GNRs were redispersed in nanopure water (18.2 MΩ cm).

GNRs were modified with PSS solution 124 and concentrated to form plasmonic ink. Briefly, 10 mL of PSS (0.2% w/v) in 6 mM NaCl aqueous solution were mixed with 10 mL of twice-centrifuged GNR solution under vigorous stirring and sonicated for 60 min. Excess PSS solution was removed as supernatant after centrifuging at 9300×g for 10 min. This resulted in an approximately 200 fold concentration of PSS-GNR as the recovered pellet of PSS-GNR was re-dispersed in nanopure water to make 100 μL of plasmonic ink. The plasmonic ink was then injected into a clean empty ballpoint pen refill (Paper Mate Profile, Oak Brook, IL). Plasmonic ink was "written" onto the 1 mm×7 mm filter paper to make plasmonic paper, which was adhered to MN patches.

ISF Collection Procedure: In this example, a MN patch was applied to rat skin 5-10 times while pinching the skin with a force of 20-40 N until the filter paper on the MN patch was visually determined to be saturated with ISF. The amount of ISF collected was estimated to be 1 μL or 2 μL once the 1 mm×7 mm or 2 mm×7 mm filter paper on the MN patch was saturated with ISF, respectively. This estimate was performed by determining sodium ion content in the MN patch paper backing using a sodium ion sensitive electrode (perfectION comb NA, Mettler Toledo, Columbus, OH). The sodium ion content measured in the samples was divided by the physiological sodium ion concentration in rat ISF of 143 mEq/L to determine ISF volume collected. This method relied on the expectation that sodium ion concentration is constant in the ISF of normal rats.

Characterization: Transmission electron microscopy (TEM) micrographs were obtained using a JEM-2100F field emission instrument (JEOL, Peabody, MA) by drying a drop of GNR solution on a glow discharge-treated carbon-coated grid. Scanning electron microscope (SEM) images were recorded on a gold-sputtered plasmonic paper by using a Nova 2300 Field Emission SEM (FEI, Hillsboro, OR) at an accelerating voltage of 10 kV. UV-Vis extinction spectra were measured using a microspectrophotometer (QDI 302, CRAIC technologies, San Dimas, CA) coupled to a DM 4000M optical microscope (Leica Microsystems Inc., Buffalo Grove, IL) and UV-1800 UV-Vis spectrophotometer (Shimadzu Scientific Instruments Inc., Columbia, MD).

SERS Measurements of R6G Spiked ISF and Serum Samples: Raman spectra were collected using an InVia Raman microscope (Renishaw, Gloucestershire, UK) and Wire 3.4 software. The NIR 785 nm laser light was focused onto the sample using a 20× objective, exposures were 10 seconds in length, and 1 accumulation was collected per spot. Approximately 7 mW of power irradiated the surface of the substrate. Six spectra were collected from different spots across each substrate, using a motorized XYZ translational stage integral to the microscope.

ISF calibrators were prepared by adding aliquots of R6G stock solution to ISF (extracted from porcine skin ex vivo) to create the following concentrations: 0, 0.05, 0.5, 2, 5, 10, 25, 50 and 100 μM R6G. Serum calibrators were prepared by adding aliquots of R6G stock solution to rat serum (collected from rats in vivo) to create the following concentrations: 0, 0.5, 5, 10, 25, 50 and 100 μM. The plasmonic paper was soaked in 150 μL of calibrator for 1 hour, rinsed in DI water for 5 min, and air dried prior to SERS spectrum collection from six different locations across the substrate.

In-vivo Study and Pharmacokinetic Analysis: Procedures were performed on six hairless rats (335-375 gm, female, Charles River Laboratories, Wilmington, MA) continuously anesthetized by isoflurane (Isothesia, Henry Schein Animal Health, Dublin, OH) in 100% oxygen inhalation during drug administration and sample collection. A silicone rubber tube was placed in the right jugular vein and kept locked with sodium heparin (100 U/ml) solution in physiological saline. Care was taken to avoid administration of air bubbles, and blood samples were replaced with an approximately equal volume of heparinized saline. Each rat was infused with 10 mg/ml R6G in sterile water via a 24 gauge angiocatheter in the tail vein at a rate of 0.1 mL/min over 30 min by means of an infusion pump (Harvard Apparatus, Holliston, MA).

Blood samples (≤500 µl) were collected in microtainer collection tubes with clot activator (BD Diagnostics, Franklin Lakes, NJ) from the jugular tube once prior to and at 2, 7, 15, 20, 30 and 35 min after the start of R6G infusion. Companion ISF samples were also collected using MN patches with plasmonic paper or filter paper (without GNRs) from the lateral side of the rat at the same time points. At the end of the study, a final blood sample (≤1 ml) was collected from each rat before euthanizing by carbon dioxide gas asphyxiation without recovery from isoflurane.

Detection of R6G from ISF/Serum Samples Using SERS: Serum was separated from blood samples by centrifuging at 6000×g for 1.5 min in a centrifuge (Eppendorf 5415R, Hamburg, Germany). For SERS-based testing, 1 µL of each serum sample was added on a piece of plasmonic paper and allowed to air dry. The ISF samples collected on plasmonic paper MN patches were tested directly. After briefly rinsing in water, six spectra were collected from different locations across each plasmonic paper substrate to measure the intensity of the 1364 cm-1 Raman band. The corresponding concentration of R6G was determined from a calibration curve.

Detection of R6G from ISF/Serum Samples Using Fluorescence Spectroscopy: A 1:50 dilution of serum samples was performed by mixing 2 µL of serum with 100 µL of DI water and a 1:50 dilution of ISF samples was performed by extracting ISF from the MN patches by centrifuging at 6000×g for 1.5 min in 100 µl DI water per MN patch. The R6G concentration in ISF and serum samples was measured against a standard calibration curve of R6G in a 384 well plate (Costar Black Polypropylene, Corning, Corning, NY) using a Synergy H4 hybrid reader (BioTek, Winooski, VT) at an emission wavelength of 516 nm and absorption wavelength of 557 nm.

Determination of R6G in Protein-Free Serum: To determine the extent of binding of R6G to plasma protein, 500 µL of serum sample collected prior to euthanizing the rats was centrifuged in a VivaSpin 500 centrifugal filter (MWCO 30,000; Vivaproducts, Littleton, MA) at 15,000×g for 5 min. The R6G concentration in the protein-free filtrate and in the serum prior to centrifugation were measured using the Synergy H4 hybrid reader, as described in this example.

Statistical Analysis: Statistics were calculated using either Origin software (OriginLab, Northampton, MA) or Excel (Microsoft, Redmond, WA). All listed averages represent the arithmetic mean of the samples. Comparisons between individual samples were done using an unpaired t-test. Probability (p) values of <0.05 were considered significant.

Fabrication of Plasmonic Paper: In this example, fabrication of plasmonic paper required synthesis of GNR, coating with PSS and embedding in filter paper. GNRs synthesized by seed-mediated process measured 88±7 nm in length and 33±2 nm in width, resulting in an aspect ratio of nearly 3. After coating GNRs with PSS, the ultraviolet-visible light extinction spectra of PSS-modified GNRs showed two characteristic peaks at 513 nm and 683 nm, corresponding to the transverse and longitudinal plasmon resonances of the GMRs.

GMRs were coated with negatively charged PSS to promote binding of positively charged R6G, which was the model biomarker used in this study.

The PSS-modified GNRs solution was filled in a ball point pen and drawn onto a 1 mm×7 mm filter paper adhered to a steel MN patch. SEM imaging depicted an evenly speckled surface morphology of the paper, indicating uniform adsorption of GNRs to the paper without significant aggregation.

ISF Collection Using Plasmonic Paper Microneedle Patch: In this example, a MN patch was developed to collect ISF from skin. The MN patch included a stainless steel array of nine, 650 µm long MNs (used to create micropores in the skin surface) extending from a backing structure (for ease of handling). A strip of plasmonic paper was adhered to one side of the patch backing to create a reservoir calibrated to collect ~1 µl of ISF and bind positively charged R6G.

ISF collection was performed by applying the MN patch to the skin so that the MNs penetrated into the skin surface to create apertures (micropores in this example) and induce flow of ISF out of the skin and into the paper reservoirs. MN insertion was repeated at a rate of about 1 insertion per second until about 1 µL of ISF was collected. This process usually required up to 5 MN patch insertions. The MN insertion procedure was well tolerated with a very mild, transient erythema observed at the insertion site.

Measurement of R6G in Plasmonic Paper by SERS: The plasmonic paper was designed to facilitate detection of R6G by Raman spectroscopy. To develop a calibration curve and determine the upper and lower limit of detection, SERS measurements were performed on plasmonic paper soaked ISF or serum collected from rats spiked with a range of concentrations of R6G. With increasing R6G concentrations, the Raman spectra showed an increase in characteristic Raman peaks for R6G at 610, 1364 and 1512 cm$^{-1}$ which were attributed to the C-C-C ring in-plane bending, and aromatic C-C stretching modes of R6G molecules.

The Raman band at 1364 cm$^{-1}$ was used to generate a calibration curve, which showed a lower limit of detection at about 0.05 µM R6G, an upper limit of detection at about 30 µM R6G and good fit for both ISF and serum ($R^2$=0.97 and 0.98, respectively). The relative standard deviation was ~15%, which was close to the values observed for commercially available microfabricated SERS substrates. Both the ISF and serum spectra showed extremely small non-specific binding in the absence of R6G. These calibration curves were used to determine the R6G concentration in ISF and serum samples collected in the R6G pharmacokinetic studies of this example.

R6G Pharmacokinetics in ISF Determined by On-Patch SERS Measurement Using Plasmonic Paper Microneedle Patches: To assess a utility of the plasmonic paper MN patches of this example, the pharmacokinetics of R6G in ISF and serum in rats was analyzed, as measured by on-patch SERS. The peaks on the SERS spectra obtained from ISF and serum looked similar, although the height of the peaks in ISF was about an order of magnitude lower than in serum.

ISF collection was performed using conventional paper MN patches from which R6G was eluted and measured by fluorescence spectroscopy for comparison. When comparing R6G concentrations by on-patch SERS versus off-patch fluorescence spectroscopy, there were no statistically significant differences in the concentrations measured in ISF (ANOVA, p=0.61) or in serum samples (ANOVA, p=0.68) (FIG. 6).

Figure 19A:
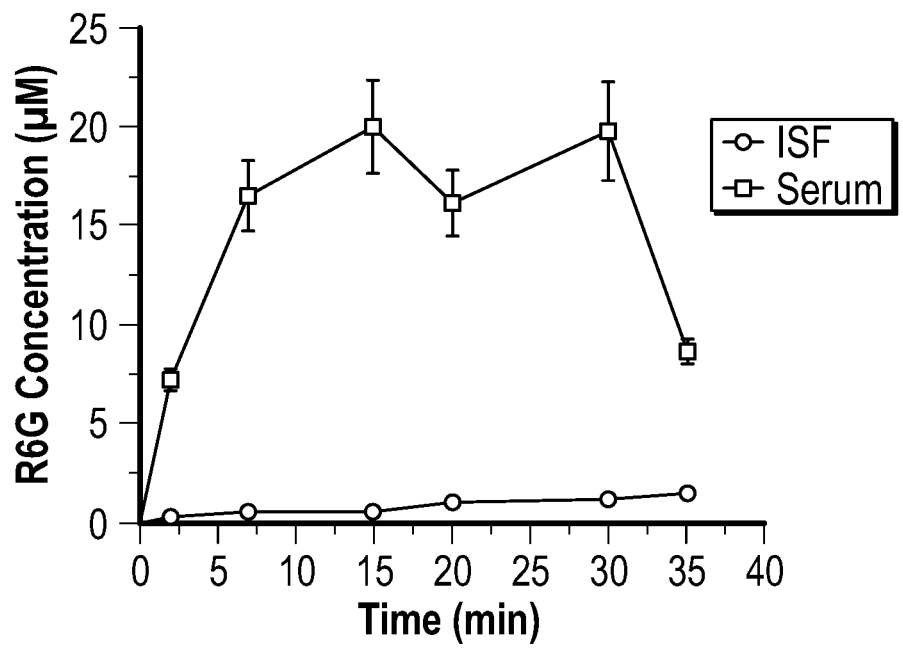
FIG. 19A and FIG. 19B depict plots of pharmacokinetics of R6G in ISF and serum.
Figure 19B:
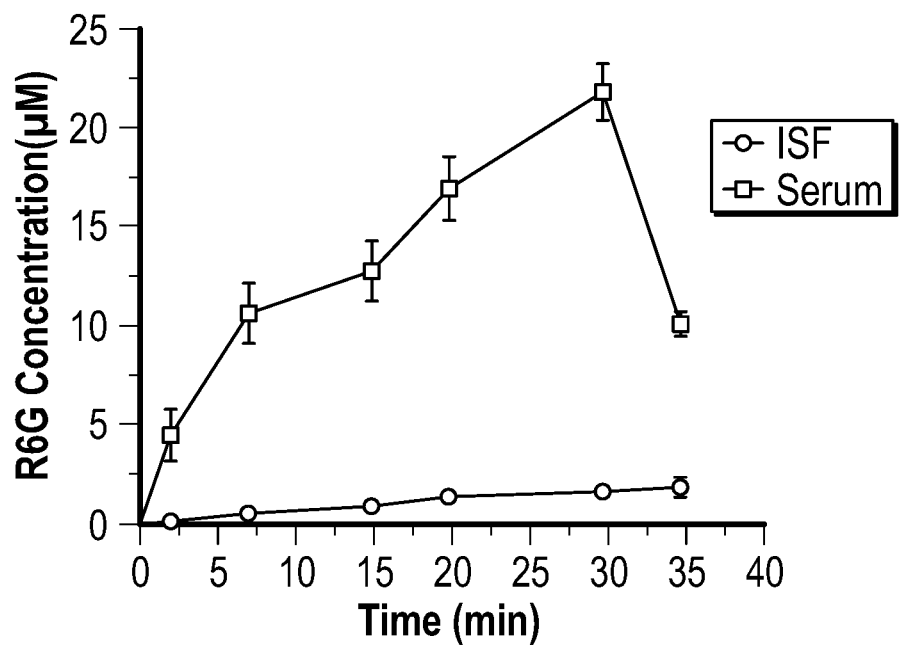

Whether measured by SERS or fluorescence, there were significant differences in the pharmacokinetic profiles in ISF versus serum. In this example, R6G was slowly infused intravenously in each animal for 30 min. The resulting R6G concentration profile in serum reflected this, showing an increase in R6G concentration for up to 30 min followed by a sharp decrease in concentration after 30 min in both the measurement techniques (FIG. 19A and FIG. 19B). The pharmacokinetic profile in ISF, in contrast, showed a steady increase, without the sudden drop in R6G concentration after 30 min. Moreover, the concentration profile in ISF was an order of magnitude lower than in serum in both the measurement techniques. These differences in the pharmacokinetic profiles may be explained by binding of R6G to plasma proteins.

FIG. 19A and FIG. 19B depict plots of pharmacokinetics of R6G in ISF and serum. FIG. 19A depicts the results of an on-patch SERS measurement using plasmonic paper MN patches of this example, and FIG. 19B depicts the results of measurements collected with fluorescence spectroscopy of R6G eluted from conventional paper MN patches. The data points show mean±standard deviation (n=6 rats).

Binding of R6G to Plasma Proteins: To understand the lower concentration of R6G seen in ISF compared to serum, protein-free filtrate was isolated from serum samples from the pharmacokinetic study. R6G concentration in serum prior to filtration (9.6±4.2 µM) was dramatically higher than in protein-free serum samples (0.05±0.03 µM) (Student's t-test, p<0.008). This indicated that R6G strongly binds to plasma proteins and therefore may not partition well into ISF. This finding was consistent with prior literature, which also reported significant binding of R6G with human serum albumin.

Example 7—Recruitment and Collection of ISF

The MN patches of this example were designed as a two-component system that included a strip of paper (which serves as an ISF reservoir) on the backing of a stainless steel MN array (which created apertures (micropores in this example) in the skin through which ISF could flow to the skin surface). To collect ISF, the MN patch was repeatedly applied to the skin surface, thereby inducing flow of ISF out of the skin and into the paper reservoirs.

The amount and speed of ISF collection depended, at least in part, on the absorptiveness of the paper reservoir. Five different types of papers were tested in this example as candidate reservoir materials, and their absorptiveness was measured by modified Cobb and Klemm methods. Both methods indicated that the banana fiber paper was the most absorbent of all the tested papers, followed by filter paper. The filter paper was chosen for further testing in this example because of its ease of availability, low cost and widespread use by many researchers for development of paper-based sensor devices.

To calibrate the volume of ISF that filled reservoirs of filter paper, MN patches were inserted into the skin of anesthetized hairless rats until the reservoirs were completely wetted with ISF, as determined by visual examination. Rectangular strips of filter paper cut into 1 mm×7 mm or 2 mm×7 mm strips collected 1.1±0.3 µl and 2.0±0.2 µl of ISF, respectively (mean±standard error of the mean, n=6 replicates).

The tests of this example determined the effect of MN parameters on an amount of ISF collected from pig ear skin ex vivo, which was artificially hydrated with fluorescein to facilitate quantification of ISF collected. It was found that the amount of ISF collected increased by increasing the number of skin insertions by MNs from 1 to 20 insertions, increasing MN thickness from 50 µm to 100 µm and increasing the number of MNs from 5 to 9 MNs per patch (three-way ANOVA, p<0.03) (FIG. 20).

Figure 20:
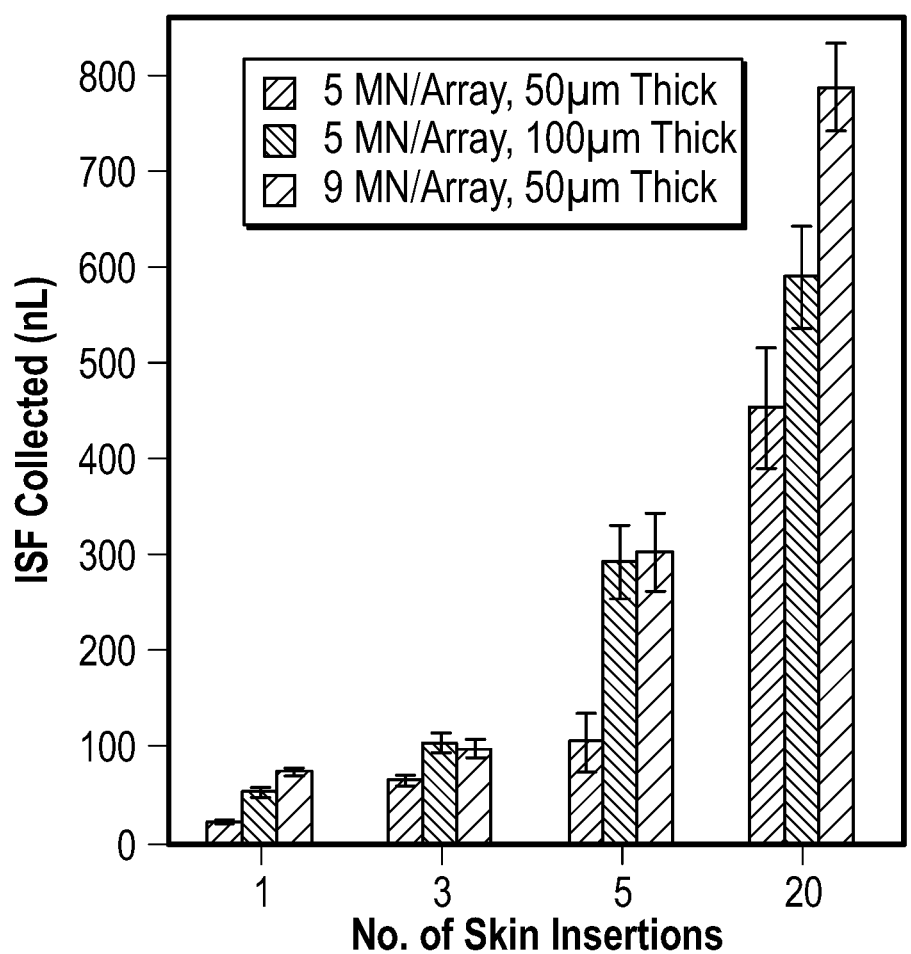
FIG. 20 depicts the amount of ISF collected with several embodiments of the devices described herein.

FIG. 20 depicts the effect of MN patch design on the amount of ISF collected in this example. Patches were prepared with MNs measuring either 50 µm or 100 µm in thickness and including either 5 or 9 MNs per patch. ISF was collected by applying a MN patch 1, 3, 5, or 20 times to stretched pig ear skin ex vivo artificially hydrated with fluorescein row. The data of FIG. 20 represents mean±SEM (standard error of the mean) of n=3 replicates.

Increasing number of skin insertions and number of MNs per patch both should increase the number of microscopic channels for ISF to flow out of skin. Puncturing skin with thicker microneedles should result in larger micropores, thereby allowing easier access to ISF.

The tests of this example also determine whether improving the wettability of the stainless steel MN surface could expedite ISF collection time by facilitating ISF flow on the MN surface to the paper reservoir. An MN patch was treated with air plasma or coated with Parylene C to render the MN surface more hydrophilic or hydrophobic, respectively, as determined through contact angle measurements. While it required 15 skin insertions to collect 2 µL of ISF from hairless rat skin in vivo when using MN patches with no surface modification, increasing hydrophilicity of the MN surface decreased the required number of skin insertions to 10, whereas increasing hydrophobicity increase the number of skin insertions to 18. This indicated that ISF collection, in this example, involved fluid flow on the MN outer surface, and that surface tension of the MN outer surface thereby played a role in ISF flow from the apertures to the paper reservoir.

It was observed during the tests of this example that very little ISF flowed from the apertures during the first few MN insertions, but the ISF flow increased as the number of insertions increased. Therefore, the act of collecting ISF (e.g., piercing the skin with MNs) appeared to affect the rate at which ISF flowed, possibly by increasing skin hydration, which can increase hydraulic conductivity of tissues by increasing the spacing by tissue fibers. This conclusion was supported by the visual observation of local edema in skin after ISF collection by the MN patches of this example.

Figure 21A:
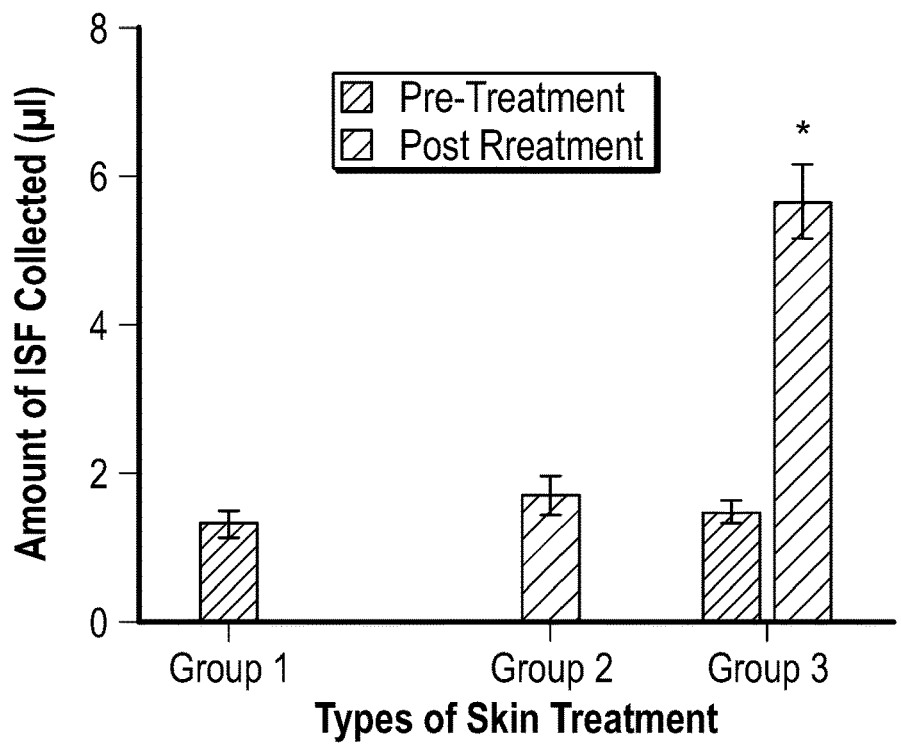
FIG. 21A depicts the amounts of ISF collected during several embodiments of the methods described herein.

ISF was collected from a first group of rats using 10 skin punctures with MN patches following standard protocol (Group 1, see below). In a second group of rats, the skin was pre-treated with a blunt MN patch backing to simulate the mechanical interaction between MN patches and skin without the MN puncture into skin. No ISF was collected during this blunt pre-treatment (FIG. 21A). After 5 min, ISF was collected using standard protocol, of this example, of 10 MN patch insertions into skin (Group 2, see below). There was no significant effect of this blunt MN patch pretreatment on the amount of ISF collected 5 min later (FIG. 21A). In a third group of rats, the skin was pre-treated using the standard protocol, of this example, of 10 MN patch insertions, which was followed 5 min later with another 10 MN patch insertions using standard protocol, of this example, to collect ISF (Group 3, see below). The amount of ISF collected during the pre-treatment was not significantly different from the amount of ISF collected in Group 1 (FIG. 21A).

However, the amount of ISF collected when the identical treatment was performed 5 min later collected 4.3 times more ISF (FIG. 21A). This results suggests that the act of collecting ISF by MN patch skin puncture affected the skin so that continued ISF collection was easier.

Figure 21B:
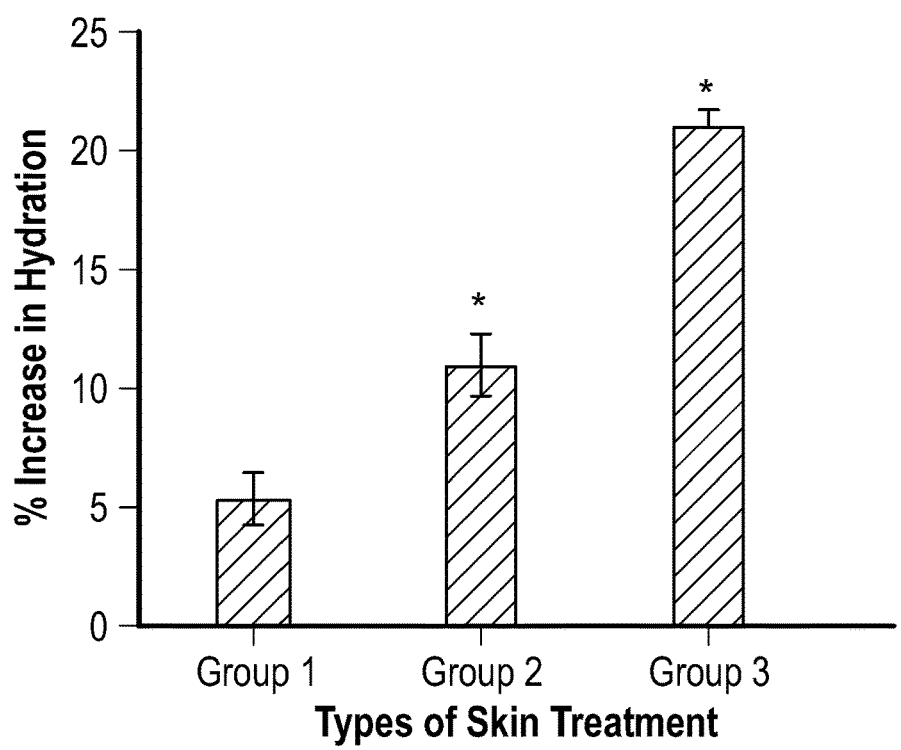
FIG. 21B depicts the increase in hydration observed during several embodiments of the methods described herein.

The percent increase in skin water content was measured immediately after treatments in the three test groups. In Group 1, skin hydration increase by 5%, presumably due to the effects of MN patch skin puncture (FIG. 21B). When the blunt pre-treatment was performed in Group 2, skin hydration significantly increased to 12% after subsequent MN patch skin puncture (FIG. 21B), even though ISF collection data did not indicate an effect of blunt pre-treatment (FIG. 21A). However, rats in Group 3 that received a sharp-tipped MN patch pre-treatment, exhibited a 21% increase in skin hydration after the subsequent MN patch skin puncture (FIG. 21B), which was associated with a large increase in ISF collection (FIG. 21A) and supported the conclusion that MN patch skin puncture increased skin hydration which can be associated with increased rates of ISF collection.

Visual observation of the skin immediately after 10 MN patch skin punctures did not show evidence of erythema or edema. Very mild erythema appeared 2-3 min after the skin punctures, which was localized to a small rectangle (~3 mm by ~1 cm) at the sites of MN puncture. The erythema resolved within one day. Edema was also seen within 2-3 min, which spread over a larger area of about 1 $cm^2$ surrounding the MN puncture site. The edema resolved within few hours. Examination of skin sections taken from the sites of MN patch skin puncture did not show evidence of inflammatory cells at the time of collection (i.e., immediately after MN patch skin puncture).

Microneedle Patch Fabrication: MN patches were cut from stainless steel sheets (Trinity Brand Industries, SS 304, 100 μm thick; McMaster-Carr, Atlanta, GA) using an infrared laser (Resonetics Maestro, Nashua, NH). The desired dimensions were drafted using AutoCAD software (Autodesk, Cupertino, CA). MN patches were cut using the infrared laser at 1000 Hz, 20 $J/cm^2$ energy density and 40% attenuation of laser energy. A total of three passes were required to completely cut through the stainless steel sheet. A cutting speed of 2 mm/s and air purge at a constant pressure of 140 kPa were used. The MN patches were electropolished using an electropolishing solution (E972, ESMA, South Holland, IL) in an electropolisher (E399, ESMA) for 5 min at 2 A and room temperature. The electropolished array (each MN having final dimensions of 750 μm in length, 100 μm×70 μm in cross section and tapering to a tip of <1 μm radius of curvature) was rinsed with isopropyl alcohol, cleaned with DI water and air dried.

MN patches were also prepared by lithographically defined chemical etching by Tech Etch (Plymouth, MA). Patches comprised either 5 MNs (750 μm long) or 9 MNs (650 μm) each measuring 50 μm×150 μm in cross section and tapering to a tip of <1 μm radius of curvature.

Hydrophilic Plasma Treatment: To create a hydrophilic surface, MN arrays were air plasma treated by placing them in a plasma chamber (PDC-32G, Harrick Plasma, Ithaca, NY) for 5 min at the maximum radio frequency level under vacuum. MN patches were used for experiments within 15 min after treatment.

Hydrophobic Parylene Coating: To create a hydrophobic surface, the MN patches of this example were coated with a conformal vapor deposition of 1 μm thick (using 1.6 g of dimer) Parylene C coating using a SCS Labcoater PDS 2010 (Specialty Coating Systems, Indianapolis, IN).

Paper Reservoir: A strip of paper was adhered to the backing of each MN patch to create a reservoir to collect ISF that flowed out of the skin during MN insertion. For initial screening of paper for this examples, samples of banana fiber paper, cotton fiber paper, and blotter paper were tested. Copy paper (Staples, Framingham, MA) and Whatman grade 1 filter paper (Sigma Aldrich, St. Louis, MO) were used as received.

The filter paper was ultimately selected as the material to form the reservoir. Filter paper strips were cut into rectangular strips of desired dimensions (1 mm×7 mm or 2 mm×7 mm) using a $CO_2$ laser (New Hermes Gravograph Model LS500XL, Gravotech, Duluth, GA). The patterns were made using a vector cut at 24 W power and a speed of 8 mm/s. To prevent excessive temperature rise that could cause burning during laser cutting, the filter paper was attached to an adhesive backing (3M, Maplewood, MN) first and soaked in DI water until completely wet to increase heat capacity.

The final MN patch was prepared by adhering the filter paper to the MN patch backing without covering the MNs.

Modified Cobb and Klemm Methods for Determining Water Absorptiveness of Paper: The water absorptiveness of different types of paper was determined by modified Cobb (ISO 535:2014)54 and Klemm (ISO 8787:1986)55 methods. The modified Cobb method was performed by weighing each paper (precut to 10 cm×1 cm strips) before soaking in 10 ml of deionized (DI) water for a specified amount of time. The paper was gently pressed to remove excess water and then reweighed. The Cobb value, which is the measure of water absorptiveness, was equal to the difference in the weight of the sample before and after soaking. Cobb values were normalized to the initial paper mass to account for thickness differences between the paper strips.

The modified Klemm method, which is a measure of capillary rise, was performed by vertically suspending a 10 cm×1 cm rectangular strip of each paper sample so its lower edge just touched the surface of 10 ml of DI water in a beaker for a specified amount of time. The distance that water travelled up the strip was measured using a ruler. The obtained Klemm values were normalized to the initial weights of the samples to account for thickness differences between the papers.

Contact Angle Measurements: Static contact angle measurements were made placing 2 μL of DI water on plasma-treated, Parylene-coated and untreated MN surfaces by a goniometer (model 250, Rame'-hart Instrument, Succasunna, NJ). Contact angle measurements were calculated as the mean value of six measurements under the same conditions.

Quantification of ISF Volume Collected: The amount of ISF collected was quantified by determining sodium ion content in the MN patch paper backing using a sodium ion sensitive electrode (perfectION comb NA, Mettler Toledo, Columbus, OH). Paper backings were each incubated in 1 mL of DI water for 24 h at room temperature (21-25° C.) to extract solutes from ISF that at least partially dried on the paper. The sodium ion content measured in the samples was divided by the physiological sodium ion concentration in rat ISF of 143 mEq/L to determine ISF volume collected. This method relied on the expectation that sodium ion concentration is constant in the ISF of normal rats.

ISF Collection from Pig Skin Ex Vivo: Pig ear skin was obtain freshly excised from feeder pigs, and then kept frozen at −80° C. until use. Circular skin samples (2 cm diameter) were thawed and placed in vertical Franz diffusion cells (PermeGear, Bethlehem, PA). The donor chamber (on the top of the diffusion cell) was sealed using Parafilm (Bemis, Neenah, WI). The receptor chamber (on the bottom of the diffusion cell) was filled with 5 mL of 1 mg/ml fluorescein sodium salt (Sigma Aldrich) in DI water. The Franz cells were placed overnight in a heating blocking (PermeGear) set to 37° C. to equilibrate the skin with the fluorescein solution.

The skin samples were removed from the Franz cells and then stretched and secured on a board using push pins. The MN patches were inserted at an angle of 10°-45° from the skin surface with a force of 20-40 N for a specified number of times. Fluorescence imaging of the skin was performed using an Olympus SZX2 stereo microscope with a CCD camera (Leica DC 300, Leica Microsystems, Bannockburn, IL).

Paper backings were each incubated in 1 mL of DI water for 24 h. The fluorescein concentration in the reconstituted ISF samples was measured against a standard calibration curve of fluorescein in a 96 well plate (Costar Black Polypropylene, Corning, Corning, NY) using a Synergy H4 hybrid reader (BioTek, Winooski, VT) at an emission wavelength of 525 nm and absorption wavelength of 590 nm. The amount of ISF collected was calculated as the measured fluorescence content from the ISF divided by the known fluorescein concentration in skin, i.e., 1 mg/ml.

In-Vivo Study Design: In this example, fifteen Wistar rats (10-20 weeks old, female, Charles River Laboratories, Wilmington, MA) were anesthetized by isoflurane (AErrane, Baxter Healthcare, Deerfield, IL) inhalation in a prone position, during which all procedures were performed. A section of hair on the lateral side of the rat was removed using electric shears followed by brief application of depilatory cream (Nair, Princeton, NJ), and then cleaned with gauze and DI water. The hair removal was performed at least 1 day prior to ISF collection to avoid possible ISF contamination by the depilatory cream. The rats were randomly divided into 3 groups (n=5 rats per group).

Group 1 received MN treatment only. MN patches were inserted into skin 10 times to collect ISF, and biopsies were performed immediately. Biopsy skin from the other side of each rat was used as untreated control skin.

Group 2 received blunt MN pretreatment and MN treatment. A blunt MN patch backing was pressed against skin 10 times, and 5 minutes later, an MN patch was inserted into skin 10 times to collected ISF, and the skin was biopsied immediately. Biopsy skin from the other side of each rat was used as untreated control skin.

Group 3 received MN pretreatment and MN treatment. MN patch was inserted into skin 10 times to collect ISF, and 5 minutes layer, an MN patch was inserted into the skin 10 times to collect ISF, and the skin was biopsied immediately. Biopsy skin from the other side of each rat was used as untreated control skin.

After each experiment, the rat was euthanized by carbon dioxide gas asphyxiation.

Determination of Total Water Content of Skin: To measure ISF content in the skin, pieces of rat skin were pre-weighed (60-140 mg per piece) immediately after biopsy and lyophilized (Freezone 6 liter freeze dryer, Labconco, Kansas City, MO). The mass loss after lyophilization was taken to equal the ISF content in the skin, assuming complete water removal by lyophilization. The percent increase in hydration due to skin pretreatment was determined as the difference between the water content of treated and control skin samples normalized to the water content of the control skin.

Imaging and Histology: Skin biopsies were embedded in Optimum Cutting Temperature (OCT) media (Tissue-Tek, Torrance, CA) in a cryostat mold. Samples were fixed by freezing on dry ice. Frozen samples were sliced into approximately 6 μm thick sections using a cryostat (Cryostar HM 560MV, Microm, Waldorf, Germany) and placed on glass slides. Hematoxylin and eosin (H&E) staining was performed on the skin sections using an automated staining machine (Leica Autostainer XL, Nussloch, Germany). A few drops of cytoseal 60 (low viscosity, Richard-Allan Scientific, Kalamazoo, MI) were applied onto the stained skin sections. The samples were then covered with glass cover slips and dried in a fume hood overnight.

Imaging was performed using a Zeiss AxioObserver Z1 fluorescence microscope (Carl-Zeiss microscopy). Histopathological analysis of the images was performed.

Statistical Analysis: Statistics were calculated using either MiniTab software version 18 (MiniTab, State College, PA). or Excel (Microsoft, Redmond, WA). All listed averages represent the arithmetic mean of the samples. Comparison between three or more samples was performed by one-way ANOVA or 2-way ANOVA. Comparisons between individual samples were done using an unpaired t-test. Probability (p) values of <0.05 were considered to be significant.

We claim:

1. A method for collecting interstitial fluid (ISF) from a patient's skin, the method comprising:
   inserting a plurality of microneedles into the patient's skin at an insertion site to form a plurality of apertures in the patient's stratum corneum at the insertion site;
   inducing local edema to mobilize ISF within the patient's dermis at the insertion site; and
   collecting the ISF that flows from the apertures to a surface of the patient's skin at the insertion site,
   wherein the inducing the local edema within the patient's dermis is effective to increase a rate and/or a total amount of the ISF flowing from the apertures.

2. The method of claim 1, wherein the inducing the local edema is effected by selective application of pressure and/or heat to the patient's skin at or about the insertion site.

3. The method of claim 2, wherein the selective application of pressure comprises applying the pressure at a specific location with specific intensities using a pressure cuff or elastic band to restrict the venous flow and/or the lymphatic flow, but restrict the arterial flow to a lesser extent.

4. The method of claim 2, wherein the selective application of pressure comprises applying the pressure with a device element to which the plurality of microneedles is connected.

5. The method of claim 1, wherein the inducing the local edema is effected by inserting the microneedles at the insertion site in a manner effective to generate an injury response.

6. The method of claim 1, wherein the microneedles are inserted into the skin at an angle from about 10° to about 45° relative to the skin surface.

7. The method of claim 1, wherein the ISF flows from the apertures, along an outer surface of the microneedles, while the microneedles remain inserted in the patient's skin.

8. The method of claim 7, wherein the microneedles are repeatedly pressed in and out of the patient's skin.

9. The method of claim 1, wherein the inducing the local edema is carried out at a first time, and the collection of the ISF occurs at or after a second time at least one minute after the first time.

10. The method of claim 1, wherein the plurality of microneedles is inserted into and removed from the insertion site several times before or during the collecting the ISF.

11. The method of claim 1, wherein the patient's skin at the insertion site is manipulated to be held in a taut and/or curved position during (i) the inserting the plurality of microneedles, and/or (ii) the collecting the ISF.

12. The method of claim 1, which is performed in a manner that the collected ISF is substantially or completely blood-free.

13. A method for detection and/or monitoring of disease, injury, environmental exposure, or physiological or drug pharmacokinetic status, the method comprising:
   collecting the interstitial fluid (ISF) from the patient's skin in accordance with the method of claim 1; and
   analyzing the collected ISF for a presence or concentration of (i) a biomarker indicative of the disease, the injury, the environmental exposure, or the physiological status, (ii) a pharmaceutical compound, (iii) a metabolite, or (iv) a combination thereof.

14. The method of claim 1, wherein the inducing the local edema is effected by a laser treatment of the patient's skin.

15. The method of claim 14, wherein the laser treatment comprises an ablative or non-ablative fractional laser treatment.

16. The method of claim 1, wherein the inducing the local edema is effected by treating the patient's skin with radiofrequency energy.

17. The method of claim 16, wherein the radiofrequency energy is applied with an electrode, and the electrode comprises at least one microneedle of the plurality of microneedles.

18. The method of claim 1, wherein the inducing the local edema is effected by treating the patient's skin with ultraviolet light, visible light, near infrared light, infrared light, or a combination thereof.

19. The method of claim 18, wherein the ultraviolet light, the visible light, the near infrared light, the infrared light, or the combination thereof induces production of a heat shock protein in the patient's skin.

20. A device for collection of interstitial fluid (ISF) from a patient's skin, the device comprising:
- an array of solid microneedles configured for insertion across the stratum corneum of the patient's skin, each solid microneedle having an outer surface, an insertion tip end portion, and a base end portion;
- a backing structure from which the array of microneedles extends;
- an ISF collection matrix disposed in proximity to the base end portion of the microneedles to receive the ISF flowing along the outer surface toward the base end portion of the microneedles when the microneedles are inserted into the patient's skin; and
- a means for inducing local edema to mobilize ISF within the patient's dermis at an insertion site where the microneedles are inserted into the patient's skin.

21. A device for collection of interstitial fluid (ISF) from a patient's skin, the device comprising:
- an array of solid microneedles configured for insertion across the stratum corneum of the patient's skin, each solid microneedle having an outer surface, an insertion tip end portion, and a base end portion;
- a backing structure from which the array of microneedles extend; and
- a means for inducing local edema to mobilize ISF within the patient's dermis at an insertion site where the microneedles are inserted into the patient's skin.

22. A method for collecting interstitial fluid (ISF) from a human subject's skin, the method comprising:
- inserting a plurality of microneedles into the human subject's skin at an insertion site to form a plurality of apertures in the subject's stratum corneum at the insertion site;
- inducing local edema, without use of a bioactive agent, to mobilize ISF within the subject's dermis at the insertion site; and
- collecting the ISF that flows from the apertures to a surface of the human subject's skin,
- wherein the inducing the local edema within the subject's dermis is effective to increase a rate and/or a total amount of the ISF flowing from the apertures.

* * * * *